US012120620B2

(12) United States Patent
Ashworth et al.

(10) Patent No.: US 12,120,620 B2
(45) Date of Patent: Oct. 15, 2024

(54) MULTIPLEX TIME DIVISION DUPLEX (TDD) SYNC DETECTION MODULE

(71) Applicant: Wilson Electronics, LLC, St. George, UT (US)

(72) Inventors: Christopher Ken Ashworth, Toquerville, UT (US); Dale Robert Anderson, Colleyville, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/885,218

(22) Filed: May 27, 2020

(65) Prior Publication Data

US 2020/0383075 A1 Dec. 3, 2020

Related U.S. Application Data

(60) Provisional application No. 62/854,279, filed on May 29, 2019.

(51) Int. Cl.
*H04W 56/00* (2009.01)
*H04B 7/155* (2006.01)
*H04L 5/14* (2006.01)

(52) U.S. Cl.
CPC .... *H04W 56/0005* (2013.01); *H04B 7/15507* (2013.01); *H04L 5/14* (2013.01)

(58) Field of Classification Search
CPC . H04B 7/15507; H04B 7/15542; H04L 5/003; H04L 5/14; H04W 56/0005
See application file for complete search history.

(56) References Cited

U.S. PATENT DOCUMENTS 4,776,032 A 10/1988 Odate et al.
5,303,395 A 4/1994 Dayani
(Continued)

FOREIGN PATENT DOCUMENTS

CN 105992217 A * 10/2016 ............ H04W 16/10
EP 1525678 B1 7/2008
(Continued)

OTHER PUBLICATIONS

Huawei et al.; "Physical layer signaling design for TDD eIMTA." 3GPP Draft; R1-134049, 3rd Generation Partnership Project (3GPP), Mobile Competence Centre; 650, Route Des Lucioles; F-06921 Sophia-Antipolis Cedex; France; Sep. 28, 2013; XP05071741; 4 Pages.

(Continued)

*Primary Examiner* — Marcus Smith
*Assistant Examiner* — Berhanu D Belete
(74) *Attorney, Agent, or Firm* — Thorpe North & Western, LLP.

(57) ABSTRACT

A technology is described for a repeater that can comprise: a first port; a second port; a first amplification and filtering path coupled between the first port and the second port, wherein the first amplification and filtering path is configured to amplify and filter a first time division duplex (TDD) signal in a first frequency range of a first TDD uplink (UL) signal; a second amplification and filtering path coupled between the first port and the second port, wherein the second amplification and filtering path is configured to amplify and filter a second TDD signal in a second frequency range of a second TDD downlink (DL) signal; and a modem configured to generate an UL/DL indication signal for the first frequency range, and send the UL/DL indication signal to the repeater.

15 Claims, 26 Drawing Sheets

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,535,748 B1* | 3/2003 | Vuorio | H04B 7/12 455/552.1 |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 10,027,398 B2* | 7/2018 | Bennett | H04B 7/04 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1 | 8/2007 | Dean | |
| 2007/0201402 A1* | 8/2007 | Cho | H04B 7/155 370/330 |
| 2007/0291668 A1* | 12/2007 | Duan | H04W 56/001 370/280 |
| 2008/0081555 A1 | 4/2008 | Kong et al. | |
| 2008/0096483 A1 | 4/2008 | Van Buren et al. | |
| 2008/0159743 A1* | 7/2008 | Lee | H04J 3/0682 398/103 |
| 2008/0278237 A1 | 11/2008 | Blin | |
| 2010/0054216 A1* | 3/2010 | Usami | H04W 48/16 370/337 |
| 2010/0093391 A1* | 4/2010 | Saban | H04B 7/024 455/562.1 |
| 2011/0064020 A1 | 3/2011 | Suga | |
| 2011/0151775 A1 | 6/2011 | Kang et al. | |
| 2012/0188919 A1* | 7/2012 | Subasic | H04B 7/15578 370/279 |
| 2012/0281622 A1* | 11/2012 | Saban | H04W 88/085 370/328 |
| 2013/0109436 A1* | 5/2013 | Tat | H04W 8/183 455/558 |
| 2013/0142095 A1 | 6/2013 | Calcev et al. | |
| 2013/0223330 A1* | 8/2013 | Medbo | H04B 7/155 370/315 |
| 2013/0344918 A1* | 12/2013 | Tat | H04W 88/06 455/558 |
| 2015/0139070 A1* | 5/2015 | Saha | H04B 7/18515 370/317 |
| 2015/0215094 A1* | 7/2015 | Meng | H04L 1/1861 370/280 |
| 2016/0050665 A1* | 2/2016 | Chang | H04B 1/48 370/280 |
| 2016/0142196 A1* | 5/2016 | Saban | H04B 7/024 370/328 |
| 2016/0360500 A1* | 12/2016 | Kim | H04B 7/04 |
| 2016/0365894 A1* | 12/2016 | Bennett | H04B 1/0057 |
| 2016/0365916 A1* | 12/2016 | Bennett | H04B 7/15507 |
| 2016/0380681 A1* | 12/2016 | Sahota | H04B 7/0413 375/267 |
| 2017/0055214 A1* | 2/2017 | Cook | H04W 40/22 |
| 2017/0055215 A1* | 2/2017 | Cook | H04W 52/52 |
| 2017/0055231 A1* | 2/2017 | Cook | H04W 52/0229 |
| 2017/0111161 A1* | 4/2017 | Raggio | H04B 7/15535 |
| 2017/0207871 A1* | 7/2017 | Shim | H04J 3/10 |
| 2018/0013483 A1* | 1/2018 | Liang | H04L 5/14 |
| 2018/0138967 A1* | 5/2018 | Ashworth | H02J 50/80 |
| 2018/0139626 A1* | 5/2018 | Ashworth | H04B 7/15542 |
| 2018/0152945 A1* | 5/2018 | Balteanu | H04L 5/001 |
| 2018/0227870 A1* | 8/2018 | Kim | H04W 56/001 |
| 2018/0241109 A1 | 8/2018 | Ashworth et al. | |
| 2018/0248676 A1 | 8/2018 | Raggio et al. | |
| 2018/0351633 A1* | 12/2018 | Birkmeir | H04W 56/008 |
| 2019/0028187 A1* | 1/2019 | Gutman | H04W 52/24 |
| 2019/0149184 A1* | 5/2019 | Jung | H04W 36/00698 455/90.2 |
| 2019/0190564 A1* | 6/2019 | Cook | H04B 1/0064 |
| 2019/0239057 A1* | 8/2019 | Hwang | H04L 5/1469 |
| 2019/0260460 A1* | 8/2019 | Ashworth | H04B 1/18 |
| 2020/0008036 A1* | 1/2020 | Hwang | H04L 5/0078 |

FOREIGN PATENT DOCUMENTS

| | | | | |
|---|---|---|---|---|
| KR | 20050100717 A | * | 4/2004 | H04B 7/14 |
| WO | WO 2018/105158 A1 | | 6/2018 | |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector/Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS Flash Microcontrollers"; (2001); Data Sheet; 218 pages.

* cited by examiner

FIG. 15b

| TDD Subframe Configuration | DwPTS (Symbols) | Guard Period (Symbols) | UpPTS (Symbols) | Time (ms) | Velocity of light (km/s) | Round Trip Distance (km) | Cell radius (km) |
|---|---|---|---|---|---|---|---|
| 0 | 3 | 10 | 1 | 0.7 | 300000 | 214 | 107 |
| 1 | 9 | 4 | 1 | 0.3 | 300000 | 86 | 43 |
| 2 | 10 | 3 | 1 | 0.2 | 300000 | 64 | 32 |
| 3 | 11 | 2 | 1 | 0.1 | 300000 | 43 | 21 |
| 4 | 12 | 1 | 1 | 0.1 | 300000 | 21 | 11 |
| 5 | 3 | 9 | 2 | 0.6 | 300000 | 193 | 96 |
| 6 | 9 | 3 | 2 | 0.2 | 300000 | 64 | 32 |
| 7 | 10 | 2 | 2 | 0.1 | 300000 | 43 | 21 |
| 8 | 11 | 1 | 2 | 0.1 | 300000 | 21 | 11 |

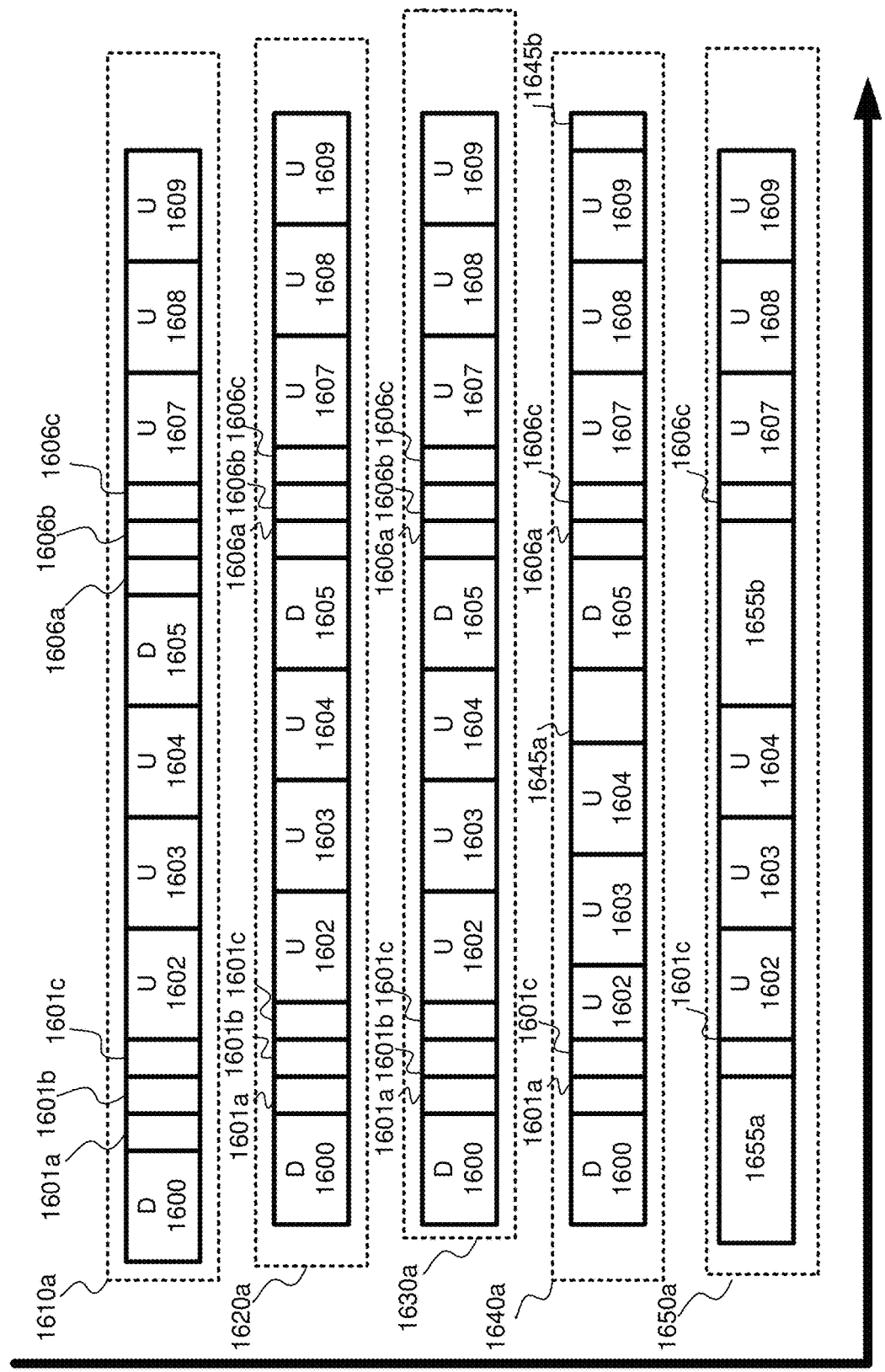

US 12,120,620 B2

MULTIPLEX TIME DIVISION DUPLEX (TDD) SYNC DETECTION MODULE

RELATED APPLICATIONS

The present application claims the benefit of U.S. Provisional Patent Application No. 62/854,279 filed May 29, 2019 with a docket number of 3969-178.PROV, the entire specification of which is hereby incorporated by reference in its entirety for all purposes.

BACKGROUND

Repeaters can be used to increase the quality of wireless communication between a wireless device and a wireless communication access point, such as a cell tower. Repeaters can enhance the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 15b illustrates a time division duplex (TDD) long term evolution (LTE) frame structure in accordance with an example;

FIG. 15e depicts the special subframe guard period and number of orthogonal frequency division multiplexing (OFDM) symbols in accordance with an example;

FIG. 16 illustrates a timing diagram showing negligible propagation delay between a repeater and a user equipment (UE) in accordance with an example;

Figure 1:
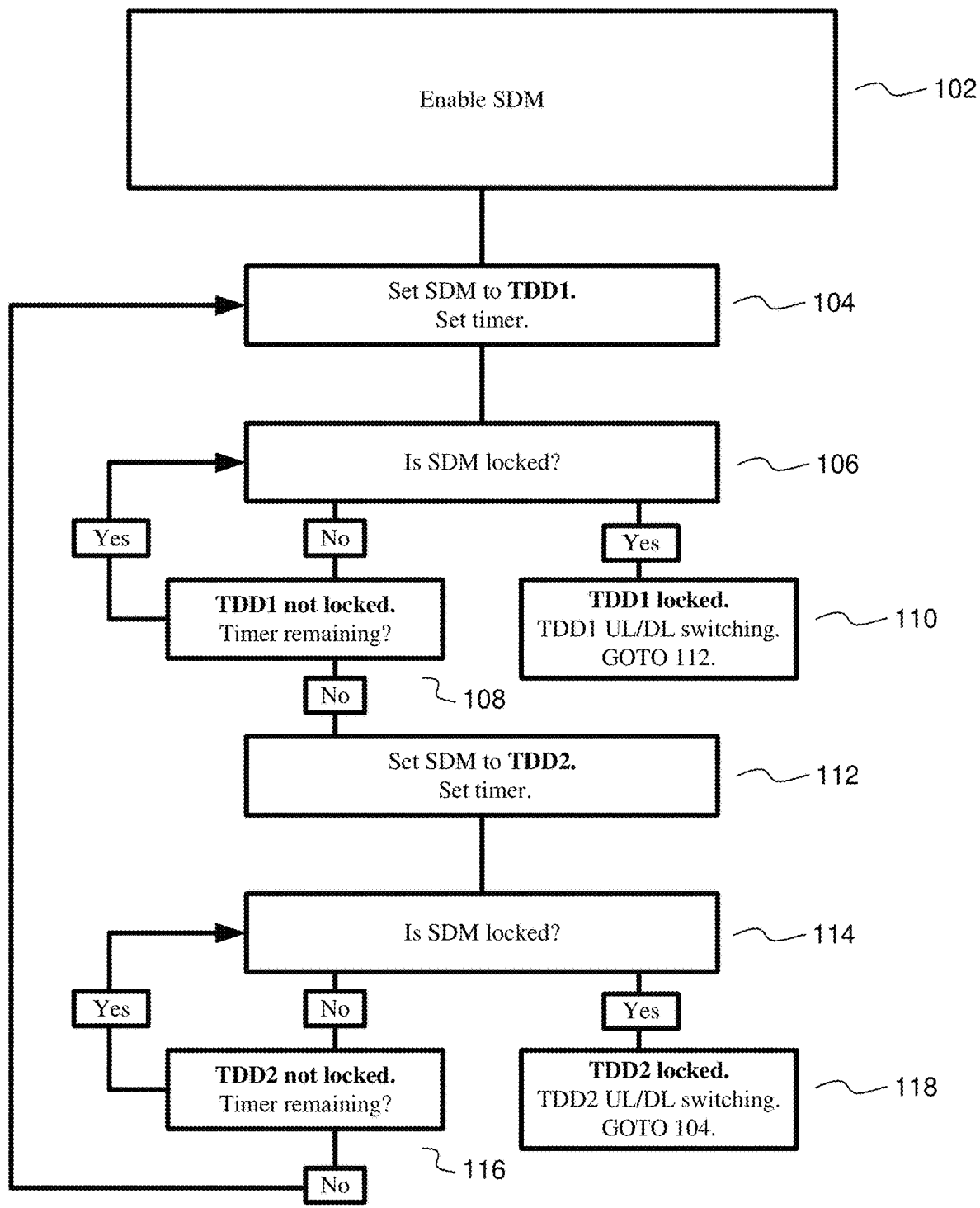
FIG. 1 depicts functionality of a time division duplex (TDD) multiband repeater in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A repeater can be configured to amplify and filter a time division duplex (TDD) frequency band in a wireless communications system for transmission from a wireless device to a base station and for transmission from a base station to a wireless device. TDD repeaters can use a TDD sync detection module (SDM) to control switching between transmission from a wireless device to a base station (e.g., an uplink (UL) transmission) and transmission from a base station to a wireless device (e.g., a downlink (DL) transmission).

A legacy TDD SDM may control UL/DL switching for only one TDD frequency band because of the challenges in processing UL/DL configuration information and synchronization information for each TDD frequency band. Because of these challenges, a multiband TDD repeater may use a separate TDD SDM for each TDD frequency band that can be amplified and filtered. However, each TDD SDM can be costlier than all of the other radio frequency (RF) components in the TDD repeater combined. As such, the cost of a TDD repeater can increase substantially for each additional TDD band. Adding additional TDD frequency bands to a TDD repeater can not only increase the total cost of the TDD repeater but also increase its complexity. When each TDD frequency band uses a single TDD SDM, then the circuitry between the multiple TDD SDMs and the various microcontrollers involved can increase the number of RF components beyond the simple addition of additional TDD SDMs.

In one example, a single TDD sync detection module can be configured to determine: UL/DL configuration information for a first TDD signal in a first frequency range and UL/DL configuration information for a second TDD signal in a second frequency range. The single TDD sync detection module can be configured to: receive synchronization information for the first TDD signal and synchronization information for the second TDD signal. The single TDD sync detection module can be configured to: use the synchronization information for the first TDD signal and the UL/DL configuration information for the first TDD signal to switch between the first TDD UL signal and the first TDD DL signal; and use the synchronization information for the second TDD signal and the UL/DL configuration information for the second TDD signal to switch between the second TDD UL signal and the second TDD DL signal.

In another example, a modem can be configured to receive a time division duplex (TDD) signal including synchronization information for a first frequency range and uplink/downlink (UL/DL) configuration information for the first frequency range. The modem can be further configured to generate an UL/DL indication signal for a first frequency range of the time division duplex (TDD) signal from the synchronization information and the UL/DL configuration information. The modem can be further configured to send the UL/DL indication signal to a repeater.

In one example, as depicted in the flowchart in FIG. 1, a multiband TDD repeater can comprise a single TDD SDM configured to determine UL/DL configuration information for a first TDD signal and a second TDD signal. The TDD SDM can be enabled (operation 102), set to the first TDD signal (operation 104), and a timer can be set (operation 104).

If the TDD SDM is locked (operation 106), then the TDD SDM can determine UL/DL configuration information for the first TDD signal (operation 110), and start operation 112. If the TDD SDM is not locked (operation 106), then the TDD SDM can identify if the timer has expired (operation 108). If the timer has not expired, operation 106 can be repeated. If the timer has expired (operation 108), operation 112 can be started.

In operation 112, the TDD SDM can be set to the second TDD signal and a timer can be set. If the TDD SDM is locked (operation 114), then the TDD SDM can determine UL/DL configuration information for the second TDD signal (operation 118), and start operation 104. If the TDD SDM is not locked (operation 114), then the TDD SDM can identify if the timer has expired (operation 116). If the timer has not expired, operation 114 can be repeated. If the timer has expired (operation 116), operation 104 can be started.

Figure 2:
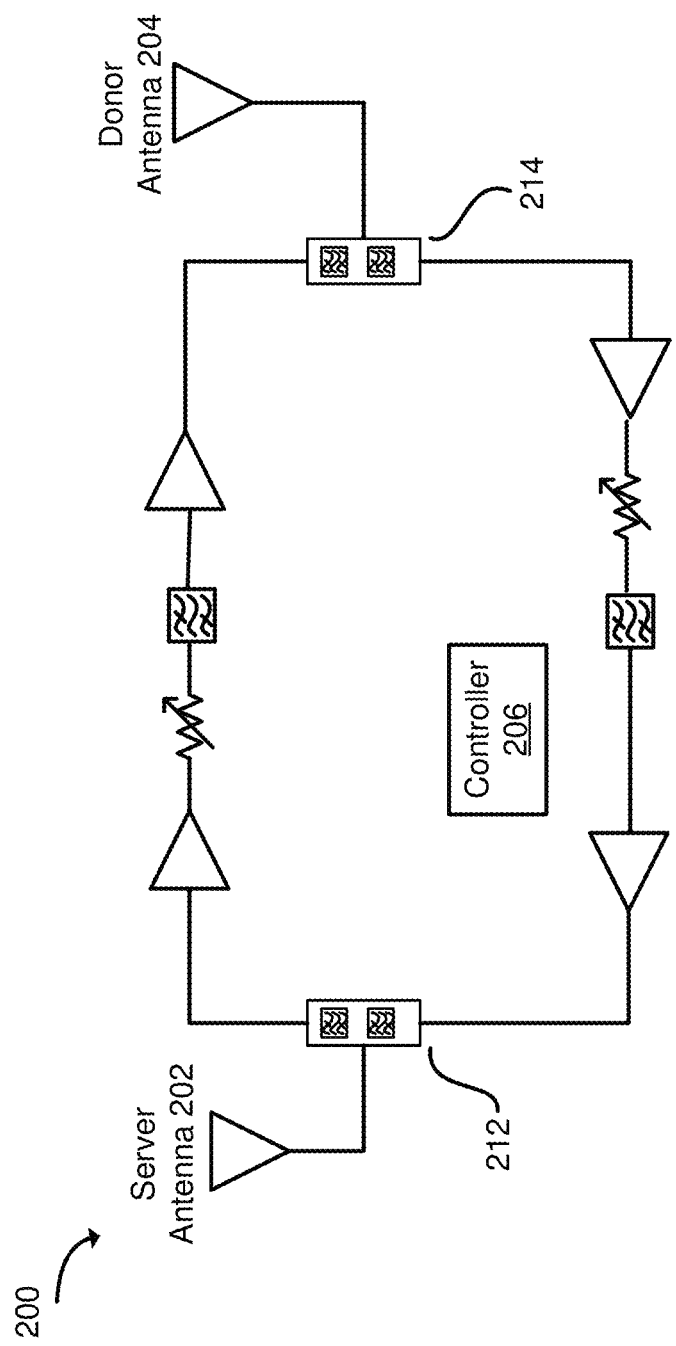
FIG. 2 illustrates a repeater in accordance with an example.

In an example, as illustrated in FIG. 2, a bi-directional repeater system can comprise a repeater 200 connected to an outside antenna 204 or donor antenna 204 and an inside antenna 202 or server antenna 202. The repeater 200 can include a donor antenna port that can be internally coupled to a second duplexer (or diplexer or multiplexer or circulator or splitter) 214. The repeater 200 can include a server antenna port that can also be coupled to a first duplexer (or diplexer or multiplexer or circulator or splitter) 212. Between the two duplexers, 214 and 212, can be two paths: a first path and a second path. The first path can comprise a low noise amplifier (LNA) with an input coupled to the first duplexer 212, a variable attenuator coupled to an output of the LNA, a filter coupled to the variable attenuator, and a power amplifier (PA) coupled between the filter and the second duplexer 214. The LNA can amplify a lower power signal without degrading the signal to noise ratio. The PA can adjust and amplify the power level by a desired amount. A second path can comprise an LNA with an input coupled to the second duplexer 214, a variable attenuator coupled to an output of the LNA, a filter coupled to the variable attenuator, and a PA coupled between the filter and the first duplexer 212. The first path can be a downlink amplification path or an uplink amplification path. The second path can be a downlink amplification path or an uplink amplification path. The repeater 200 can also comprise a controller 206. In one example, the controller 206 can include one or more processors and memory.

In some embodiments the controller 206 can adjust the gain of the first path and/or the second path based on wireless communication conditions. If included in the repeater 200, the controller 206 can be implemented by any suitable mechanism, such as a program, software, function, library, software as a service, analog or digital circuitry, or any combination thereof. The controller 206 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the first path and/or the second path. For example, the adjustments can be based on radio frequency (RF) signal inputs.

The memory can include any suitable computer readable media configured to retain program instructions and/or data for a period of time. By way of example, and not limitation, such computer readable media can include tangible computer readable storage media including random access memory (RAM), read only memory (ROM), electrically erasable programmable read only memory (EEPROM), a compact disk (CD) ROM or other optical disk storage, magnetic disk storage or other magnetic storage devices, flash memory devices (e.g., solid state memory devices) or any other storage medium which can be used to carry or store desired program code in the form of computer executable instructions or data structures and which can be accessed by a general purpose or special purpose computer. Combinations of the above can also be included within the scope of computer readable media. Computer executable instructions can include, for example, instructions and data that cause a general purpose computer, special purpose computer, or special purpose processing device to perform a certain function or group of functions.

Figure 3:
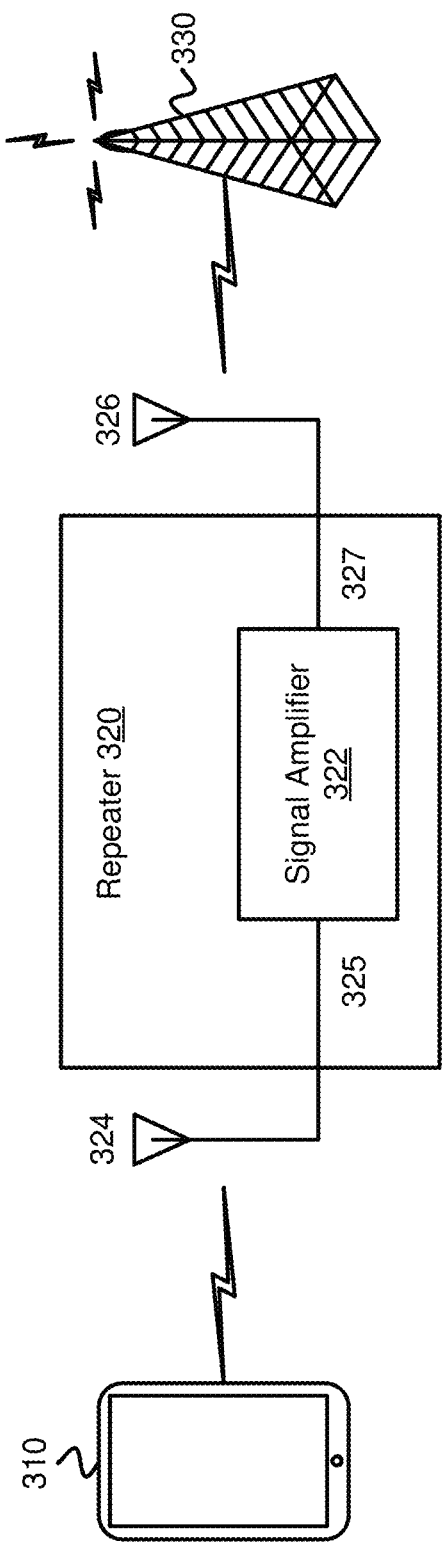
FIG. 3 illustrates a repeater in communication with a user equipment (UE) and a base station (BS) in accordance with an example.

FIG. 3 illustrates an exemplary repeater 320 in communication with a wireless device 310 and a base station 330. The repeater 320 (also referred to as a cellular signal amplifier) can enhance the quality of wireless communication by amplifying, filtering, and/or applying other processing techniques via a signal amplifier 322 to uplink signals communicated from the wireless device 310 to the base station 330 and/or downlink signals communicated from the base station 330 to the wireless device 310. In other words, the repeater 320 can amplify or boost uplink signals and/or downlink signals bi-directionally. In one example, the repeater 320 can be at a fixed location, such as in a home or office. Alternatively, the repeater 320 can be attached to a mobile object, such as a vehicle or a wireless device 310. The repeater can be a signal booster, such as a cellular signal booster.

In one configuration, the repeater 320 can be configured to be connected to a device antenna 324 (e.g., an inside antenna, server antenna, or a coupling antenna) and a node antenna 326 (e.g., an outside antenna or donor antenna). The node antenna 326 can receive the downlink signal from the base station 330. The downlink signal can be provided to the signal amplifier 322 via a second coaxial cable 327 or other type of wired, wireless, optical, or radio frequency connection operable to communicate radio frequency signals. The signal amplifier 322 can include one or more radio signal amplifiers for amplification and filtering of cellular signals. The downlink signal that has been amplified and filtered can be provided to the device antenna 324 via a first coaxial cable 325 or other type of radio frequency connection operable to communicate radio frequency signals. The device antenna 324 can communicate the downlink signal that has been amplified and filtered to the wireless device 310.

Similarly, the device antenna 324 can receive an uplink signal from the wireless device 310. The uplink signal can be provided to the signal amplifier 322 via the first coaxial cable 325 or other type of wired, wireless, optical, or radio frequency connection operable to communicate radio frequency signals. The signal amplifier 322 can include one or more radio signal amplifiers for amplification and filtering of cellular signals. The uplink signal that has been amplified and filtered can be provided to the node antenna 326 via the second coaxial cable 327 or other type of wired, wireless, optical, or radio frequency connection operable to communicate radio frequency signals. The node antenna 326 can communicate the uplink signal that has been amplified and filtered to a node, such as a base station 330.

In one embodiment, the device antenna 324 and the node antenna 326 can be integrated as part of the repeater 320. Alternatively, the repeater 320 can be configured to be connected to a separate device antenna 324 or node antenna 326. The device antenna and the node antenna may be provided by a different provider than the repeater 320.

In one example, the repeater 320 can send uplink signals to a node and/or receive downlink signals from the node. While FIG. 3 shows the node as a base station 330, this is not intended to be limiting. The node can comprise a wireless wide area network (WWAN) access point (AP), a base station (BS), an evolved Node B (eNB), a next generation Node B (gNB), a new radio base station (NR BS), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the repeater 320 used to amplify the uplink and/or a downlink signal can be a handheld booster. The handheld booster can be implemented in a sleeve of the wireless device 310. The wireless device sleeve may be attached to the wireless device 310, but may be removed as needed. In this configuration, the repeater 320 can automatically power down or cease amplification when the wireless device 310 approaches a particular base station. In other words, the repeater 320 may determine to stop performing signal amplification when the quality of uplink and/or downlink signals is above a defined threshold based on a location of the wireless device 310 in relation to the base station 330.

In one example, the repeater 320 can include a battery to provide power to various components, such as the signal amplifier 322, the device antenna 324, and the node antenna 326. The battery can also power the wireless device 310 (e.g., phone or tablet). Alternatively, the repeater 320 can receive power from the wireless device 310.

In one configuration, the repeater 320 can be a Federal Communications Commission (FCC)-compatible consumer repeater. As a non-limiting example, the repeater 320 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 320 can be configured to automatically self-monitor its operation to ensure compliance with applicable noise and gain limits. The repeater 320 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 320 can enhance the wireless connection between the wireless device 310 and the base station 330 (e.g., cell tower) or another type of wireless wide area network (WWAN) access point (AP) by amplifying desired signals relative to a noise floor. The repeater 320 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 320 can boost signals for 3GPP LTE Release 16.1.0 (March 2019) or other desired releases.

The repeater 320 can boost signals from the 3GPP Technical Specification (TS) 36.101 (Release 16 Jan. 2019) bands or LTE frequency bands. For example, the repeater 320 can boost signals from the LTE frequency bands: 2, 4, 5, 12, 13, 17, 25, and 26. In addition, the repeater 320 can boost selected frequency bands based on the country or region in which the repeater is used, including any of bands 1-85 or other bands, as disclosed in 3GPP TS 36.104 V16.1.0 (March 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |

(NOTE 1):
Band 6, 23 are not applicable.
(NOTE 2):
Restricted to E-UTRA operation when carrier aggregation is configured. The downlink operating band is paired with the uplink operating band (external) of the carrier aggregation configuration that is supporting the configured Pcell.
(NOTE 3):
This band is an unlicensed band restricted to licensed-assisted operation using Frame Structure Type 3.
(NOTE 4):
Band 46 is divided into four sub-bands as in Table 5.5-1A.
(NOTE 5):
The range 2180-2200 MHz of the DL operating band is restricted to E-UTRA operation when carrier aggregation is configured.
(NOTE 6):
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
(NOTE 7):
Void
(NOTE 8):
This band is restricted to licensed-assisted operation using Frame Structure Type 3.

In another configuration, the repeater 320 can boost signals from the 3GPP Technical Specification (TS) 38.104 (Release 15 Jan. 2019) bands or 5G frequency bands. In addition, the repeater 320 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V15.5.0 (March 2019), and depicted in Table 2 and Table 3:

TABLE 2

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |

TABLE 2-continued

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex Mode |
|---|---|---|---|
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

TABLE 3

| NR operating band | Uplink (UL) and Downlink (DL) operating band BS transmit/receive UE transmit/receive $F_{UL,\ low}$-$F_{UL,\ high}$ $F_{DL,\ low}$-$F_{DL,\ high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

Figure 4:
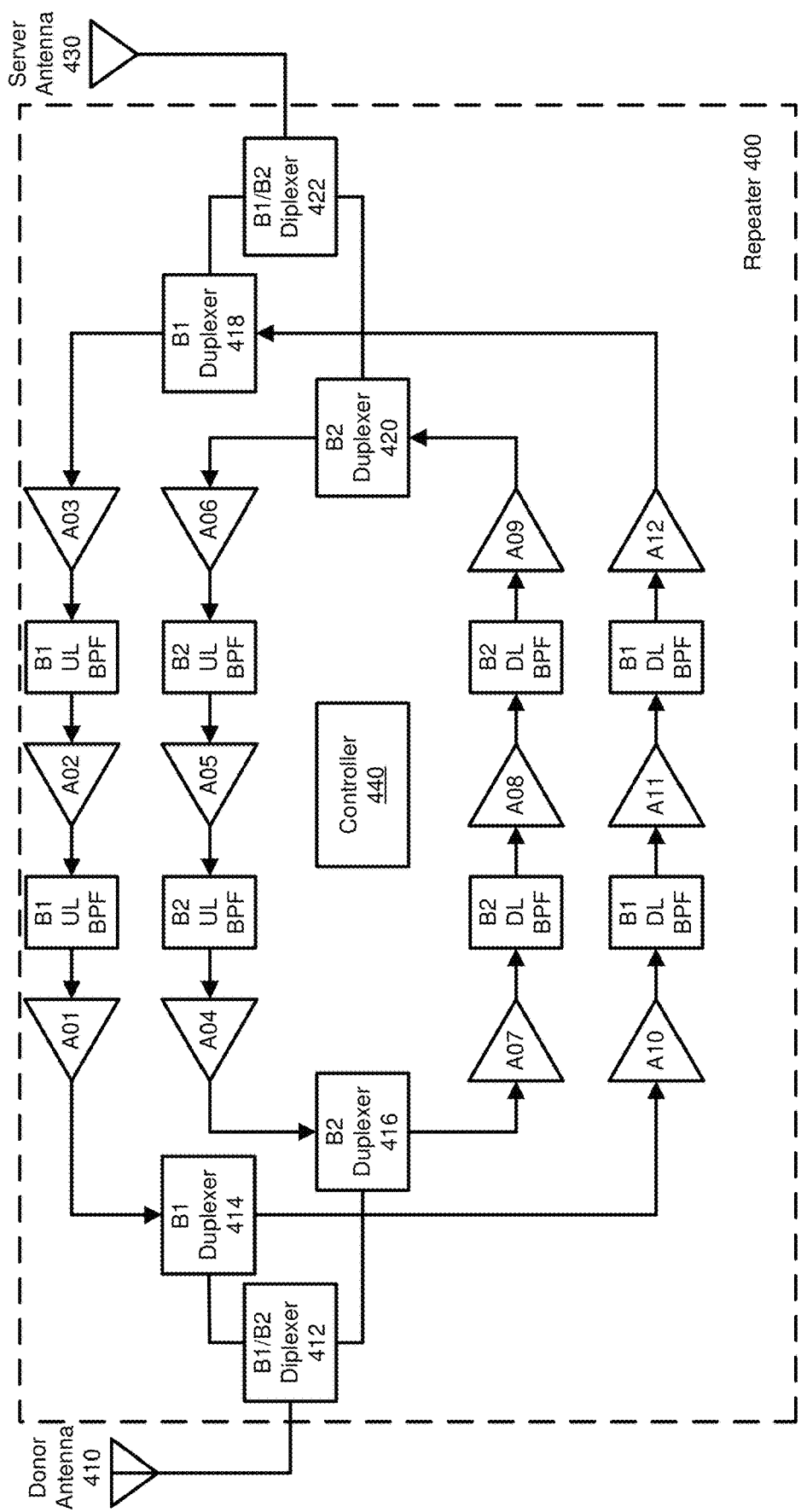
FIG. 4 illustrates a frequency division duplex (FDD) multiband repeater in accordance with an example.

As illustrated in FIG. 4, in another example, a repeater can be configured as a multiband bi-directional FDD wireless signal booster 400 configured to amplify an uplink signal and a downlink signal in multiple bands or channels using a separate signal path for one or more uplink frequency bands or channels and one or more downlink frequency bands or channels. In one embodiment, adjacent bands can be included on a same signal path.

A donor antenna 410, or an integrated node antenna, can receive a downlink signal. For example, the downlink signal can be received from a base station. The downlink signal can be provided to a first B1/B2 diplexer 412, wherein B1 represents a first frequency band and B2 represents a second frequency band. The first B1/B2 diplexer 412 can direct selected portions of a received signal to a B1 downlink signal path and a B2 downlink signal path. A downlink signal that is associated with B1 can travel along the B1 downlink signal path to a first B1 duplexer 414. A portion of the received signal that is within the B2 can travel along the B2 downlink signal path to a first B2 duplexer 416. After passing the first B1 duplexer 414, the downlink signal can travel through a series of amplifiers (e.g. A10, A11, and A12) and downlink bandpass filters (e.g. B1 DL BPF) to a second B1 duplexer 418. In addition, the B2 downlink signal passing through the B2 duplexer 416, can travel through a series of amplifiers (e.g. A07, A08, and A09) and downlink band pass filters (e.g. B2 DL BPF) to a second B2 duplexer 420. At this point, the downlink signals (B1 or B2) have been amplified and filtered in accordance with the type of amplifiers and BPFs included in the multiband bi-directional wireless signal booster 400. The downlink signals from the second B1 duplexer 418 or the second B2 duplexer 420, respectively, can be provided to a second B1/B2 diplexer 422. The second B1/B2 diplexer 422 can direct the B1/B2 amplified downlink signal to a server antenna 430, or an integrated device antenna. The server antenna 430 can communicate the amplified downlink signal to a wireless device, such as a UE.

In another example, the server antenna 430 can receive an uplink (UL) signal from a wireless device. The uplink signal can include a first frequency range, such as a Band 1 signal and a second frequency range, such as a Band 2 signal. The uplink signal can be provided to the second B1/B2 diplexer 422. The second B1/B2 diplexer 422 can direct the signals, based on their frequency, to a B1 uplink signal path and a B2 uplink signal path. An uplink signal that is associated with B1 can travel along the B1 uplink signal path to a second B1 duplexer 418, and an uplink signal that is associated with B2 can travel along the B2 uplink signal path to a second B2 duplexer 420. The second B1 duplexer 418 can direct the B1 uplink signal to travel through a series of amplifiers (e.g. A01, A02, and A03) and uplink bandpass filters (B1 UL BPF) to the first B1 duplexer 414. In addition, the second B2 duplexer 420 can direct the B2 uplink signal to travel through a series of amplifiers (e.g. A04, A05, and A06) and downlink band pass filters (B2 UL BPF) to the first B2 duplexer 416. At this point, the uplink signals (B1 and B2) have been amplified and filtered in accordance with the type of amplifiers and BPFs included in the bi-directional wireless signal booster 400. The uplink signals from the first B1 duplexer 414 and the first B2 duplexer 416, respectively, can be provided to the first B1/B2 diplexer 412. The first B1/B2 diplexer 412 can direct the B1 and B2 amplified uplink signals to the donor antenna 410, or an integrated device antenna. The donor antenna 410, or donor antenna, can communicate the amplified uplink signals to a base station.

Figure 5A:
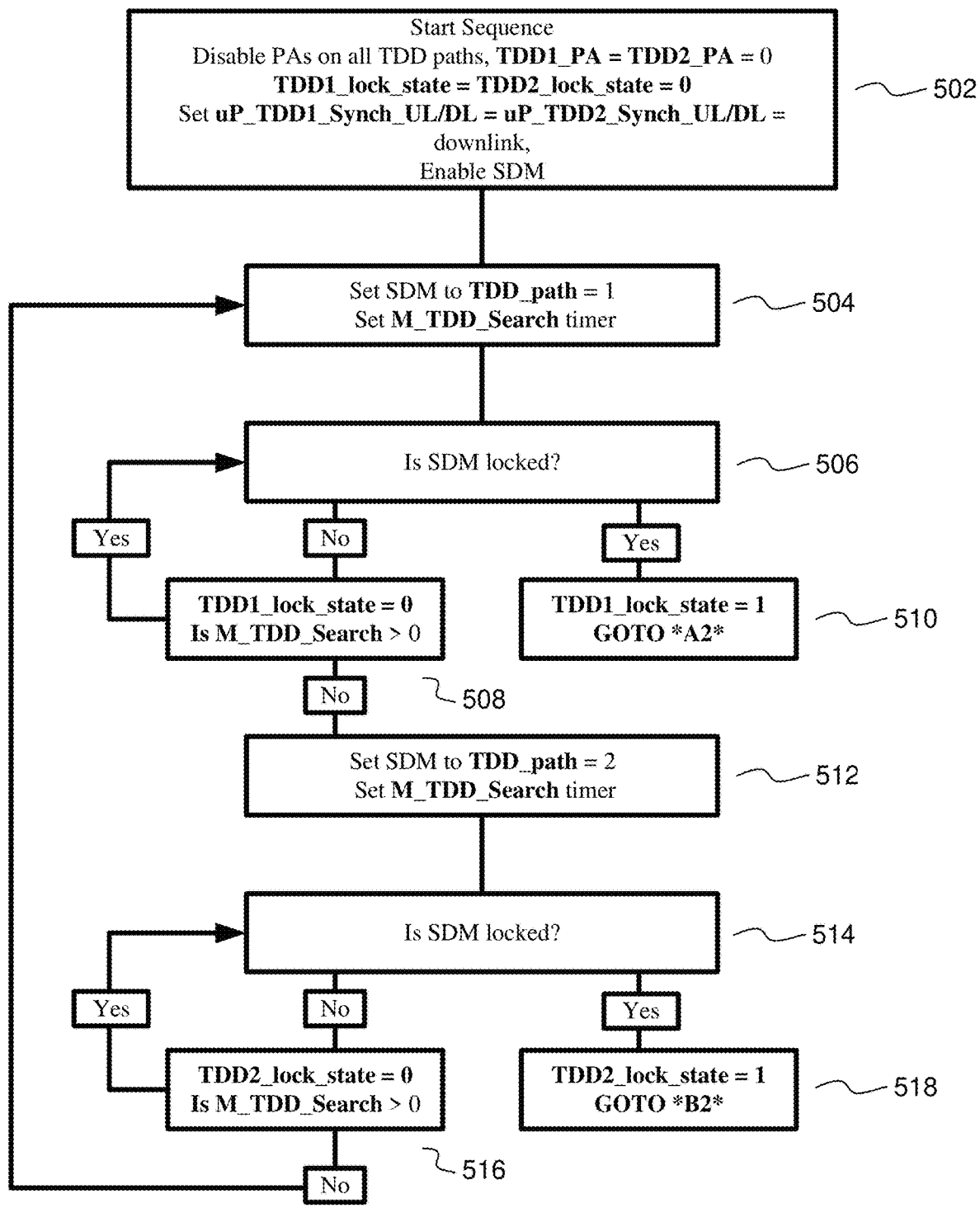
FIG. 5a depicts functionality for a time division duplex (TDD) multiband repeater in accordance with an example.

In another example, as depicted in the flowchart in FIG. 5a, a multiband TDD repeater can comprise a single TDD SDM configured to determine UL/DL configuration information for a first TDD signal and a second TDD signal. The TDD SDM can be enabled in operation 502. Operation 502 can further comprise: disabling the power amplifiers on the first and second TDD amplification and filtering paths (e.g., TDD1_PA=TDD2_PA=0); setting a lock state for the first and second TDD signals to 'unlocked' (e.g., TDD1_lock_state=TDD2_lock_state=0); and setting a synch parameter for the first and second TDD signals to 'downlink' (e.g., uP_TDD1_Synch_UL/DL=uP_TDD2_Synch_UL/DL=downlink).

In another example, the TDD SDM can be set to the first TDD path (TDD_path=1) and a timer (e.g., M_TDD_Search timer) can be set (operation 504). If the TDD SDM is locked (operation 506), then operation 510 can be started (with reference to 'A2' in FIG. 5b to be discussed in the proceeding). If the TDD SDM is not locked (operation 506), then the TDD SDM can identify if the timer has expired in operation 508 (e.g., Is M_TDD_Search>0). If the timer has not expired, operation 506 can be repeated. If the timer has expired (operation 508), operation 512 can be started.

In operation 512, the TDD SDM can be set to the second TDD path (TDD_path=2) and a timer (e.g., M_TDD_Search timer) can be set (operation 512). If the TDD SDM is locked (operation 514), then operation 518 can be started (with reference to 'B2' in FIG. 5c to be discussed in the proceeding). If the TDD SDM is not locked (operation 514), then the TDD SDM can identify if the timer has expired in operation 516 (e.g., Is M_TDD_Search>0). If the timer has not expired, operation 514 can be repeated. If the timer has expired (operation 516), operation 504 can be started.

Figure 5B:
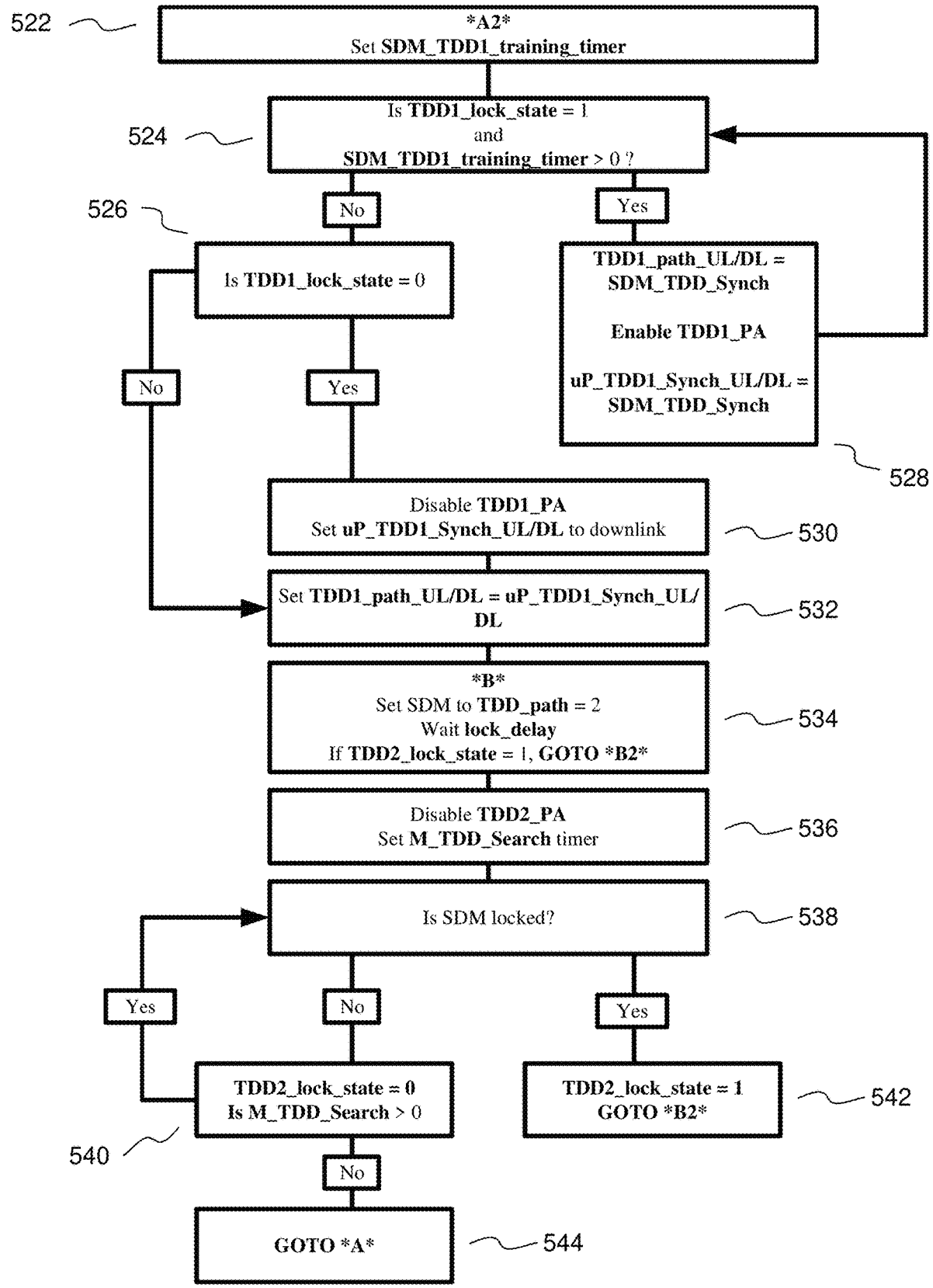
FIG. 5b depicts functionality for a time division duplex (TDD) multiband repeater in accordance with an example.

In another example, as depicted in the flowchart in FIG. 5b, an SDM training timer for the first TDD path can be set (e.g., SDM_TDD1_training_timer) (operation 'A2' or 522). In operation 524, if the lock state for the first TDD signal is locked (e.g., TDD1_lock_state=1) and the SDM training timer for the first TDD path is greater than 0 (SDM_TDD1_training_timer>0), then operation 528 can be started.

In another example, in operation 528, UL/DL configuration information for the first TDD amplification and filtering path (e.g., TDD1_path_UL/DL) can be set using the UL/DL configuration information for the first TDD signal determined using the single TDD SDM (e.g., SDM_TDD_Synch). The one or more power amplifiers on the first TDD amplification and filtering path can be enabled (e.g., Enable TDD1_PA). The synch parameter for the first TDD signal (e.g., uP_TDD1_Synch_UL/DL) can be set using the UL/DL configuration information for the first TDD signal determined using the single TDD SDM (e.g., SDM_TDD_Synch). Upon competition of operation 528, operation 524 can be started.

In another example, in operation 524, if the lock state for the first TDD signal is unlocked (e.g., TDD1_lock_state=0) or the SDM training timer for the first TDD path has expired, then operation 526 can be started. In operation 526, if the lock state for the first TDD signal is unlocked (e.g., TDD1_lock_state=0), then operation 530 can be started. In operation 526, if the lock state for the first TDD signal is not unlocked, then operation 532 can be started.

In another example, in operation 530, the one or more power amplifiers on the first TDD amplification and filtering path can be disabled (e.g., TDD1_PA=0), and the synch parameter for the first TDD signal can be set to 'downlink' (e.g., uP_TDD1_Synch_UL/DL=downlink).

In another example, in operation 532, UL/DL configuration information for the first TDD amplification and filtering path (e.g., TDD1_path_UL/DL) can be set to the synch parameter for the first TDD signal (e.g., uP_TDD1_Synch_UL/DL).

In another example, in operation 534 (i.e. operation 'B'), the TDD SDM can be set to the second TDD amplification and filtering path (e.g., TDD_path=2). A time delay can be initiated (e.g., lock_delay). If the lock state of the second TDD signal is locked (e.g., TDD2_lock_state=1), then operation 'B2' (discussed in the proceeding with relation to FIG. 5c) can be started.

In another example, in operation 536, one or more power amplifiers on the second TDD amplification and filtering path can be disabled (e.g., TDD2_PA). A timer (e.g., M_TDD_Search timer) can be set.

Figure 5C:
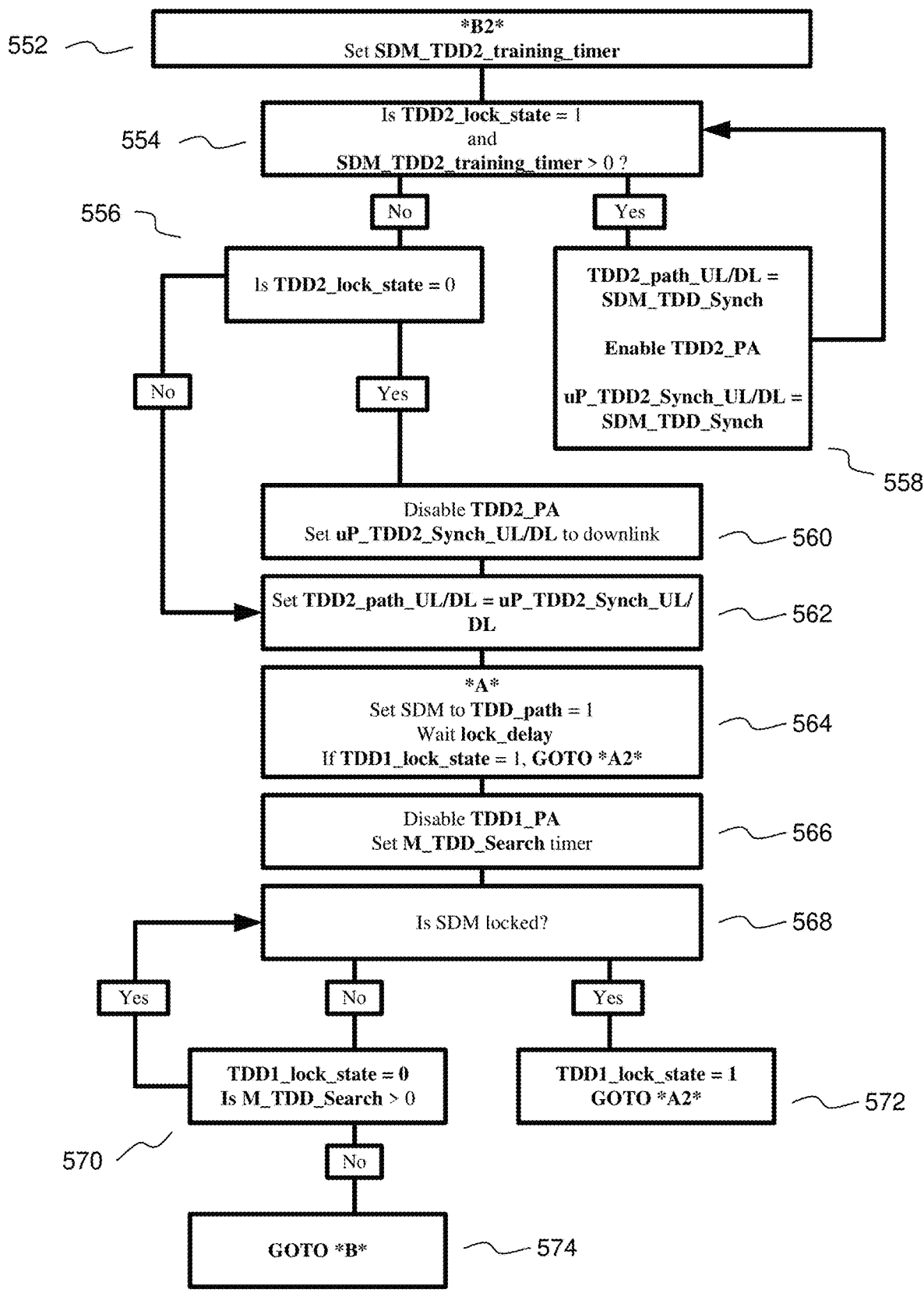
FIG. 5c depicts functionality for a time division duplex (TDD) multiband repeater in accordance with an example.

In another example, in operation 538, if the TDD SDM is locked, then operation 542 can be started (with reference to 'B2' in FIG. 5*c* to be discussed in the proceeding). If the TDD SDM is not locked (operation 538), then the TDD SDM can identify if the timer has expired in operation 540 (e.g., Is M_TDD_Search>0). If the timer has not expired, operation 538 can be repeated. If the timer has expired (operation 540), operation 544 can be started (with reference to 'A' in FIG. 5*c* to be discussed in the proceeding).

In another example, as depicted in the flowchart in FIG. 5*c*, an SDM training timer for the second TDD path can be set (e.g., SDM_TDD2_training_timer) (operation 'B2' or 552). In operation 554, if the lock state for the second TDD signal is locked (e.g., TDD2_lock_state=1) and the SDM training timer for the second TDD path is greater than 0 (SDM_TDD2_training_timer>0), then operation 558 can be started.

In another example, in operation 558, UL/DL configuration information for the second TDD amplification and filtering path (e.g., TDD2_path_UL/DL) can be set using the UL/DL configuration information for the second TDD signal determined using the single TDD SDM (e.g., SDM_TDD_Synch). The one or more power amplifiers on the second TDD amplification and filtering path can be enabled (e.g., Enable TDD2_PA). The synch parameter for the second TDD signal (e.g., uP_TDD2_Synch_UL/DL) can be set using the UL/DL configuration information for the second TDD signal determined using the single TDD SDM (e.g., SDM_TDD_Synch). Upon competition of operation 558, operation 554 can be started.

In another example, in operation 554, if the lock state for the second TDD signal is unlocked (e.g., TDD2_lock_state=0) or the SDM training timer for the second TDD path has expired, then operation 556 can be started. In operation 556, if the lock state for the second TDD signal is unlocked (e.g., TDD2_lock_state=0), then operation 560 can be started. In operation 556, if the lock state for the second TDD signal is not unlocked, then operation 562 can be started.

In another example, in operation 560, the one or more power amplifiers on the second TDD amplification and filtering path can be disabled (e.g., TDD2_PA=0), and the synch parameter for the second TDD signal can be set to 'downlink' (e.g., uP_TDD2_Synch_UL/DL=downlink).

In another example, in operation 562, UL/DL configuration information for the second TDD amplification and filtering path (e.g., TDD2_path_UL/DL) can be set to the synch parameter for the second TDD signal (e.g., uP_TDD2_Synch_UL/DL).

In another example, in operation 564 (i.e. operation 'A'), the TDD SDM can be set to the first TDD amplification and filtering path (e.g., TDD_path=1). A time delay can be initiated (e.g., lock_delay). If the lock state of the first TDD signal is locked (e.g., TDD1_lock_state=1), then operation 'A2' (discussed in the preceding with relation to FIG. 5*b*) can be started.

In another example, in operation 566, one or more power amplifiers on the first TDD amplification and filtering path can be disabled (e.g., TDD1_PA). A timer (e.g., M_TDD_Search timer) can be set.

In another example, in operation 568, if the TDD SDM is locked, then operation 572 can be started (with reference to 'A2' in FIG. 5*b* discussed in the preceding). If the TDD SDM is not locked (operation 568), then the TDD SDM can identify if the timer has expired in operation 570 (e.g., Is M_TDD_Search>0). If the timer has not expired, operation 568 can be repeated. If the timer has expired (operation 570), operation 574 can be started (with reference to 'B' in FIG. 5*b* discussed in the preceding).

Figure 6:
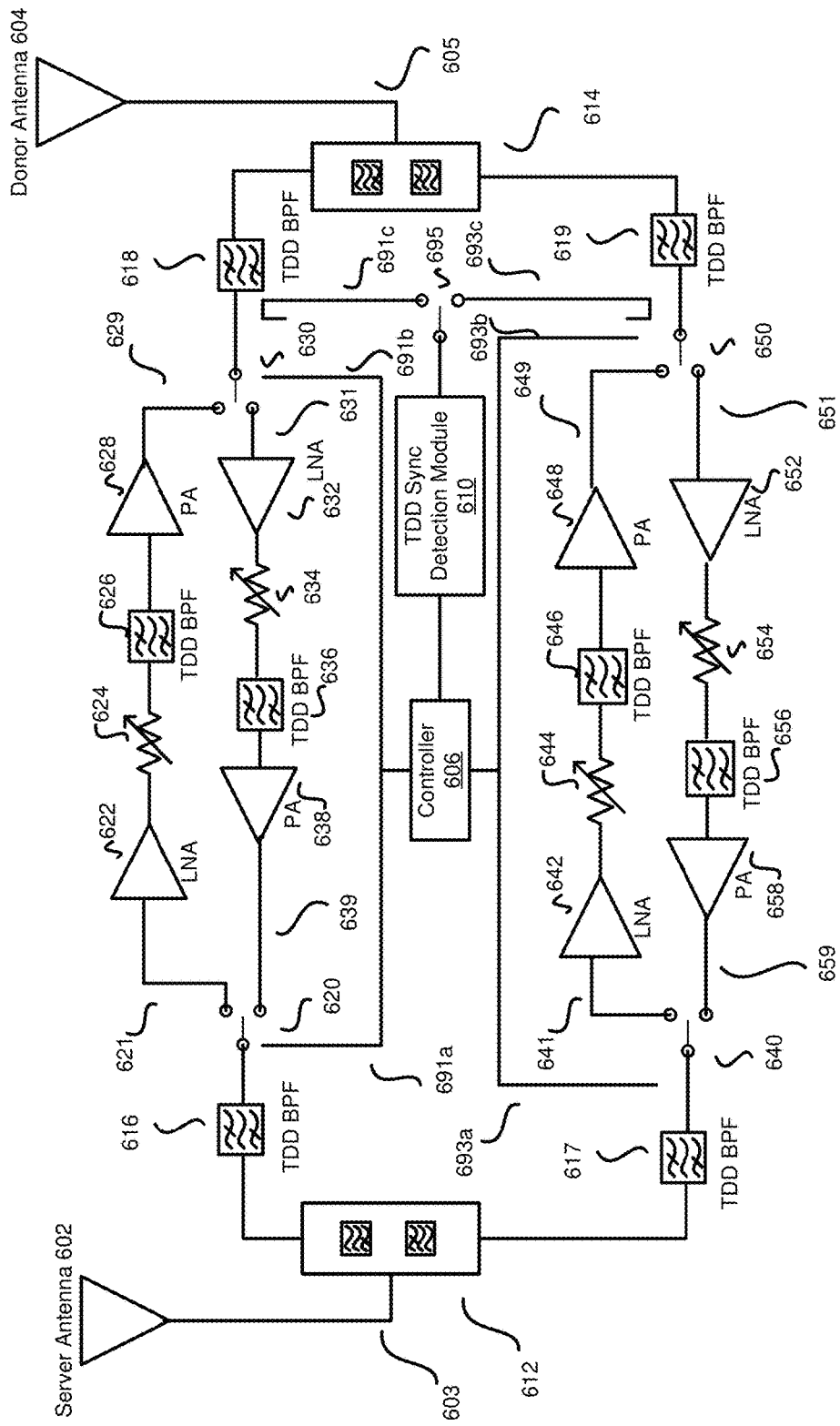
FIG. 6 illustrates a time division duplex (TDD) multiband repeater in accordance with an example.

In another example, as illustrated in FIG. 6, a repeater can be a time division duplex (TDD) repeater. The repeater can be configured to be coupled to a first antenna (e.g., a server antenna) 602 and a second antenna (e.g., a donor antenna) 604. The first antenna 602 can receive a first-direction signal (e.g., an uplink signal) from a wireless device (e.g., a UE). The first antenna 602 can be configured to be coupled to a first port (e.g., a server port) 603. The first port 603 can be coupled to a multiplexer (or a diplexer, a duplexer, a circulator, or a splitter) 612. The first-direction signal received at the first antenna 602 from the wireless device can be directed to multiplexer 612. The multiplexer 612 can direct the TDD first-direction signal, based on its frequency, to a TDD first path or a TDD second path.

In another example, the second antenna 604 can receive a second-direction signal from a base station. The second antenna 604 can be coupled to a second port (e.g., a donor port) 605. The second port 605 can be coupled to a multiplexer (or a diplexer, a duplexer, a circulator, or a splitter) 614. The second-direction signal received at the second antenna 604 from the base station can be directed to multiplexer 614. The multiplexer 614 can direct the TDD second-direction signal, based on its frequency, to a TDD first path or a TDD second path.

In another example, the TDD first path can comprise a filter (e.g., a TDD band-pass filter (BPF)) 616 that is configured to be coupled to the multiplexer 612 and a filter (e.g., a TDD BPF) 618 that is configured to be coupled to the multiplexer 614. The filter 616 can be configured to be coupled to a first switch 620 (e.g., a single-pole double-throw (SPDT) switch). The first switch 620 can be configured to be coupled to a first-direction path 621 of the TDD first path and a second-direction path 639 of the TDD first path. The filter 618 can be configured to be coupled to a second switch 630 (e.g., a single-pole double-throw (SPDT) switch). The second switch 630 can be configured to be coupled to a second-direction path 631 of the TDD first path and a first-direction path 629 of the TDD first path.

In another example, the first-direction path of the TDD first path can comprise one or more of a low-noise amplifier (LNA) 622, a variable attenuator 624, a filter (e.g., a TDD band-pass filter (BPF)) 626, or a power amplifier 628. In another example, the power amplifier 628 can comprise a variable gain power amplifier, a fixed gain power amplifier, or a gain block.

In another example, the filter 626 can be configured to pass one or more of a first-direction (e.g., an uplink direction) of a first frequency range (e.g., one or more of 3GPP LTE TDD frequency bands 41, 48, or 49). In another example, the filter 626 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 626 can be configured to communicate a first-direction of a selected channel within a 3GPP LTE TDD band or a 3GPP 5G TDD frequency band. In another example, the filter 626 can be configured to communicate a first-direction of a selected frequency range within a 3GPP LTE TDD frequency range or a first-direction of a 3GPP 5G TDD frequency range.

In another example, after being directed along the TDD first-direction path of the TDD first path, the TDD first-direction signal can be amplified and filtered in accordance with the type of amplifiers and filters included along the TDD first-direction path. At this point, the TDD first-direction signal can be directed to the second switch 630. The second switch 630 can direct the TDD first-direction signal to the filter (e.g., a TDD BPF) 618. The filter 618 can direct the TDD first-direction signal to the multiplexer 614. The multiplexer 614 can be coupled to the second port 605. The TDD first-direction signal can be directed from the multiplexer 614 to the second port 605. The TDD first-direction signal can be directed from the second port 605 to the second antenna 604. The second antenna 604 can communicate the amplified and/or filtered TDD first-direction signal to a base station.

In another example, the second antenna 604 can receive a second-direction signal from a base station. The second port 605 can be configured to be coupled to the second antenna 604. The second port 605 can be coupled to the multiplexer 614. The second-direction signal received at the second antenna 604 from the base station can be directed to the multiplexer 614. The multiplexer 614 can direct the TDD second-direction signal, based on its frequency, to the second switch (e.g., a SPDT switch) 630.

In another example, the second-direction path 631 of the TDD first path can comprise one or more of a low-noise amplifier (LNA) 632, a variable attenuator 634, a filter (e.g., a TDD BPF) 636, or a power amplifier 638. In another example, the power amplifier 638 can comprise a variable gain power amplifier, a fixed gain power amplifier, or a gain block.

In another example, the filter 636 can be configured to pass one or more of a second-direction (e.g., a downlink direction) of a first frequency range (e.g., one or more of 3GPP LTE TDD frequency bands 41, 48, or 49). In another example, the filter 636 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 636 can be configured to communicate a second-direction of a selected channel within a 3GPP LTE TDD band or a 3GPP 5G TDD frequency band. In another example, the filter 636 can be configured to communicate a second-direction of a selected frequency range within a 3GPP LTE TDD frequency range or a second-direction of a 3GPP 5G TDD frequency range.

In another example, after being directed along the second-direction path of the TDD first path, the TDD second-direction signal can be amplified and filtered in accordance with the type of amplifiers and filters included along the TDD second-direction path. At this point, the TDD second-direction signal can be directed to the first switch (e.g., a SPDT switch) 620. The first switch 620 can direct the amplified and/or filtered TDD second-direction signal to the multiplexer 612. The multiplexer 612 can be coupled to a first port 603. The TDD second-direction signal can be directed from the multiplexer 612 to the first port 603. The TDD second-direction signal can be directed from the first port 603 to the first antenna 602. The first antenna 602 can communicate the amplified and/or filtered TDD second-direction signal to a wireless device.

In another example, the TDD second path can comprise a filter (e.g., a TDD band-pass filter (BPF)) 617 that is configured to be coupled to the multiplexer 612 and a filter (e.g., a TDD BPF) 619 that is configured to be coupled to the multiplexer 614. The filter 617 can be configured to be coupled to a third switch 640 (e.g., a single-pole double-throw (SPDT) switch). The third switch 640 can be configured to be coupled to a first-direction path 641 of the TDD second path and a second-direction path 659 of the TDD second path. The filter 617 can be configured to be coupled to a fourth switch 650 (e.g., a single-pole double-throw (SPDT) switch). The fourth switch 650 can be configured to be coupled to a second-direction path 651 of the TDD second path and a first-direction path 649 of the TDD second path.

In another example, the first-direction path of the TDD second path can comprise one or more of a low-noise amplifier (LNA) 642, a variable attenuator 644, a filter (e.g., a TDD band-pass filter (BPF)) 646, or a power amplifier 648. In another example, the power amplifier 648 can comprise a variable gain power amplifier, a fixed gain power amplifier, or a gain block.

In another example, the filter 646 can be configured to pass one or more of a first-direction (e.g., an uplink direction) of a second frequency range (e.g., one or more of 3GPP LTE TDD frequency bands 41, 48, or 49). In another example, the filter 626 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 626 can be configured to communicate a first-direction of a selected channel within a 3GPP LTE TDD band or a 3GPP 5G TDD frequency band. In another example, the filter 626 can be configured to communicate a first-direction of a selected frequency range within a 3GPP LTE TDD frequency range or a first-direction of a 3GPP 5G TDD frequency range.

In another example, after being directed along the TDD first-direction path 649 of the TDD second path, the TDD first-direction signal can be amplified and filtered in accordance with the type of amplifiers and filters included along the TDD first-direction path. At this point, the TDD first-direction signal can be directed to the fourth switch 650. The fourth switch 650 can direct the TDD first-direction signal to the filter (e.g., a TDD BPF) 619. The filter 619 can direct the TDD first-direction signal to the multiplexer 614. The multiplexer 614 can be coupled to the second port 605. The TDD first-direction signal can be directed from the multiplexer 614 to the second port 605. The TDD first-direction signal can be directed from the second port 605 to the second antenna 604. The second antenna 604 can communicate the amplified and/or filtered TDD first-direction signal to a base station.

In another example, the second antenna 604 can receive a second-direction signal from a base station. The second port 605 can be configured to be coupled to the second antenna 604. The second port 605 can be coupled to the multiplexer 614. The second-direction signal received at the second antenna 604 from the base station can be directed to the multiplexer 614. The multiplexer 614 can direct the TDD second-direction signal, based on its frequency, to the fourth switch (e.g., a SPDT switch) 650.

In another example, the second-direction path 651 of the TDD second path can comprise one or more of a low-noise amplifier (LNA) 652, a variable attenuator 654, a filter (e.g., a TDD BPF) 656, or a power amplifier 658. In another example, the power amplifier 658 can comprise a variable gain power amplifier, a fixed gain power amplifier, or a gain block.

In another example, the filter 656 can be configured to pass one or more of a second-direction (e.g., a downlink direction) of a second frequency range (e.g., one or more of 3GPP LTE TDD frequency bands 41, 48, or 49). In another example, the filter 636 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 636 can be configured to communicate a second-direction of a selected channel within a 3GPP LTE TDD band or a 3GPP 5G TDD frequency band. In another example, the filter 636 can be configured to communicate a second-direction of a selected frequency range within a 3GPP LTE TDD frequency range or a second-direction of a 3GPP 5G TDD frequency range.

In another example, after being directed along the second-direction path of the TDD second path, the TDD second-direction signal can be amplified and filtered in accordance with the type of amplifiers and filters included along the TDD second-direction path. At this point, the TDD second-direction signal can be directed to the third switch (e.g., a SPDT switch) 640. The third switch 640 can direct the amplified and/or filtered TDD second-direction signal to the multiplexer 612. The multiplexer 612 can be coupled to the first port 603. The TDD second-direction signal can be directed from the multiplexer 612 to the first port 603. The TDD second-direction signal can be directed from the first port 603 to the first antenna 602. The first antenna 602 can communicate the amplified and/or filtered TDD second-direction signal to a wireless device.

In another example, a repeater can further comprise a single TDD sync detection module (TDD SDM) 610. The TDD SDM 610 can be configured to determine UL/DL configuration information for a first TDD signal and a second TDD signal. The UL/DL configuration information may be received at a different location within the repeater and communicated to the TDD SDM 610. The TDD SDM can be configured to detect UL/DL configuration information for the first TDD signal using one or more detectors 691*c* and for the second TDD signal using one or more detectors 693*c*. The one or more detectors 691*c* can be located between the filter 616 and the first switch 620. The one or more detectors 693*c* can be located between the filter 617 and the third switch 640.

In another example, the TDD SDM 610 can be configured to determine the UL/DL configuration information for the first TDD signal and the UL/DL configuration information for the second TDD signal in a same time period. In another example, the TDD SDM 610 can be configured to determine the UL/DL configuration information for the first TDD signal in a first time period and determine the UL/DL configuration information for the second TDD signal in a second time period, wherein the first time period does not overlap with the second time period.

In another example, the TDD SDM 610 can be configured to store the UL/DL configuration information for the first TDD signal or store the UL/DL configuration information for the second TDD signal. The TDD SDM 610 can be configured to use the UL/DL configuration information for the first TDD signal that is stored at the TDM SDM to reacquire UL/DL configuration information for the first TDD signal in a first subsequent time period, and use the UL/DL configuration information for the second TDD signal that is stored at the TDM SDM to reacquire UL/DL configuration information for the second TDD signal in a second subsequent time period.

In another example, a controller 606 can be configured to switch the first switch 620 via 691*a* to pass a first-direction TDD signal (e.g., an uplink TDD signal) from the filter 616 to the TDD first-direction path 621 of the first path and switch the second switch 630 to pass the first-direction TDD signal to the second port 605 via the filter 618. In another example, the controller 606 can be configured to switch the second switch 630 via 691*b* to pass a second-direction signal (e.g., a downlink TDD signal) from the second port 605 to the TDD second-direction path 631 and switch the first switch 620 to pass the second-direction TDD signal to the first port 603 via the filter 616.

In another example, a controller 606 can be configured to switch the third switch 640 via 693*a* to pass a first-direction TDD signal (e.g., an uplink TDD signal) from the filter 617 to the TDD first-direction path 641 of the second path and switch the fourth switch 650 to pass the first-direction TDD signal to the second port 605 via the filter 619. In another example, the controller 606 can be configured to switch the fourth switch 650 via 693*b* to pass a second-direction signal (e.g., a downlink TDD signal) from the second port 605 to the TDD second-direction path 651 and switch the third switch 640 to pass the second-direction TDD signal to the first port 603 via the filter 617.

In another example, the single TDD SDM 610 or the controller can comprise one or more of a modem, a field-programmable gate array (FPGA), or an application-specific integrated circuit (ASIC) that is configured to receive UL/DL configuration information from a base station or a UE and send a signal to a switch. The TDD SDM 610 can be configured to switch between a DL configuration and an UL configuration in a 1 millisecond (ms) subframe basis for 3GPP LTE. The TDD switch controller can be configured to switch between a DL configuration and an UL configuration on a symbol basis for 3GPP 5G, wherein the duration of a symbol can vary based on numerology.

In another example, the controller 606 can be configured to use the UL/DL configuration information for the first TDD signal to switch between the TDD first-direction signal of the first TDD signal and the TDD second-direction signal of the first TDD signal for the TDD first path. The controller 606 can be configured to use the UL/DL configuration information for the second TDD signal to switch between the second TDD first-direction signal of the second TDD signal and the second TDD second-direction signal of the second TDD signal for the TDD second path.

In another example, the TDD SDM 610 can be configured to receive synchronization information for the first TDD signal to enable the controller to switch between the first TDD first-direction signal and the first TDD second-direction signal, and receive synchronization information for the second TDD signal to enable the controller to switch between the second TDD first-direction signal and the second TDD second-direction signal. The synchronization information for the first TDD signal can be received from a base station transmitting the first TDD second-direction signal. The synchronization information for the second TDD signal can be received from a base station transmitting the second TDD second-direction signal.

In another example, the controller 606 can be configured to use the synchronization information for the first TDD signal and the UL/DL configuration information for the first TDD signal to switch between the first TDD first-direction signal and the first TDD second-direction signal for a subsequent time period. The controller 606 can be configured to use the synchronization information for the second TDD signal and the UL/DL configuration information for the second TDD signal to switch between the second TDD first-direction signal and the second TDD second-direction signal for a subsequent time period. In another example, the controller 606 can be configured to store the synchronization information for the first TDD signal or store the synchronization information for the second TDD signal.

In another example, the TDD SDM can be configured to use the synchronization information for the first TDD signal that is stored at the controller to reacquire synchronization information for the first TDD signal in a first subsequent time period or use the synchronization information for the second TDD signal that is stored at the controller to reacquire synchronization information for the second TDD signal in a second subsequent time period.

Figure 7:
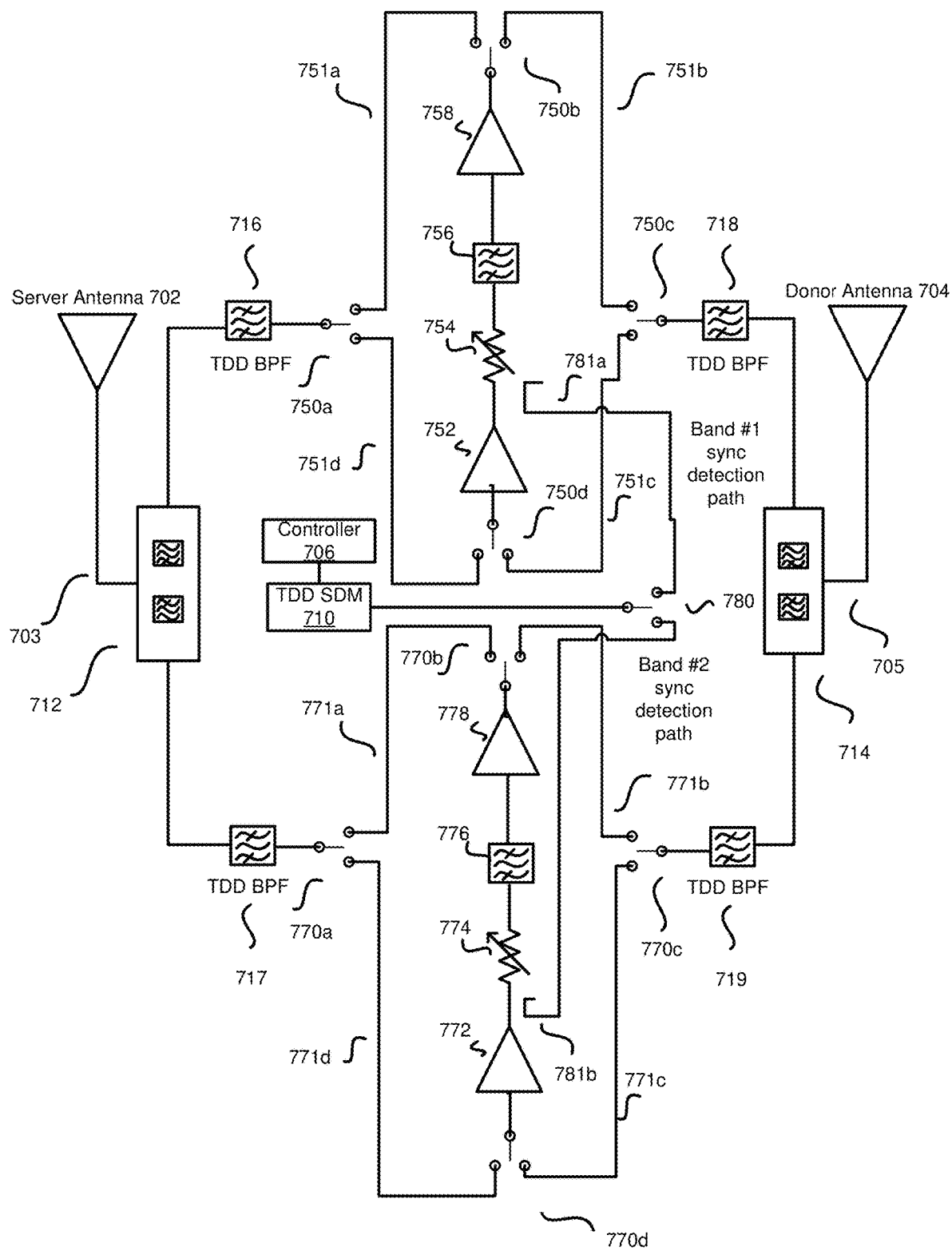
FIG. 7 illustrates a time division duplex (TDD) multiband repeater in accordance with an example.

In another example, as illustrated in FIG. 7, a repeater can be a time division duplex (TDD) repeater. The repeater can be configured to be coupled to a first antenna (e.g., a server antenna) 702 and a second antenna (e.g., a donor antenna) 704. The first antenna 702 can receive a first-direction signal (e.g., an uplink signal) from a wireless device (e.g., a UE). The first antenna 702 can be configured to be coupled to a first port (e.g., a server port) 703. The first port 703 can be coupled to a multiplexer (or a diplexer, a duplexer, a circulator, or a splitter) 712. The first-direction signal received at the first antenna 702 from the wireless device can be directed to multiplexer 712. The multiplexer 712 can direct the TDD first-direction signal, based on its frequency, to a filter 716 on a TDD first path or a filter 717 on a TDD second path.

In another example, the second antenna 704 can receive a second-direction signal from a base station. The second antenna 704 can be coupled to a second port (e.g., a donor port) 705. The second port 705 can be coupled to a multiplexer (or a diplexer, a duplexer, a circulator, or a splitter) 714. The second-direction signal received at the second antenna 704 from the base station can be directed to multiplexer 714. The multiplexer 714 can direct the TDD second-direction signal, based on its frequency, to a filter 718 on a TDD first path or a filter 719 on a TDD second path.

In another example, the TDD first path can comprise a filter (e.g., a TDD band-pass filter (BPF)) 716 that is configured to be coupled to the multiplexer 712 and a filter (e.g., a TDD BPF) 718 that is configured to be coupled to the multiplexer 714. The filter 716 can be configured to be coupled to a first switch 750*a* (e.g., a single-pole double-throw (SPDT) switch). The first switch 750*a* can be configured to a second switch 750*b* (e.g., a single-pole double-throw (SPDT) switch) via 751*a*. The second switch 750*b* can be configured to be coupled to a third switch 750*c* (e.g., a single-pole double-throw (SPDT) switch) via 751*b*. The third switch 750*c* can be configured to be coupled to a fourth switch 750*d* (e.g., a single-pole double-throw (SPDT) switch) via 751*c*. The fourth switch 750*d* can be configured to be coupled to the first switch 750*a* via 751*d*.

In another example, the fourth switch 750*d* can be configured to be coupled to an input of a first amplification and filtering path and the second switch 750*b* can be configured to be coupled to an output of the first amplification and filtering path. The first amplification and filtering path can comprise one or more of a low-noise amplifier (LNA) 752, a variable attenuator 754, a filter (e.g., a TDD band-pass filter (BPF)) 756, or a power amplifier 758. In another example, the power amplifier 758 can comprise a variable gain power amplifier, a fixed gain power amplifier, or a gain block.

In another example, the filter 756 can be configured to pass one or more of a first-direction (e.g., an uplink direction) of a first frequency range (e.g., one or more of 3GPP LTE TDD frequency bands 41, 48, or 49). In another example, the filter 756 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 756 can be configured to communicate a first-direction of a selected channel within a 3GPP LTE TDD band or a 3GPP 5G TDD frequency band. In another example, the filter 756 can be configured to communicate a first-direction of a selected frequency range within a 3GPP LTE TDD frequency range or a first-direction of a 3GPP 5G TDD frequency range.

In another example, after being directed along the TDD first amplification and filtering path, the TDD first-direction signal can be amplified and filtered in accordance with the type of amplifiers and filters included along the TDD first amplification and filtering path. At this point, the TDD first-direction signal can be directed to the second switch 750*b*. The second switch 750*b* can direct the TDD first-direction signal to the filter (e.g., a TDD BPF) 718 via the third switch 750*c*. The filter 718 can direct the TDD first-direction signal to the multiplexer 714. The multiplexer 714 can be coupled to the second port 705. The TDD first-direction signal can be directed from the multiplexer 714 to the second port 705. The TDD first-direction signal can be directed from the second port 705 to the second antenna 704. The second antenna 704 can communicate the amplified and/or filtered TDD first-direction signal to a base station.

In another example, the second antenna 704 can receive a second-direction signal from a base station. The second port 705 can be configured to be coupled to the second antenna 704. The second port 705 can be coupled to the multiplexer 714. The second-direction signal received at the second antenna 704 from the base station can be directed to the multiplexer 714. The multiplexer 714 can direct the TDD second-direction signal, based on its frequency, to the third switch 750*c* via the filter 718. The TDD second-direction signal can be further directed to the input of the LNA 752 via the fourth switch 750*d*.

In another example, the filter 756 can be configured to pass one or more of a second-direction (e.g., a downlink direction) of a first frequency range (e.g., one or more of 3GPP LTE TDD frequency bands 41, 48, or 49). In another example, the filter 756 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 756 can be configured to communicate a second-direction of a selected channel within a 3GPP LTE TDD band or a 3GPP 5G TDD frequency band. In another example, the filter 756 can be configured to communicate a second-direction of a selected frequency range within a 3GPP LTE TDD frequency range or a second-direction of a 3GPP 5G TDD frequency range.

In another example, after being directed along the TDD first amplification and filtering path, the TDD second-direction signal can be amplified and filtered in accordance with the type of amplifiers and filters included along the TDD first amplification and filtering path. At this point, the TDD second-direction signal can be directed to the second switch 750*b*. The second switch 750*b* can direct the amplified and/or filtered TDD second-direction signal to the multiplexer 716 via the first switch 750a. The multiplexer 712 can be coupled to a first port 703. The TDD second-direction signal can be directed from the multiplexer 712 to the first port 703. The TDD second-direction signal can be directed from the first port 703 to the first antenna 702. The first antenna 702 can communicate the amplified and/or filtered TDD second-direction signal to a wireless device.

In another example, the TDD second path can comprise a filter (e.g., a TDD band-pass filter (BPF)) 717 that is configured to be coupled to the multiplexer 712 and a filter (e.g., a TDD BPF) 719 that is configured to be coupled to the multiplexer 714. The filter 717 can be configured to be coupled to a fifth switch 770a (e.g., a single-pole double-throw (SPDT) switch). The fifth switch 770a can be configured to be coupled to a sixth switch 770b (e.g., a single-pole double-throw (SPDT) switch) via 771a. The sixth switch 770b can be configured to be coupled to a seventh switch 770c (e.g., a single-pole double-throw (SPDT) switch) via 771b. The seventh switch 770c can be configured to be coupled to an eighth switch 770d (e.g., a single-pole double-throw (SPDT) switch) via 771c. The eighth switch 770d can be configured to be coupled to the fifth switch 770a via 771d.

In another example, the eighth switch 770d can be configured to be coupled to an input of a second amplification and filtering path and the sixth switch 770b can be configured to be coupled to an output of the second amplification and filtering path. The second amplification and filtering path can comprise one or more of a low-noise amplifier (LNA) 772, a variable attenuator 774, a filter (e.g., a TDD band-pass filter (BPF)) 776, or a power amplifier 778. In another example, the power amplifier 778 can comprise a variable gain power amplifier, a fixed gain power amplifier, or a gain block.

In another example, the filter 776 can be configured to pass one or more of a first-direction (e.g., an uplink direction) of a second frequency range (e.g., one or more of 3GPP LTE TDD frequency bands 41, 48, or 49). In another example, the filter 776 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 776 can be configured to communicate a first-direction of a selected channel within a 3GPP LTE TDD band or a 3GPP 5G TDD frequency band. In another example, the filter 776 can be configured to communicate a first-direction of a selected frequency range within a 3GPP LTE TDD frequency range or a first-direction of a 3GPP 5G TDD frequency range.

In another example, after being directed along the TDD second amplification and filtering path, the TDD first-direction signal can be amplified and filtered in accordance with the type of amplifiers and filters included along the TDD second amplification and filtering path. At this point, the TDD first-direction signal can be directed to the eighth switch 770d. The eighth switch 770d can direct the TDD first-direction signal to the filter (e.g., a TDD BPF) 719 via the seventh switch 770c. The filter 718 can direct the TDD first-direction signal to the multiplexer 714. The multiplexer 714 can be coupled to the second port 705. The TDD first-direction signal can be directed from the multiplexer 714 to the second port 705. The TDD first-direction signal can be directed from the second port 705 to the second antenna 704. The second antenna 704 can communicate the amplified and/or filtered TDD first-direction signal to a base station.

In another example, the second antenna 704 can receive a second-direction signal from a base station. The second port 705 can be configured to be coupled to the second antenna 704. The second port 705 can be coupled to the multiplexer 714. The second-direction signal received at the second antenna 704 from the base station can be directed to the multiplexer 714. The multiplexer 714 can direct the TDD second-direction signal, based on its frequency, to the seventh switch 770c via the filter 719. The TDD second-direction signal can be further directed to the input of the LNA 772 via the eighth switch 770d.

In another example, the filter 776 can be configured to pass one or more of a second-direction (e.g., a downlink direction) of a second frequency range (e.g., one or more of 3GPP LTE TDD frequency bands 41, 48, or 49). In another example, the filter 776 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 776 can be configured to communicate a second-direction of a selected channel within a 3GPP LTE TDD band or a 3GPP 5G TDD frequency band. In another example, the filter 776 can be configured to communicate a second-direction of a selected frequency range within a 3GPP LTE TDD frequency range or a second-direction of a 3GPP 5G TDD frequency range.

In another example, after being directed along the TDD second amplification and filtering path, the TDD second-direction signal can be amplified and filtered in accordance with the type of amplifiers and filters included along the TDD second amplification and filtering path. At this point, the TDD second-direction signal can be directed to the sixth switch 770b. The sixth switch 770b can direct the amplified and/or filtered TDD second-direction signal to the multiplexer 712 via the fifth switch 770a and the filter 717. The multiplexer 712 can be coupled to a first port 703. The TDD second-direction signal can be directed from the multiplexer 712 to the first port 703. The TDD second-direction signal can be directed from the first port 703 to the first antenna 702. The first antenna 702 can communicate the amplified and/or filtered TDD second-direction signal to a wireless device.

In another example, the first amplification and filtering path can be configured to switch between amplifying and filtering a first TDD signal in a first frequency range of a first TDD first-direction signal and a first TDD signal in a first frequency range of a first TDD second-direction signal.

In another example, the second amplification and filtering path can be configured to switch between amplifying and filtering a second TDD signal in a second frequency range of a second TDD first-direction signal and a second TDD signal in a second frequency range of a second TDD second-direction signal.

In another example, a repeater can further comprise a single TDD sync detection module (TDD SDM) 710 that can be configured as previously discussed with respect to TDD SDM 610.

In another example, the TDD SDM 710 can be coupled to a ninth switch (e.g., a SPDT switch) 780. The ninth switch 780 can be coupled to one or more detectors 781a and one or more detectors 781b. The TDD SDM 710 can be configured to detect UL/DL configuration information for the first TDD signal using the one or more detectors 781*a* and for the second TDD signal using the one or more detectors 781*b*. The one or more detectors 781*a* can be configured to detect the first TDD signal between the LNA 752 and the variable attenuator 754. The one or more detectors 781*b* can be configured to detect the second TDD signal between the LNA 772 and the variable attenuator 774.

In another example, a repeater can comprise a controller 706 that can be configured as previously discussed with respect to the controller 606.

In another example, a repeater can further comprise a controller 706 that can be configured to switch the first switch 750*a* and a fourth switch 750*d* to pass a first-direction TDD signal (e.g., an uplink TDD signal) from the filter 716 to the first amplification and filtering path and switch the second switch 750*b* and the third switch 750*c* to pass the first-direction TDD signal from the output of the power amplifier 758 to the second port 705 via the filter 718 and the multiplexer 714.

In another example, the controller 706 can be configured to switch the third switch 750*c* and the fourth switch 750*d* to pass a second-direction signal (e.g., a downlink TDD signal) from the second port 705 to the TDD first amplification and filtering path and switch the second switch 750*b* and the first switch 750*a* to pass the second-direction TDD signal to the first port 703 via the filter 716 and the multiplexer 712.

In another example, the controller 706 can be configured to switch the fifth switch 770*a* and an eighth switch 770*d* to pass a first-direction TDD signal (e.g., an uplink TDD signal) from the filter 717 to the second amplification and filtering path and switch the sixth switch 770*b* and the seventh switch 770*c* to pass the first-direction TDD signal from the output of the power amplifier 778 to the second port 705 via the filter 719 and the multiplexer 714.

In another example, the controller 706 can be configured to switch the seventh switch 770*c* and the eighth switch 770*d* to pass a second-direction signal (e.g., a downlink TDD signal) from the second port 705 to the TDD second amplification and filtering path and switch the sixth switch 770*b* and the fifth switch 770*a* to pass the second-direction TDD signal to the first port 703 via the filter 717 and the multiplexer 712.

Figure 8:
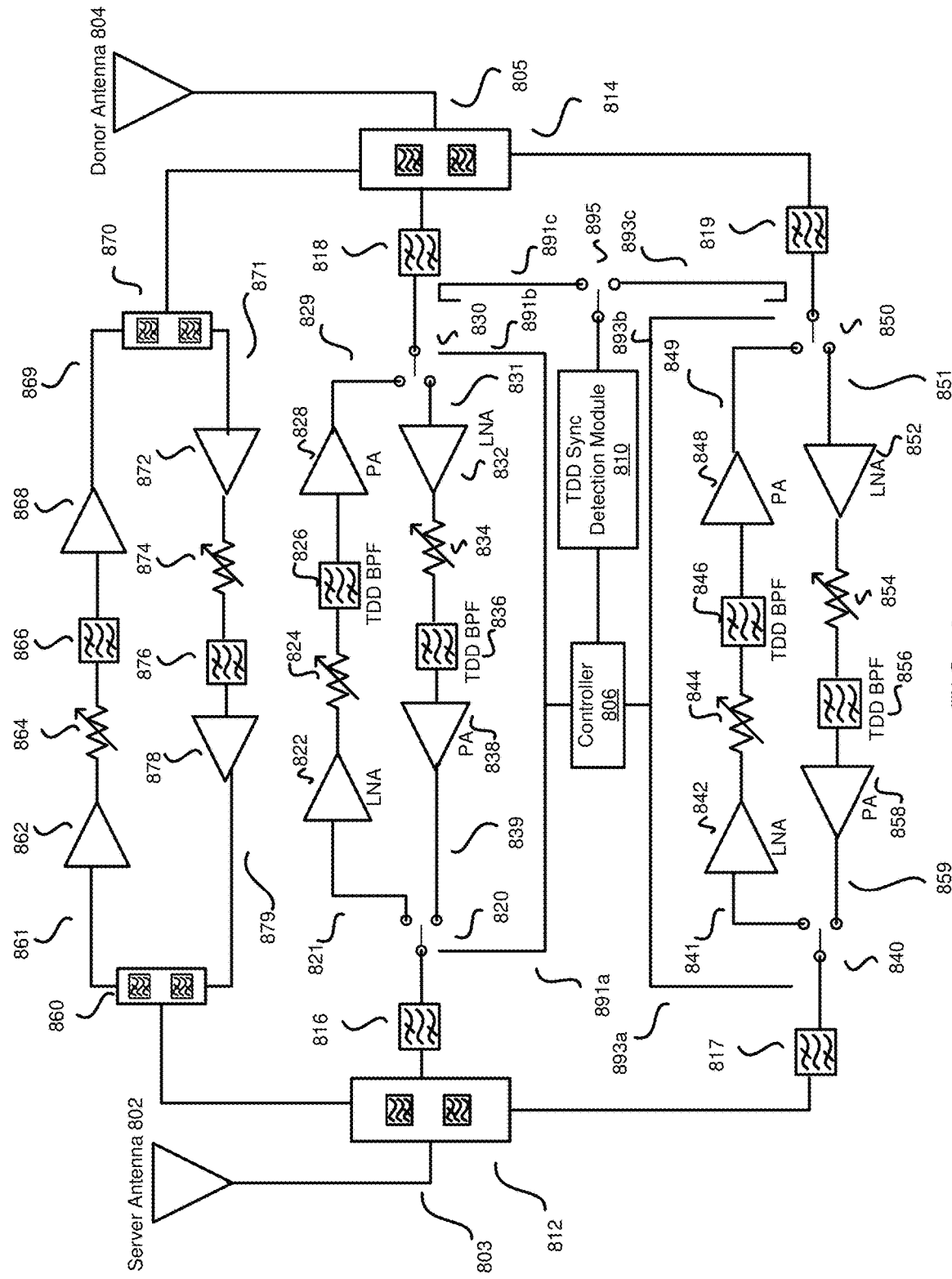
FIG. 8 illustrates a frequency division duplex (FDD)/time division duplex (TDD) multiband repeater in accordance with an example.

As illustrated in FIG. 8, in another example, a repeater can be a frequency division duplex (FDD)/time division duplex (TDD) integrated repeater. The repeater can be configured to be connected to a first antenna (e.g., a server antenna) 802 and a second antenna (e.g., a donor antenna) 804. The first antenna 802 can receive a first-direction signal (e.g., an uplink signal) from a wireless device. The first antenna 802 can be configured to be coupled to a first port (e.g., a server port) 803. The first port 803 can be coupled to a multiplexer 812. The first-direction signal received at the first antenna 802 from the wireless device can be directed to the multiplexer 812. The multiplexer 812 can direct an FDD first-direction signal, based on its frequency, to an FDD first-direction path to via a duplexer 860.

In another example, the FDD first-direction signal can be directed along the FDD first-direction path 861. The FDD first-direction path can comprise one or more of a low-noise amplifier (LNA) 862, a variable attenuator 864, an FDD first-direction filter (e.g., an FDD uplink band-pass filter (BPF)) 866, or a power amplifier 868. In another example, the power amplifier 868 can comprise a variable gain power amplifier, a fixed gain power amplifier, or a gain block.

The FDD first-direction filter 866 can be configured to pass one or more of a first-direction (e.g., an uplink direction) of a first frequency range (e.g., one or more of 3GPP FDD frequency bands 2, 4, 5, 12, 13, 17, 25, 26, or 71). In another example, the FDD first-direction filter 866 can be configured to pass one or more of a first-direction (e.g., an uplink direction) of 3GPP LTE FDD frequency bands 1-28, 30, 31, 65, 66, 68, 70-74, or 85, or 3GPP NR FDD frequency bands n1-n3, n5, n7, n8, n12, n20, n25, n28, n65, n66, n70, n71, or n74. In another example, the FDD first-direction filter 866 can be configured to pass a first-direction of a selected channel within a 3GPP FDD band. The first-direction can be an uplink direction or a downlink direction.

In another example, after being directed along the first-direction path 869, the FDD first-direction signal can be amplified and filtered in accordance with the type of amplifiers and filters including along the FDD amplification and filtering path 861. The first-direction signal can be further directed to the multiplexer 814 via the duplexer 870. The multiplexer 814 can direct the amplified and/or filtered first-direction signal from the duplexer 870 to the second port 805. The first-direction signal can be directed from the second port 805 to the second antenna 804. The second antenna 804 can communicate the amplified and/or filtered FDD first-direction signal to a base station.

In another example, the second antenna 804 can receive an FDD second-direction signal from a base station. The second antenna 804 can be coupled to a second port 805. The second port 805 can be coupled to a multiplexer 814. The FDD second-direction signal received at the donor antenna 804 from the base station can be directed to the multiplexer 814. The multiplexer 814 can direct the FDD second-direction signal, based on its frequency, to an FDD second-direction path 871 via the duplexer 870.

In another example, the FDD second-direction signal can be directed along the FDD second-direction path. The FDD second-direction path can comprise one or more of a low-noise amplifier (LNA) 872, a variable attenuator 874, an FDD second-direction filter (e.g., an FDD DL band-pass filter (BPF)) 876, or a power amplifier 878. In another example, the power amplifier 878 can comprise a variable gain power amplifier, a fixed gain power amplifier, or a gain block.

The FDD second-direction filter 876 can be configured to pass one or more of a second-direction (e.g., a downlink direction) of an FDD frequency range (e.g., one or more of 3GPP FDD frequency bands 2, 4, 5, 12, 13, 17, 25, 26, or 71). In another example, the FDD second-direction filter 876 can be configured to pass one or more of a second-direction (e.g., a downlink direction) of 3GPP LTE FDD frequency bands 1-28, 30, 31, 65, 66, 68, 70-74, or 85, or 3GPP NR FDD frequency bands n1-n3, n5, n7, n8, n12, n20, n25, n28, n65, n66, n70, n71, or n74. In another example, the FDD second-direction filter 876 can be configured to pass a second direction of a selected channel within a 3GPP FDD band. The first-direction can be an uplink direction or a downlink direction.

In another example, after being directed along the second-direction path 879, the FDD second-direction signal can be amplified and filtered in accordance with the type of amplifiers and filters including along the FDD second-direction amplification and filtering path. The second-direction signal can be further directed to the multiplexer 812 via the duplexer 860. The multiplexer 812 can direct the amplified and/or filtered second-direction signal from the duplexer 860 to the first port 803. The second-direction signal can be directed from the first port 803 to the first antenna 802. The first antenna 802 can communicate the amplified and/or filtered FDD second-direction signal to a wireless device.

In another example, the multiplexer 812 can direct a TDD first-direction signal, based on its frequency, to a TDD first path or a TDD second path. In another example, the multiplexer 814 can direct a TDD second-direction signal, based on its frequency, to a TDD first path or a TDD second path.

In another example, the TDD first path can comprise a filter (e.g., a TDD band-pass filter (BPF)) 816 that is configured to be coupled to the multiplexer 812 and a filter (e.g., a TDD BPF) 818 that is configured to be coupled to the multiplexer 814. The filter 816 can be configured to be coupled to a first switch 820 (e.g., a single-pole double-throw (SPDT) switch). The first switch 820 can be configured to be coupled to a first-direction path 821 of the TDD first path and a second-direction path 839 of the TDD first path. The filter 818 can be configured to be coupled to a second switch 830 (e.g., a single-pole double-throw (SPDT) switch). The second switch 830 can be configured to be coupled to a second-direction path 831 of the TDD first path and a first-direction path 829 of the TDD first path.

In another example, the first-direction path of the TDD first path can comprise one or more of a low-noise amplifier (LNA) 822, a variable attenuator 824, a filter (e.g., a TDD band-pass filter (BPF)) 826, or a power amplifier 828. In another example, the power amplifier 828 can comprise a variable gain power amplifier, a fixed gain power amplifier, or a gain block.

In another example, the filter 826 can be configured to pass one or more of a first-direction (e.g., an uplink direction) of a first frequency range (e.g., one or more of 3GPP LTE TDD frequency bands 41, 48, or 49). In another example, the filter 826 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 826 can be configured to communicate a first direction of a selected channel within a 3GPP LTE TDD band or a 3GPP 5G TDD frequency band. In another example, the filter 826 can be configured to communicate a first direction of a selected frequency range within a 3GPP LTE TDD frequency range or a first direction of a 3GPP 5G TDD frequency range.

In another example, after being directed along the TDD first-direction path of the TDD first path, the TDD first-direction signal can be amplified and filtered in accordance with the type of amplifiers and filters included along the TDD first-direction path. At this point, the TDD first-direction signal can be directed to the second switch 830. The second switch 830 can direct the TDD first-direction signal to the filter (e.g., a TDD BPF) 818. The filter 818 can direct the TDD first-direction signal to the multiplexer 814 and to the second port 805. The TDD first-direction signal can be directed from the second port 805 to the second antenna 804. The second antenna 804 can communicate the amplified and/or filtered TDD first-direction signal to a base station.

In another example, the second antenna 804 can receive a second-direction signal from a base station. The second-direction signal received at the second antenna 804 from the base station can be directed to the multiplexer 814. The multiplexer 814 can direct the TDD second-direction signal, based on its frequency, to the second switch (e.g., a SPDT switch) 830.

In another example, the second-direction path 831 of the TDD first path can comprise one or more of a low-noise amplifier (LNA) 832, a variable attenuator 834, a filter (e.g., a TDD BPF) 836, or a power amplifier 838. In another example, the power amplifier 838 can comprise a variable gain power amplifier, a fixed gain power amplifier, or a gain block.

In another example, the filter 836 can be configured to pass one or more of a second-direction (e.g., a downlink direction) of a first frequency range (e.g., one or more of 3GPP LTE TDD frequency bands 41, 48, or 49). In another example, the filter 836 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 836 can be configured to communicate a second direction of a selected channel within a 3GPP LTE TDD band or a 3GPP 5G TDD frequency band. In another example, the filter 836 can be configured to communicate a second direction of a selected frequency range within a 3GPP LTE TDD frequency range or a second direction of a 3GPP 5G TDD frequency range.

In another example, after being directed along the second-direction path of the TDD first path, the TDD second-direction signal can be amplified and filtered in accordance with the type of amplifiers and filters included along the TDD second-direction path. At this point, the TDD second-direction signal can be directed to the first switch (e.g., a SPDT switch) 820. The first switch 820 can direct the amplified and/or filtered TDD second-direction signal to the multiplexer 812 via the filter 816. The TDD second-direction signal can be directed from the multiplexer 812 to the first port 803 and to the first antenna 802. The first antenna 802 can communicate the amplified and/or filtered TDD second-direction signal to a wireless device.

In another example, the TDD second path can comprise a filter (e.g., a TDD band-pass filter (BPF)) 817 that is configured to be coupled to the multiplexer 812 and a filter (e.g., a TDD BPF) 819 that is configured to be coupled to the multiplexer 814. The filter 817 can be configured to be coupled to a third switch 840 (e.g., a single-pole double-throw (SPDT) switch). The third switch 840 can be configured to be coupled to a first-direction path 841 of the TDD second path and a second-direction path 859 of the TDD second path. The filter 817 can be configured to be coupled to a fourth switch 850 (e.g., a single-pole double-throw (SPDT) switch). The fourth switch 850 can be configured to be coupled to a second-direction path 851 of the TDD second path and a first-direction path 849 of the TDD second path.

In another example, the first-direction path of the TDD second path can comprise one or more of a low-noise amplifier (LNA) 842, a variable attenuator 844, a filter (e.g., a TDD band-pass filter (BPF)) 846, or a power amplifier 848. In another example, the power amplifier 848 can comprise a variable gain power amplifier, a fixed gain power amplifier, or a gain block.

In another example, the filter 846 can be configured to pass one or more of a first-direction (e.g., an uplink direction) of a second frequency range (e.g., one or more of 3GPP LTE TDD frequency bands 41, 48, or 49). In another example, the filter 826 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 826 can be configured to communicate a first direction of a selected channel within a 3GPP LTE TDD band or a 3GPP 5G TDD frequency band. In another example, the filter 826 can be configured to communicate a first direction of a selected frequency range within a 3GPP LTE TDD frequency range or a first direction of a 3GPP 5G TDD frequency range.

In another example, after being directed along the TDD first-direction path 849 of the TDD second path, the TDD first-direction signal can be amplified and filtered in accordance with the type of amplifiers and filters included along the TDD first-direction path. At this point, the TDD first-direction signal can be directed to the fourth switch 850. The fourth switch 850 can direct the TDD first-direction signal to the filter (e.g., a TDD BPF) 819. The filter 819 can direct the TDD first-direction signal to the multiplexer 814 and the second port 805. The TDD first-direction signal can be directed from the second port 805 to the second antenna 804. The second antenna 804 can communicate the amplified and/or filtered TDD first-direction signal to a base station.

In another example, a second-direction signal received at the second antenna 804 from the base station can be directed to the multiplexer 814. The multiplexer 814 can direct the TDD second-direction signal, based on its frequency, to the fourth switch (e.g., a SPDT switch) 850.

In another example, the second-direction path 851 of the TDD second path can comprise one or more of a low-noise amplifier (LNA) 852, a variable attenuator 854, a filter (e.g., a TDD BPF) 856, or a power amplifier 858. In another example, the power amplifier 858 can comprise a variable gain power amplifier, a fixed gain power amplifier, or a gain block.

In another example, the filter 856 can be configured to pass one or more of a second-direction (e.g., a downlink direction) of a second frequency range (e.g., one or more of 3GPP LTE TDD frequency bands 41, 48, or 49). In another example, the filter 856 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 856 can be configured to communicate a second direction of a selected channel within a 3GPP LTE TDD band or a 3GPP 5G TDD frequency band. In another example, the filter 856 can be configured to communicate a second direction of a selected frequency range within a 3GPP LTE TDD frequency range or a second direction of a 3GPP 5G TDD frequency range.

In another example, after being directed along the second-direction path of the TDD second path, the TDD second-direction signal can be amplified and filtered in accordance with the type of amplifiers and filters included along the TDD second-direction path. At this point, the TDD second-direction signal can be directed to the third switch (e.g., a SPDT switch) 840. The third switch 840 can direct the amplified and/or filtered TDD second-direction signal to the multiplexer 812 via the filter 817. The TDD second-direction signal can be directed from the multiplexer 812 to the first port 803. The TDD second-direction signal can be directed from the first port 803 to the first antenna 802. The first antenna 802 can communicate the amplified and/or filtered TDD second-direction signal to a wireless device.

In another example, a repeater can further comprise a single TDD sync detection module (TDD SDM) 810 that can be configured as previously discussed with respect to TDD SDM 610. In another example, the TDD SDM 810 can be configured to detect UL/DL configuration information for the first TDD signal using one or more detectors 891c and for the second TDD signal using one or more detectors 893c. The one or more detectors 891c can be located between the filter 816 and the first switch 820. The one or more detectors 893c can be located between the filter 817 and the third switch 840.

In another example, a repeater can comprise a controller 806 that can be configured as previously discussed with respect to the controller 606.

In another example, the controller 806 can be configured to switch the first switch 820 via 891a to pass a first-direction TDD signal (e.g., an uplink TDD signal) from the filter 816 to the TDD first-direction path 821 of the first path and switch the second switch 830 to pass the first-direction TDD signal to the second port 805 via the filter 818. In another example, the controller 806 can be configured to switch the second switch 830 via 891b to pass a second-direction signal (e.g., a downlink TDD signal) from the second port 805 to the TDD second-direction path 831 and switch the first switch 820 to pass the second-direction TDD signal to the first port 803 via the filter 816.

In another example, a controller 806 can be configured to switch the third switch 840 via 893a to pass a first-direction TDD signal (e.g., an uplink TDD signal) from the filter 817 to the TDD first-direction path 841 of the second path and switch the fourth switch 850 to pass the first-direction TDD signal to the second port 805 via the filter 819. In another example, the controller 806 can be configured to switch the fourth switch 850 via 893b to pass a second-direction signal (e.g., a downlink TDD signal) from the second port 805 to the TDD second-direction path 851 and switch the third switch 840 to pass the second-direction TDD signal to the first port 803 via the filter 817.

In another example, the repeater can further comprise m additional first-direction FDD amplification and filtering paths and m additional second-direction FDD amplification and filtering paths, wherein m can be an integer greater than or equal to 0. In another example, the repeater can further comprise n additional TDD amplification and filtering paths, wherein n can be an integer greater than or equal to 0.

In another example, each of the TDD amplification and filtering paths can comprise an amplification and filtering path configured to switch between amplification and filtering of a first-direction TDD signal and a second-direction TDD signal.

Figure 9:
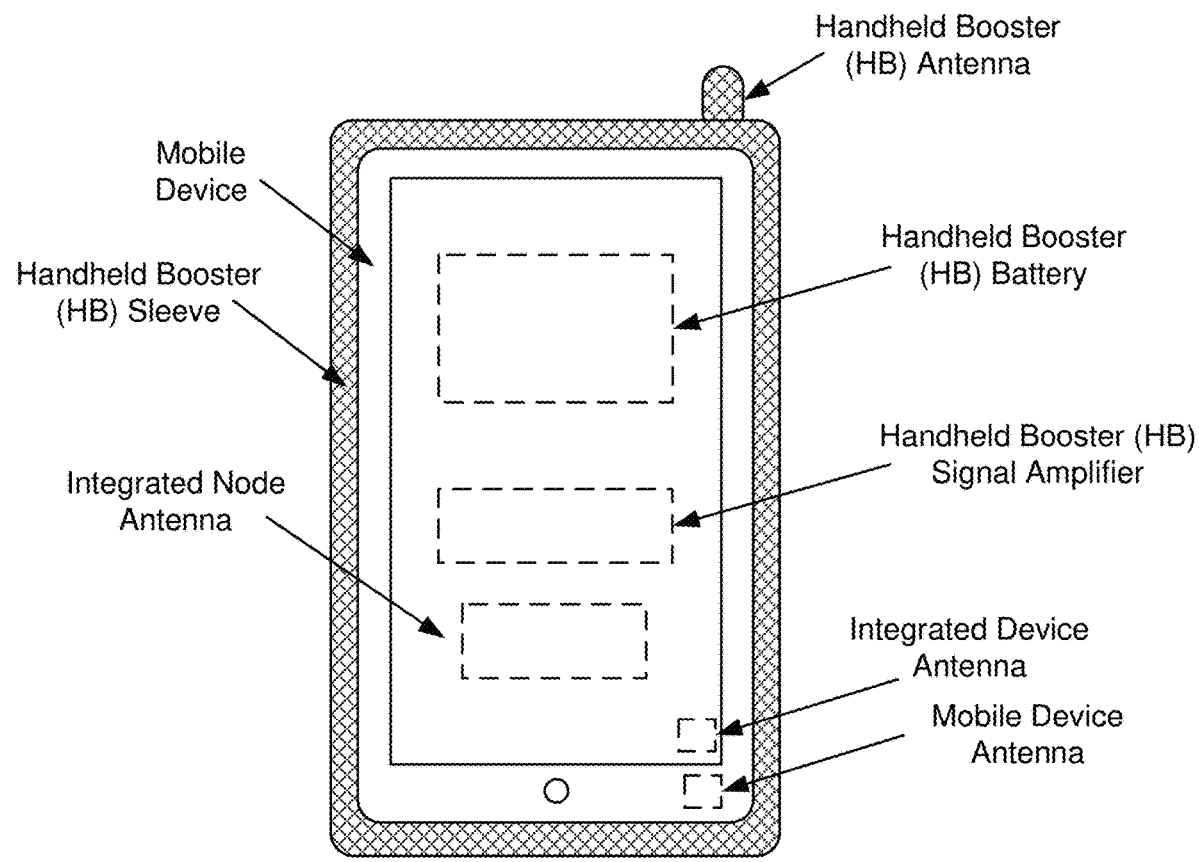
FIG. 9 illustrates a handheld booster in communication with a wireless device in accordance with an example.

While various embodiments described herein, and illustrated in FIGS. 1-8, have been described with respect to a cellular signal amplifier with a donor antenna and a server antenna, this is not intended to be limiting. A repeater can also be accomplished using a handheld booster, as illustrated in FIG. 9. The handheld booster can include an integrated device antenna and an integrated node antenna that are typically used in place of the server antenna and the donor antenna, respectively.

Figure 10:
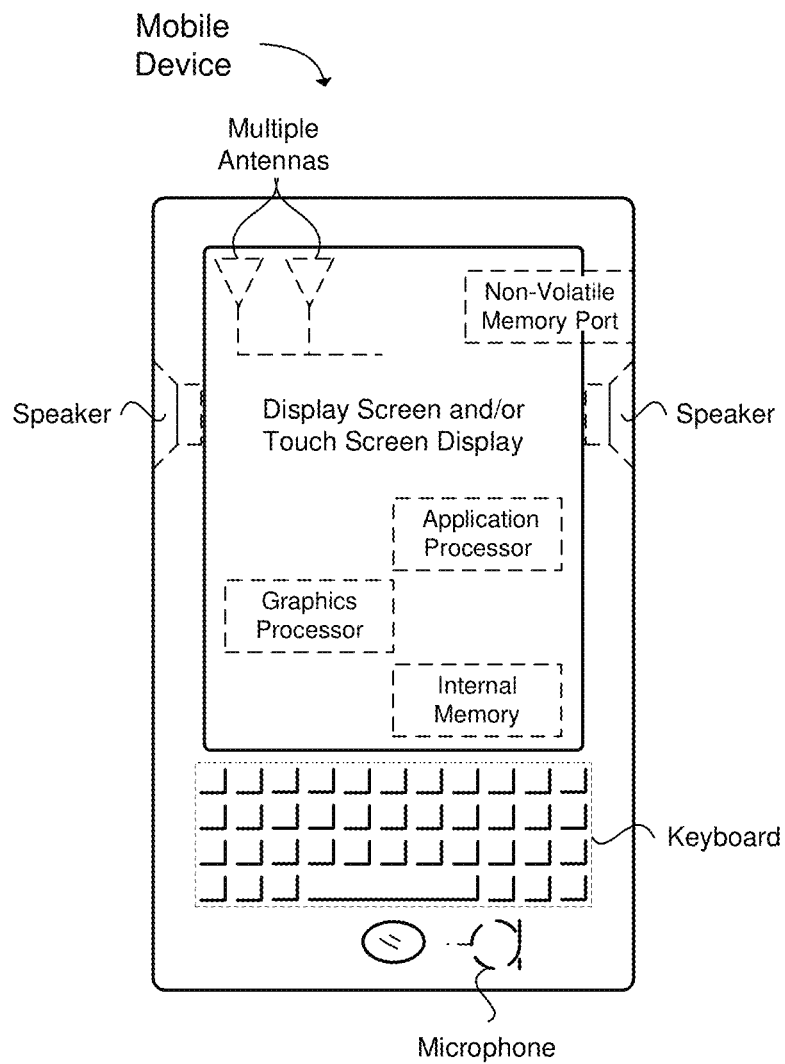
FIG. 10 illustrates a user equipment (UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 11:
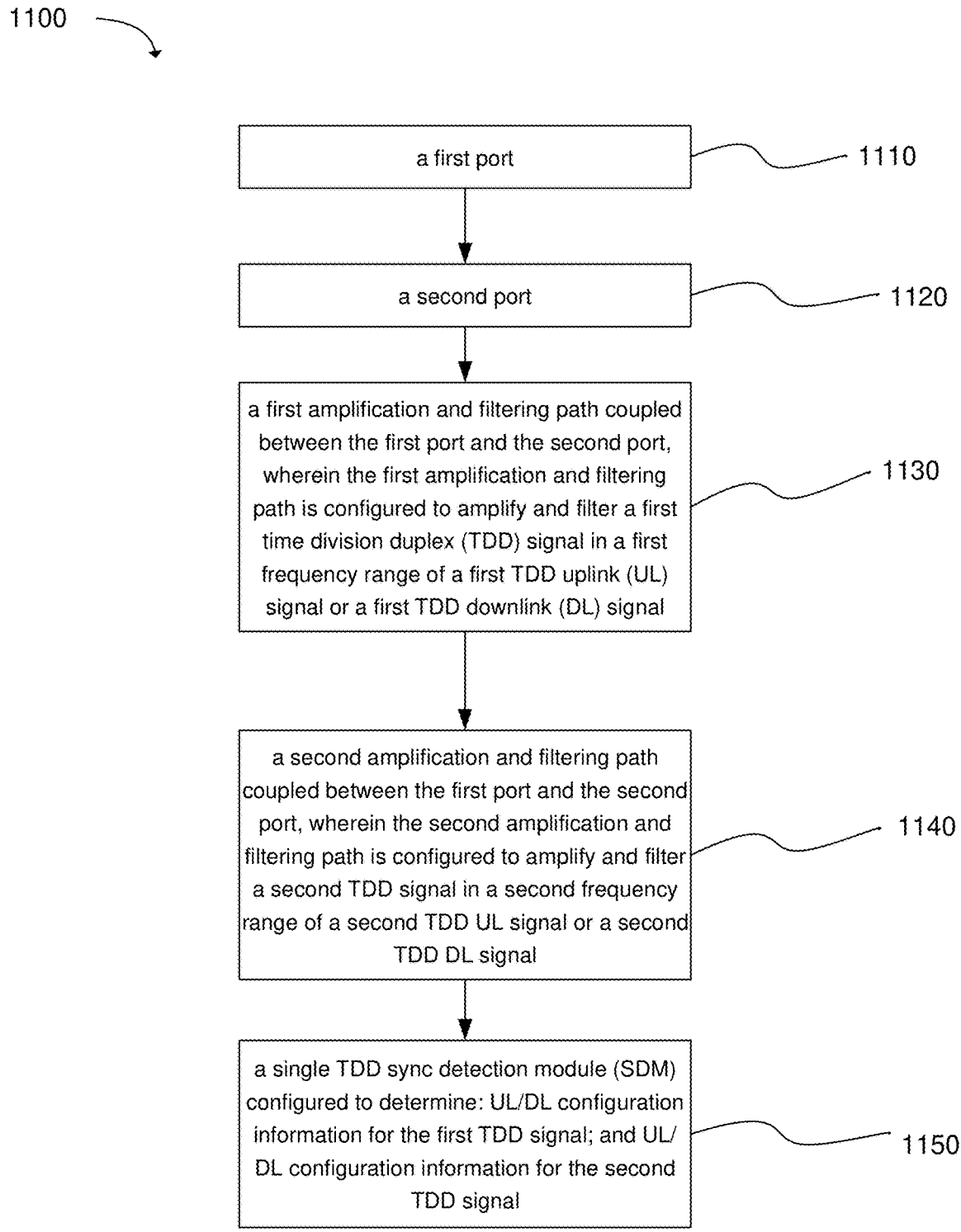
FIG. 11 depicts a repeater in accordance with an example.

Another example provides a repeater 1100, as shown in the flow chart in FIG. 11. The repeater can comprise: a first port, as shown in block 1110. The repeater can comprise: a second port, as shown in block 1120. The repeater can comprise a first amplification and filtering path coupled between the first port and the second port, wherein the first amplification and filtering path is configured to amplify and filter a first time division duplex (TDD) signal in a first frequency range of a first TDD uplink (UL) signal or a first TDD downlink (DL) signal, as shown in block 1130. The repeater can comprise a second amplification and filtering path coupled between the first port and the second port, wherein the second amplification and filtering path is configured to amplify and filter a second TDD signal in a second frequency range of a second TDD UL signal or a second TDD DL signal, as shown in block 1140. The repeater can comprise a single TDD sync detection module (SDM) configured to determine: UL/DL configuration information for the first TDD signal; and UL/DL configuration information for the second TDD signal, as shown in block 1150.

Figure 12:
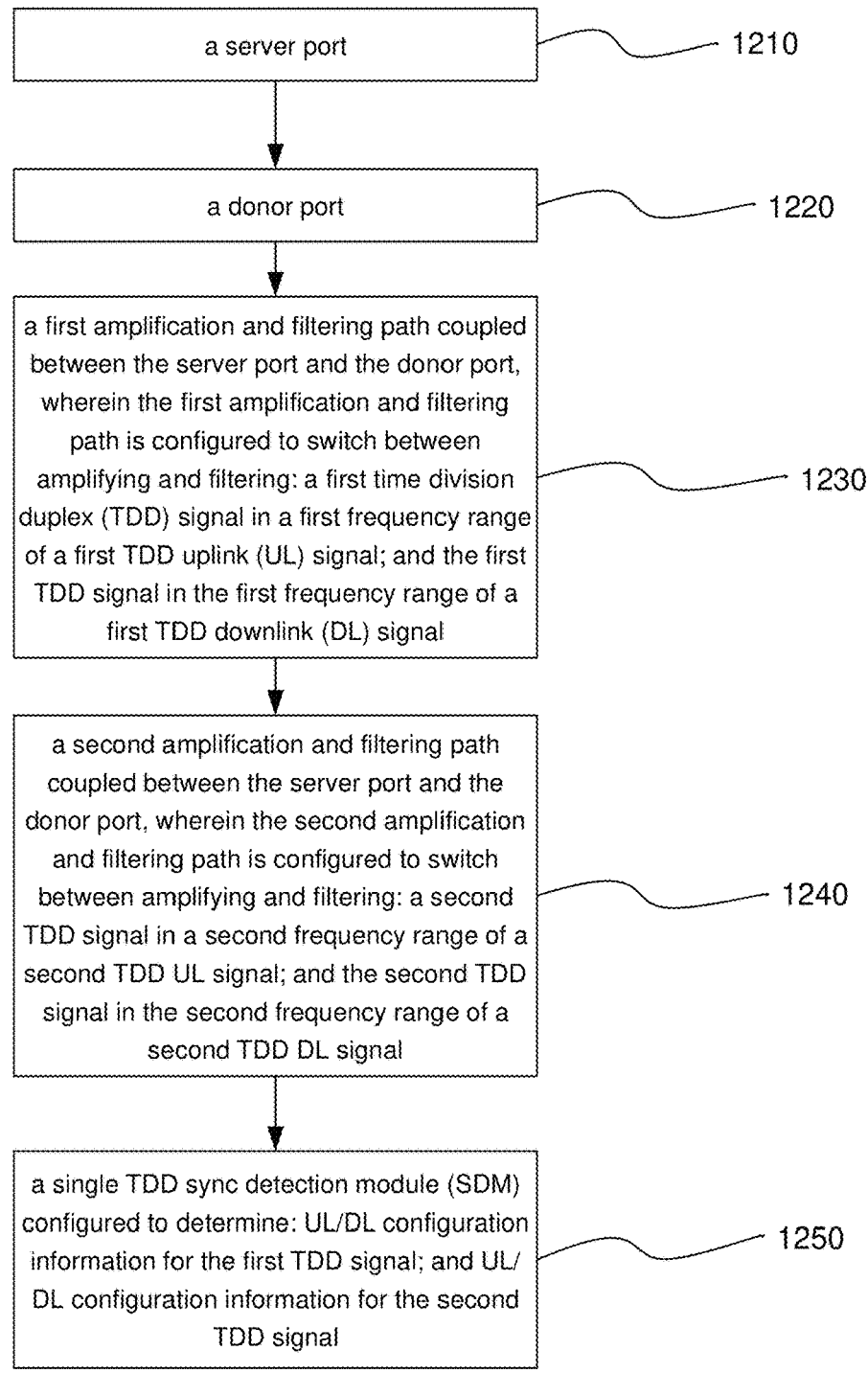
FIG. 12 depicts a repeater in accordance with an example.

Another example provides a repeater 1200, as shown in the flow chart in FIG. 12. The repeater can comprise a server port, as shown in block 1210. The repeater can comprise a donor port, as shown in block 1220. The repeater can comprise a first amplification and filtering path coupled between the server port and the donor port, wherein the first amplification and filtering path is configured to switch between amplifying and filtering: a first time division duplex (TDD) signal in a first frequency range of a first TDD uplink (UL) signal; and the first TDD signal in the first frequency range of a first TDD downlink (DL) signal, as shown in block 1230. The repeater can comprise a second amplification and filtering path coupled between the server port and the donor port, wherein the second amplification and filtering path is configured to switch between amplifying and filtering: a second TDD signal in a second frequency range of a second TDD UL signal; and the second TDD signal in the second frequency range of a second TDD DL signal, as shown in block 1240. The repeater can comprise a single TDD sync detection module (SDM) configured to determine: UL/DL configuration information for the first TDD signal; and UL/DL configuration information for the second TDD signal, as shown in block 1250.

Figure 13:
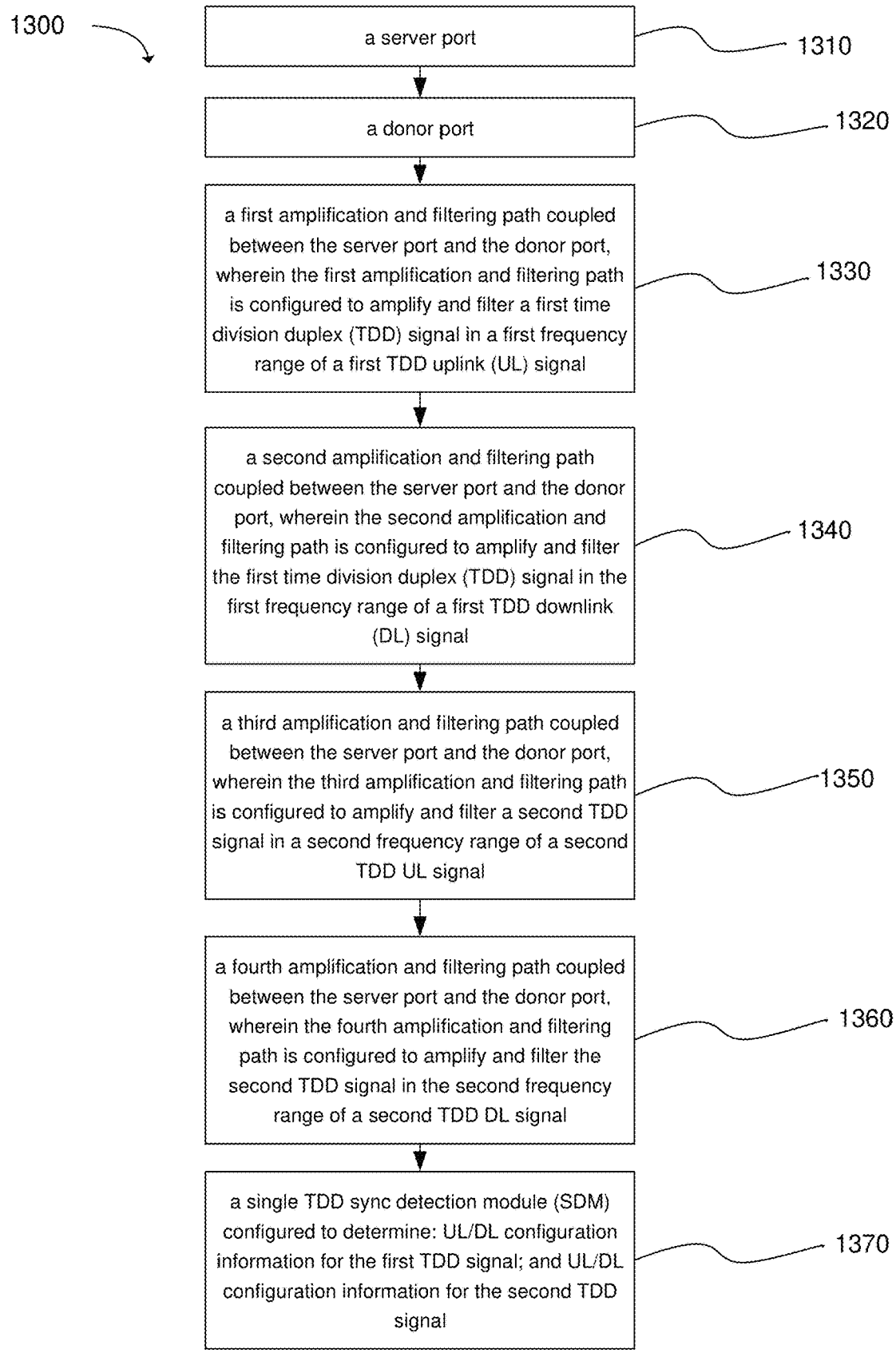
FIG. 13 depicts a repeater in accordance with an example.

Another example provides a repeater 1300, as shown in the flow chart in FIG. 13. The repeater can comprise a server port, as shown in block 1310. The repeater can comprise a donor port, as shown in block 1320. The repeater can comprise a first amplification and filtering path coupled between the server port and the donor port, wherein the first amplification and filtering path is configured to amplify and filter a first time division duplex (TDD) signal in a first frequency range of a first TDD uplink (UL) signal, as shown in block 1330. The repeater can comprise a second amplification and filtering path coupled between the server port and the donor port, wherein the second amplification and filtering path is configured to amplify and filter the first time division duplex (TDD) signal in the first frequency range of a first TDD downlink (DL) signal, as shown in block 1340. The repeater can comprise a third amplification and filtering path coupled between the server port and the donor port, wherein the third amplification and filtering path is configured to amplify and filter a second TDD signal in a second frequency range of a second TDD UL signal, as shown in block 1350. The repeater can comprise a fourth amplification and filtering path coupled between the server port and the donor port, wherein the fourth amplification and filtering path is configured to amplify and filter the second TDD signal in the second frequency range of a second TDD DL signal, as shown in block 1360. The repeater can comprise a single TDD sync detection module (SDM) configured to determine: UL/DL configuration information for the first TDD signal; and UL/DL configuration information for the second TDD signal, as shown in block 1370.

In another example, a repeater can comprise a first port and a second port. In one example, a first amplification and filtering path can be coupled between the first port and the second port. The first amplification and filtering path can be configured to amplify and filter a first TDD UL signal in a first frequency range. In one example, a second amplification and filtering path can be coupled between the first port and the second port. The second amplification and filtering path can be configured to amplify and filter a first TDD DL signal in a first frequency range. In some embodiments, the first amplification and filtering path and the second amplification and filtering path can include some of the same components. For example, one or more of an LNA, a PA, a filter, and the like can be used on both the first amplification and filtering path and the second amplification and filtering path.

In another example, the first frequency range or the second frequency range can be one or more of: Third Generation Partnership Project (3GPP) long term evolution (LTE) time division duplex (TDD) frequency bands 33-53; or 3GPP fifth generation (5G) TDD frequency bands n34, n38, n39, n40, n41, n50, n51, n77, n78, n79, n257, n258, n260, or n261.

In another example, a modem can be configured to generate an UL/DL indication signal for the first frequency range. The modem can be further configured to send the UL/DL indication signal to the repeater. The modem can be a long term evolution (LTE) layer-1 modem that can be configured to generate the UL/DL indication signal without using LTE layer-2 or LTE layer-3. The modem can support LTE layer-2 and LTE layer-3 functionality.

Figure 14A:
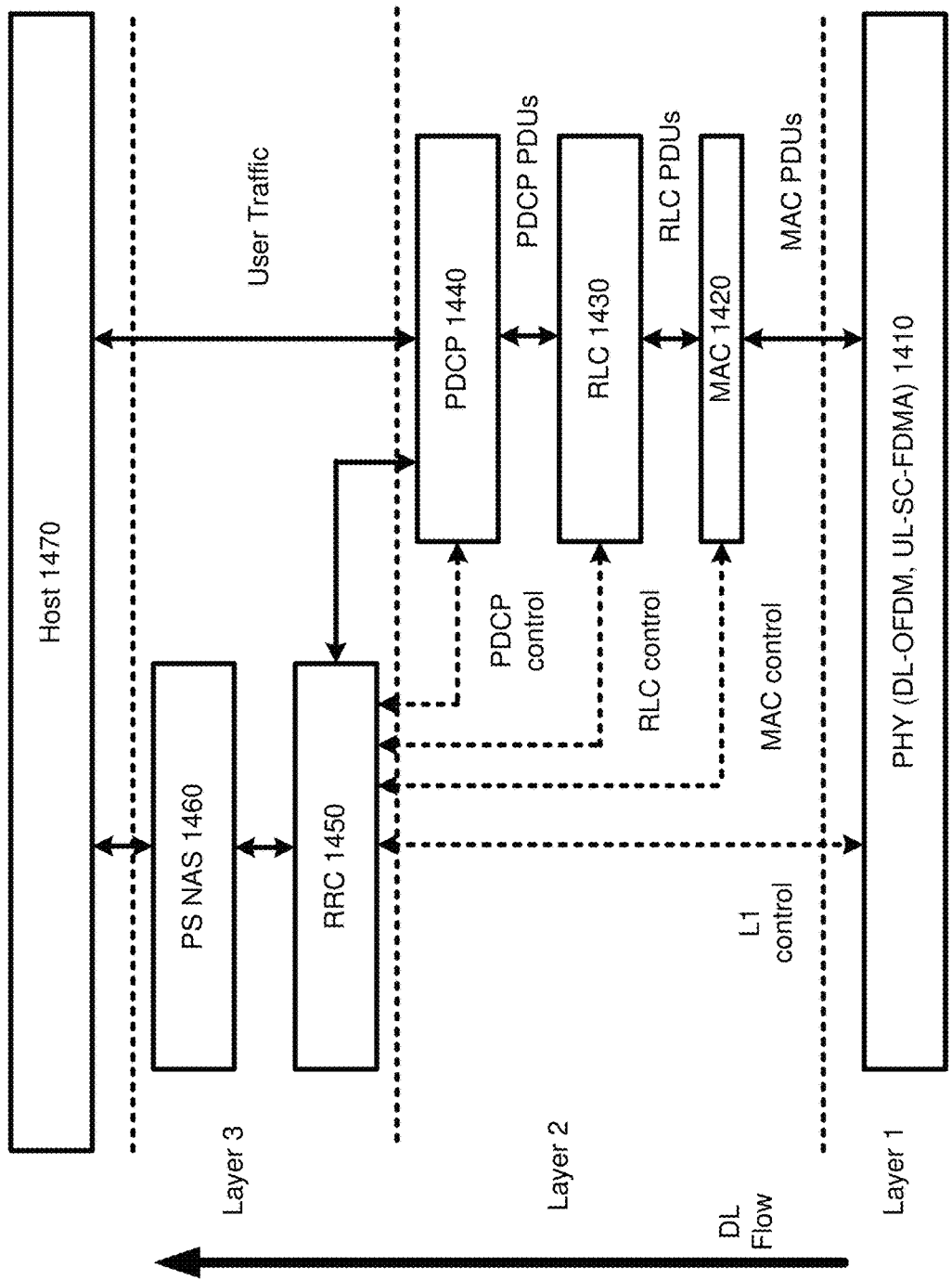
FIG. 14a illustrates a long term evolution (LTE) downlink (DL) radio protocol stack in accordance with an example.
Figure 14B:
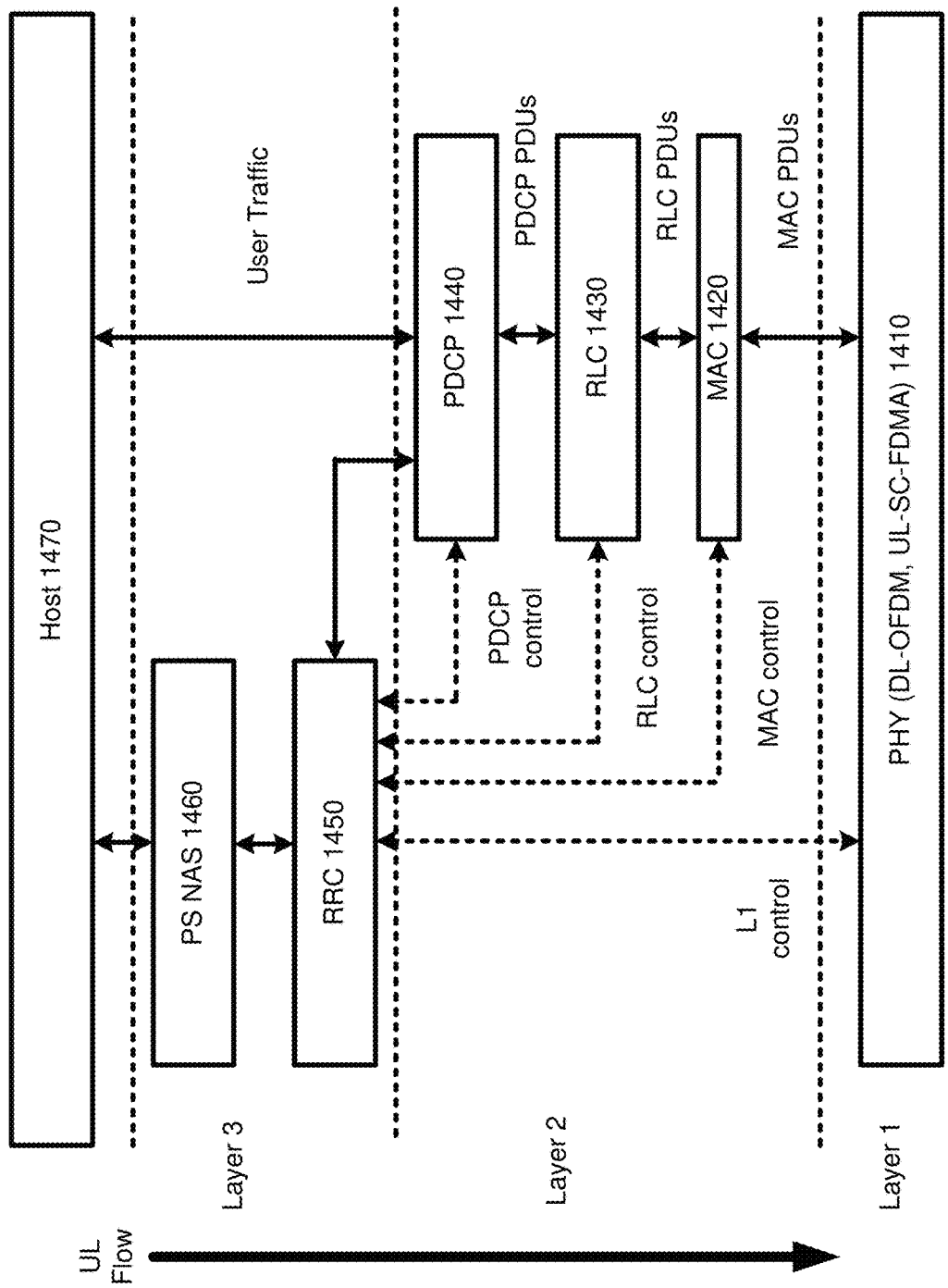
FIG. 14b illustrates a long term evolution (LTE) uplink (UL) radio protocol stack in accordance with an example.

In another example, as illustrated in FIGS. 14*a* and 14*b*, a downlink direction can progress from layer 1 to layer 3 and an uplink direction can progress from layer 3 to layer 1. Layer 1 of the LTE stack can support: (i) DL and UL parameters (e.g., resource blocks, subcarriers per resource block, and subcarrier bandwidth), (ii) physical parameters (e.g., cyclic prefix (CP) length), (iii) 3GPP operation bands (e.g., FDD and TDD bands), (iv) frame structure (e.g., type 1 FDD, type 2 TDD), (v) UL/DL configurations (e.g., TDD configurations 0-6), (vi) modulation and demodulation (e.g., quaternary phase shift keying (QPSK), (vii) channel coding (e.g., turbo coding), (viii) DL physical channels (e.g., physical downlink shared channel (PDSCH), physical downlink control channel (PDCCH), Physical Control Format Indicator Channel (PCFICH, and the like), and (ix) UL physical channels (physical uplink shared channel (PUSCH), physical uplink control channel (PUCCH), and the like). Layer 2 of the LTE stack can include the medium access control (MAC) layer, the radio link control (RLC) layer, the packet data convergence protocol (PDCP) layer. Layer 3 of the LTE stack can include the radio resource control (RRC) layer and the non-access stratum (NAS) layer. In this example, an LTE packet can progress from the PHY in layer 1 to the MAC the RLC, and the PDCP in layer 2, and to the RRC and NAS in layer 3. In this example, an LTE packet can progress from the NAS and RRC in layer 3 to the PDCP, the RLC, and the MAC in layer 2, and to the PHY in layer 1.

In another example, the repeater can be configured to receive the UL/DL indication signal for the first frequency range from the modem. The repeater can be further configured to generate a switching signal for a first set of one or more switches to switch between the first amplification and filtering path and the second amplification and filtering path based on the UL/DL indication signal. The repeater can be further configured to send the switching signal to the first set of one or more switches to enable amplification of the first TDD UL signal or the first TDD DL signal.

In another example, the repeater can further comprise a third amplification and filtering path coupled between the first port and the second port, and a fourth amplification and filtering path coupled between the first port and the second port. The third amplification and filtering path can be configured to amplify and filter a second TDD UL signal in a second frequency range. The fourth amplification and filtering path can be configured to amplify and filter a second TDD DL signal in the second frequency range.

In another example, the modem can be further configured to generate a second UL/DL indication signal for the second frequency range. The modem can be further configured to send the second UL/DL indication signal to the repeater. In this example, the repeater can be further configured to receive the second UL/DL indication signal for the second frequency range and generate a second switching signal for a second set of one or more switches to switch between the third amplification and filtering path and the fourth amplification and filtering path based on the second UL/DL indication signal. The repeater can be further configured to send the second switching signal to the second set of one or more switches to enable amplification of the second TDD UL signal or the second TDD DL signal. In another example, the repeater can be configured to use the UL/DL indication signal to switch between an UL TDD signal and a DL TDD signal.

In another example, the modem can be further configured to receive synchronization information for the first frequency range or the second frequency range from a base station transmitting the first TDD DL signal or the second TDD DL signal, respectively.

In another example, the modem can be further configured to store the UL/DL indication signal for the first frequency range or the second frequency range. In this example, the modem can be further configured to use the UL/DL indication signal for the first frequency range as stored at the modem to reacquire the UL/DL indication information for the first frequency range in a subsequent time period. In this example, the modem can be further configured to use the UL/DL indication signal for the second frequency range as stored at the modem to reacquire the UL/DL indication information for the second frequency range in a subsequent time period.

In another example, the modem can be configured to generate the UL/DL indication signal for the first frequency range or the second frequency range from the synchronization information and the UL/DL configuration information for the first frequency range or the second frequency range, respectively.

Figure 15A:
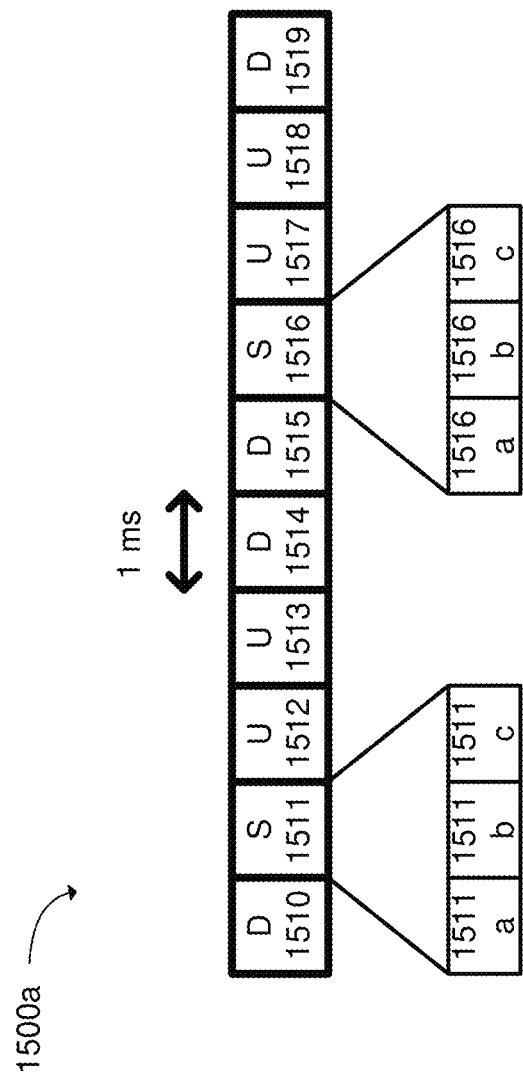
FIG. 15a illustrates a time division duplex (TDD) long term evolution (LTE) frame structure in accordance with an example.

In another example, as illustrated in FIG. 15*a*, a TDD LTE frame structure can include a ten-millisecond radio frame 1500*a* comprising 10 one-millisecond subframes 1510, 1511, 1512, 1513, 1514, 1515, 1516, 1517, 1518, and 1519 including downlink (D) subframes, special (S) subframes, and uplink (U) subframes. The special subframes 1511 and 1516 can include downlink pilot time slots (DwPTS), 1511*a* and 1516*a*, respectively. The special subframes can include guard periods, 1511*b* and 1516*b*, respectively. The special subframes can include uplink pilot time slots (UpPTS), 1511*c* and 1516*c*, respectively.

Figure 15B:
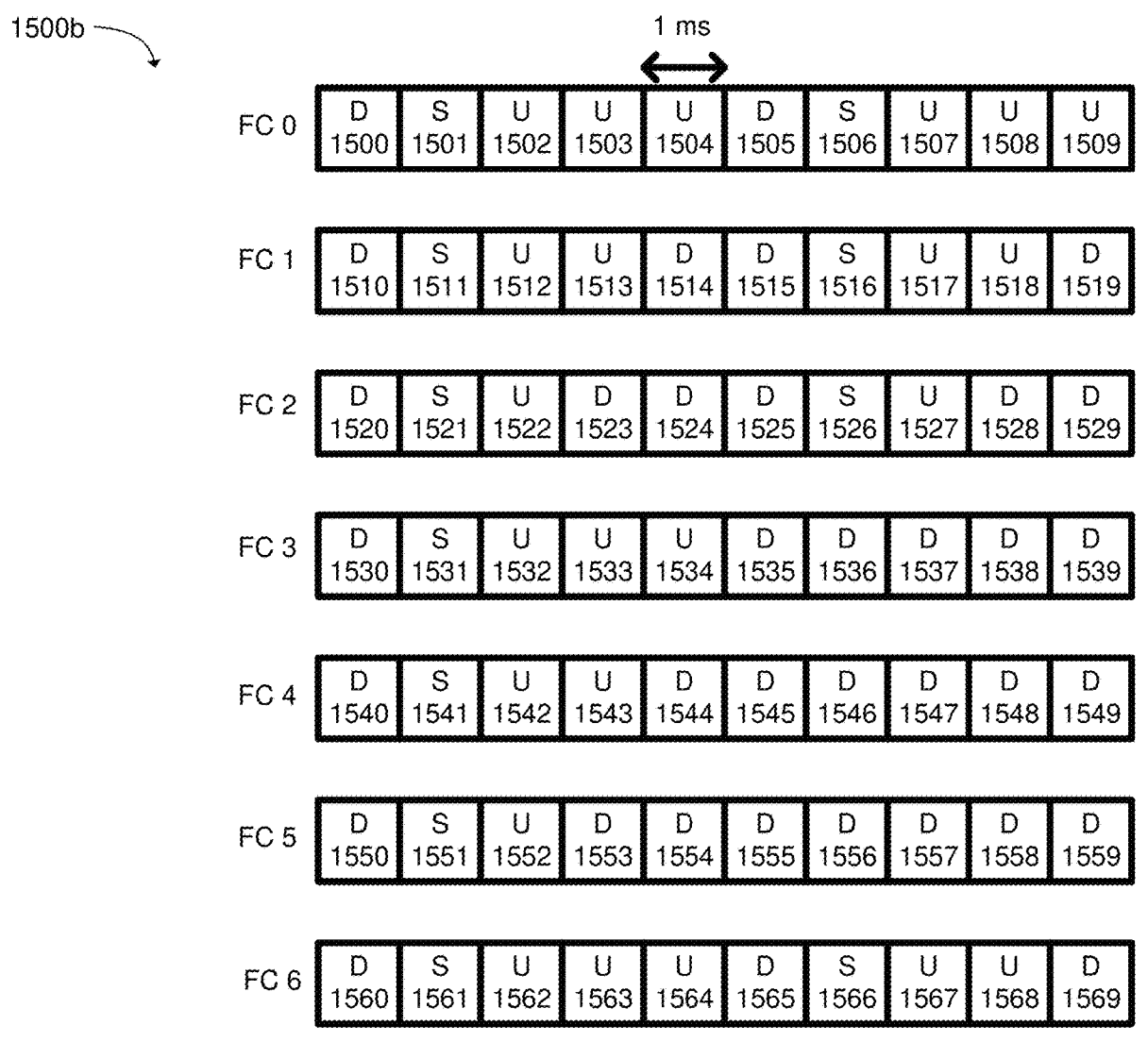

In another example, as illustrated in FIG. 15*b*, a TDD LTE frame structure 1500*b* can include 7 different frame configurations (FC) (e.g., FC0, FC1, FC2, FC3, FC4, FC5, and FC6). Each of the 7 different frame configurations can include a different configuration of uplink subframes (U), special subframes (S), and downlink subframes (D) (e.g., 1500-1509, 1510-1519, 1520-1529, 1530-1539, 1540-1549, 1550-1559, and 1560-1569). The 7 different frame configurations (e.g., FC0, FC1, FC2, FC3, FC4, FC5, and FC6) can begin with a downlink subframe, which can be used for frame descriptor information (e.g., physical control format indicator channel (PCFICH) and physical downlink control channel (PDCCH)). A UE can be configured to receive the frame structure information in the first subframe (e.g., 1500, 1510, 1520, 1530, 1540, 1550, and 1560). The third subframe (e.g., 1502, 1512, 1522, 1532, 1542, 1552, 1562) in each of the different FCs (e.g., FC0, FC1, FC2, FC3, FC4, FC5, and FC6) can be used for uplink transmission.

In another example, when the subframe switches from downlink to uplink (e.g., 1500 to 1502, 1510 to 1512, 1520 to 1522, 1530 to 1532, 1540 to 1542, 1550 to 1552, 1560 to 1562, 1505 to 1507, 1515 to 1517, 1525 to 1527, and 1565 to 1567), there can be a special subframe between the downlink subframe and the uplink subframe (e.g., special subframes 1501, 1511, 1521, 1531, 1541, 1551, 1561, 1506, 1516, 1526, and 1566). In another example, there may be no special subframe when switching from uplink to downlink (e.g., after subframes 1504, 1513, 1518, 1522, 1527, 1534, 1543, 1552, 1564, and 1568).

Figure 15C:
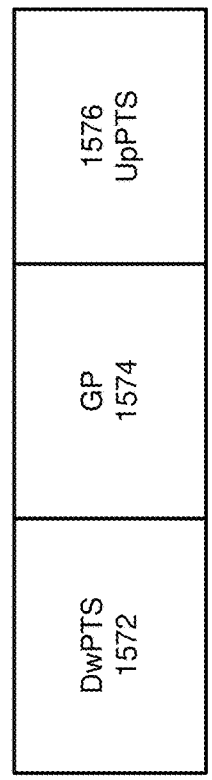
FIG. 15c illustrates a special subframe structure in accordance with an example.

In another example, as illustrated in FIG. 15*c*, a special subframe structure 1500*c* can be used for switching transmission from downlink to uplink and can include a downlink pilot time slot (DwPTS) 1572, a guard period (GP) 1574, and an uplink pilot time slot (UpPTS) 1576. The lengths of the DwPTS 1572, GP 1574, and UpPTS 1576 can have configurable lengths with a total sum of the DwPTS 1572, GP 1574, and UpPTS 1576 adding up to 1 millisecond (ms) or 14 symbols. The DwPTS 1572 can be configured as a DL subframe that can carry reference signals and control information and data when sufficient duration is configured. The DwPTS 1572 can also carry a primary synchronization signal (PSS). The GP 1574 can be used to control switching between UL and DL transmission. Because switching between transmission directions can have a hardware delay for both the UE and the BS, the GP 1574 can compensate for this hardware delay. The GP 1574 can be adequate to cover the propagation delay of DL interference. In another example, a maximum supportable cell size can be determined by the length of the GP, which can be from 1 to 10 symbols in length, with an OFDM symbol having a symbol period of about 0.5 ms for every 7 OFDM symbols for a normal cyclic prefix (CP) (e.g., 71.43 microseconds (mcs) per symbol). The UpPTS 1576 can be used for sounding reference signals (SRS) and physical random-access channels (PRACH) from the UE.

Figure 15D:
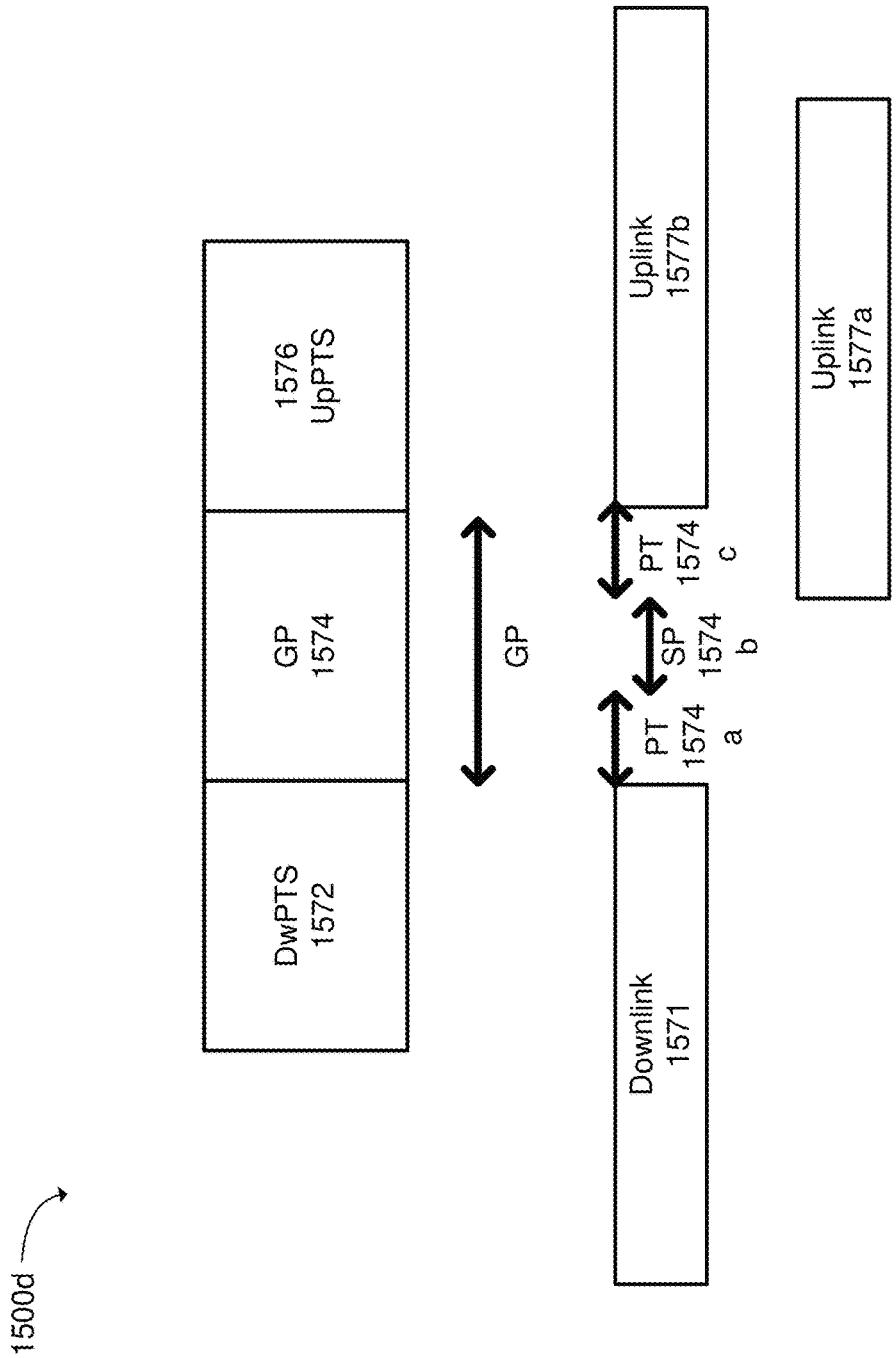
FIG. 15d illustrates a guard period for switching from downlink (DL) to uplink (UL) in accordance with an example.

In another example, as illustrated in FIG. 15*d*, a special subframe 1500*d* can include a DwPTS 1572, a GP 1574, and a UpPTS 1576. The guard period for switching from the DL subframe to the UL subframe can enable UL transmissions from multiple UEs to arrive at substantially the same time at the BS. A guard period for switching for switching from an UL subframe to a DL subframe may not be used because the BS can be transmitting without transmission by UEs, and the BS can issue a timing advance (TA) to the UE. The BS can end DL transmission after downlink 1571, and the downlink subframe can reach the UE before the end of a propagation time (PT) 1574*a*. The UE can be configured to switch transmission before the end of the transmission/receiving (Tx-Rx) switching timer (SP) 1574*b* and before the beginning of the uplink 1577*a*. The UL can reach the BS before the end of the PT 1574*c* and before the beginning of the uplink 1577*b*. In one example, the guard period can be the sum of the round-trip distance (RTD) and the SP. The RTD can be equal to the propagation time multiplied by 2.

In another example, as depicted in the table 1500*e* in FIG. 15*e*, the special subframe can impact the cell size. In TDD, there can be 9 special subframe configurations with a different number of OFDM symbols for DwPTS, GP, and UpPTS. The special subframe guard period can impact the cell size. The special subframe can compensate for the UL propagation delay and a longer GP can compensate for a higher propagation delay which can result in a larger to cell size.

In another example, a special subframe can have 10 OFDM symbols in a GP. The total symbol time can be about 714.3 mcs, which each OFDM symbol being about 71.43 mcs. Because the velocity of light is about 300 m per mcs, the round-trip distance can be about 214 km, and the cell radius can be about 107 km. The GP can indicate a maximum cell size and other parameters such as random-access channel (RACH) format, transmit power, receiver sensitivity, and target cell throughput.

Figure 17:
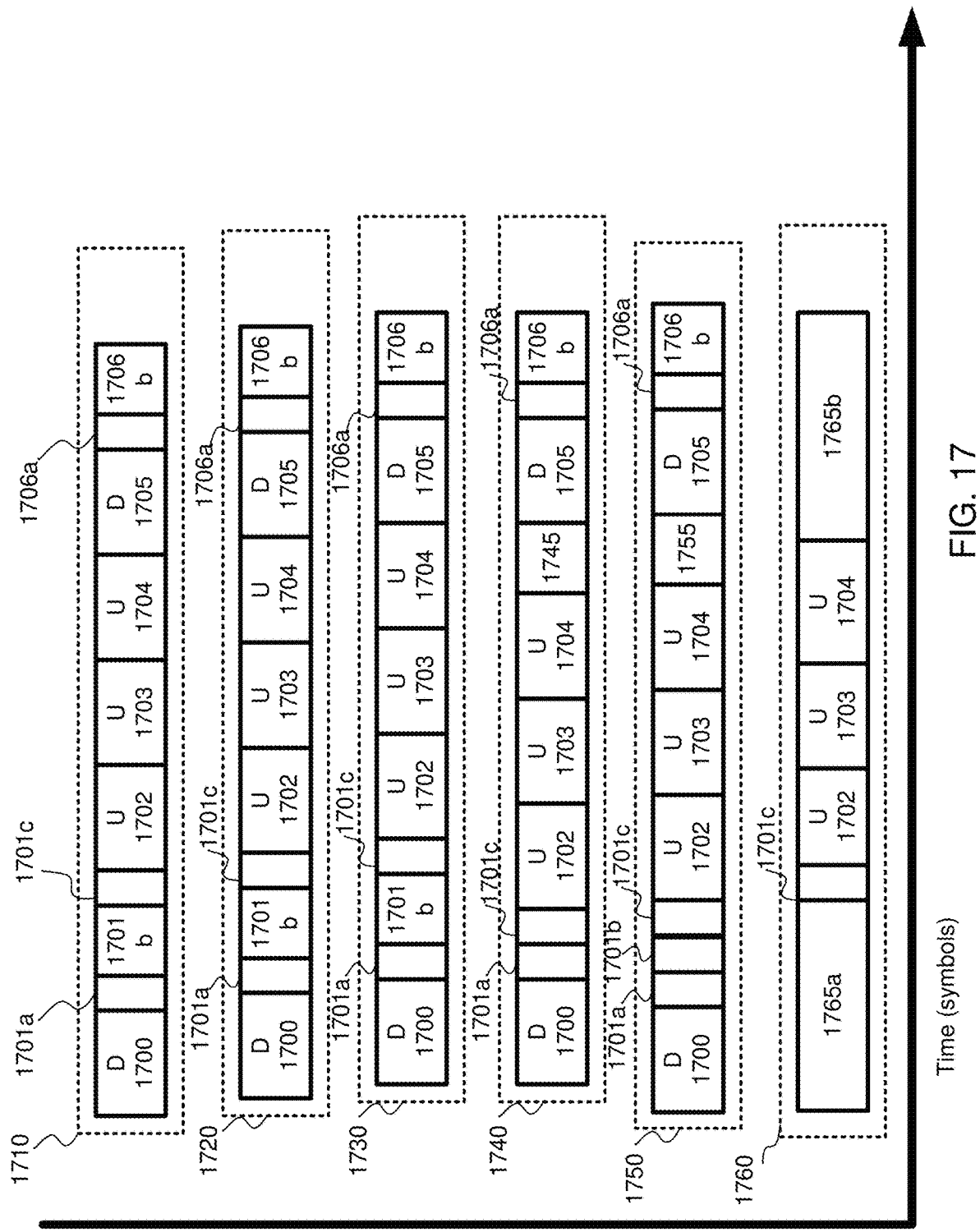
FIG. 17 illustrates a timing diagram showing propagation delay between a repeater and a user equipment (UE) in accordance with an example.

In another example, as illustrated in FIGS. 16 and 17, a modem can be configured to receive a time division duplex (TDD) signal including synchronization information for a frequency range and uplink/downlink (UL/DL) configuration information for the frequency range from a TDD DL signal from a BS. The modem can be configured to receive a frame structure type (e.g., type2 TDD) and UL/DL frame configurations (e.g., TDD configurations 0 through 6). In this example, the modem can generate an UL/DL indication signal for the frequency range of the TDD signal from the synchronization information and the UL/DL configuration information, and send the UL/DL indication signal to a repeater without using timing advance information from the UE. The modem can accommodate varying degrees of timing advance from a plurality of UEs in the cell served by the repeater.

In another example, the repeater can determine the LTE TDD frame configuration from the LTE TDD signal. During an initial cell search for synchronization, the UE can search for the primary synchronization signal (PSS) and the secondary synchronization signal (SSS) on the DL from the BS. The detection of these signals (e.g., PSS and SSS) via time (PSS) and frequency (SSS) correlation can enable the UE to complete time and frequency synchronization and acquire system parameters such as cell identity, cyclic prefix length, and access mode (e.g., FDD or TDD).

In another example, when the access mode of TDD has been determined, the UL/DL frame configuration can be determined. TDD cells can operate with a fixed LTE TDD frame configuration (e.g., FC 0 through 6) for the cell wherein the UL/DL subframe sequence and the special subframe timing can be identified. The subframe can comprise a guard period for the cell that can enable a UE to compensate for cell propagation delay by advancing the UE's uplink timing.

In another example, when the UE's UL is time advanced, the UE can have a time spread between the UE's UL and DL transmissions. To allow for timing advance and associated UL/DL timing spread, the repeater's UL timing can start immediately after the DwPTS symbols in the downlink (i.e. the repeater can be configured to switch from DL to UL immediately after the DwPTS in the special subframe). In another example, the repeater can be configured to switch from UL to DL immediately at the UL to DL boundary. Both UL timing advance and UL-to-DL timing spread can be accommodated in the repeater's UL slot.

In another example, the repeater can be configured to demodulate the TDD DL signal from the BS (e.g., LTE layer 1 signals) to receive the TDD frame and sub-frame timing from the primary synchronization signal (PSS) and the secondary synchronization signal (SSS). The PSS can provide information to the repeater to achieve frame synchronization and the SSS can provide information to achieve symbol synchronization.

In another example, the repeater can be configured to switch from the first TDD DL signal to the first TDD UL signal within a first selected time period after downlink pilot time slot (DwPTS) symbols in a special subframe of the first TDD DL signal; or switch from the first TDD UL signal to the first TDD DL signal within a second selected time period after a subframe boundary between a UL subframe of the first TDD signal and a DL subframe of the first TDD DL signal. The first selected time period can be less than one or more of: 1 mcs, 500 nanoseconds, 300 nanoseconds, 200 nanoseconds, or 100 nanoseconds, and the second selected time period can be less than one or more of: 1 mcs, 500 nanoseconds, 300 nanoseconds, 200 nanoseconds, or 100 nanoseconds. The repeater can be configured to switch from the first TDD DL signal to the first TDD UL signal without using a timing advance (TA) value received from the UE; or switch from the first TDD UL signal to the first TDD DL signal without the TA value to received from the UE.

In another example, the guard period can be equal to about 2 multiplied by G, which can cover substantially the entire cell. In some cases, the sum of the timing advance and the timing spread can be smaller than 2 multiplied by G. In other cases, the UE may use nearly the entire 2 multiplied by G guard period budget. In any case, the repeater can accommodate intermediate values of a UE's timing advance without having previous information when the repeater is switched at predetermined boundaries, as shown in FIGS. 16 and 17.

In another example, the repeater's DL timing slot can be sufficient in duration to cover the DL subframe of 1 ms and the DwPTS symbols. The total number of symbols can be configured based on the TDD frame configuration and the special subframe configuration.

In another example, the UL/DL switch timing shown in FIGS. 16 and 17 can accommodate a propagation delay (TD) between the repeater and the UE when the total propagation delay (Td) (e.g., td1 from the BS to the repeater and the td2 from the repeater to the UE) is less than or equal to the allocated guard period divided by 2 based on the cell size. In this example, the repeater UL switching period can allow for a plurality of UEs with varying timing advances to be accommodated.

In another example, as illustrated in FIG. 16, a timing diagram including a negligible propagation delay between the repeater and the UE can include an LTE TDD frame configuration 0 (e.g., subframes downlink (D) 1600, special (S) comprised of 1601a (DwPTS), 1601b (GP) and 1601c (UpPTS), uplink (U) 1602, U 1603, U 1604, D 1605, S 1606 comprised of 1606a (DwPTS), 1606b (GP), and 1606c (UpPTS), U 1607, U 1608, and U 1609) when: (A) transmitted from the BS, (B) received at the repeater, (C) transmitted from the repeater and received at the UE (D) transmitted from the UE, received at the repeater and transmitted from the repeater, and (E) received at the BS from the repeater. In this example, the propagation delay from BS to repeater on DL can be about G and the propagation delay from repeater to BS on UL can be about G, wherein G can be equal to about half of the guard period in the special subframe.

In this example, block 1610a shows the timing of LTE TDD frame configuration 0 transmitted from the BS when the maximum guard band is used. Subframe D 1600 begins at time 0. In another example, block 1620a shows the timing of LTE TDD frame configuration 0 received from the BS at time G. In another example, block 1630a shows the timing of LTE TDD frame configuration 0 transmitted from the repeater (with a delay of about 100 ns from the donor port to the server port of the repeater) and received at the UE (with negligible propagation delay). In another example, block 1640a shows the timing of LTE TDD frame configuration 0 transmitted from the UE and received at the repeater (with negligible propagation delay). In this example, block 1645a can be the result of the UE timing advance in block 1640a (e.g., the absence of 1601b in block 1640a) and 1645b can be the further result of the UE timing advance in subframe 1640a. In another example, block 1650a shows the timing of LTE TDD frame configuration 0 received at the BS from the repeater with a total propagation delay of about 2G. Blocks 1655a and 1655b can be the BS downlink and guard period. Block 1610a and block 1650a can be time-aligned in the UL subframes (e.g., 1601c, 1602, 1603, 1604, 1607, 1608, and 1609) because of the UE timing advance.

In another example, the repeater can be configured to switch from DL to UL immediately after the DwPTS in the special subframe (e.g., after 1601a in block 1620a) and the repeater can be configured to switch from UL to DL immediately at the UL to DL boundary (e.g., the boundary between 1604 and 1605). Therefore, 1600 and 1601a in block 1620 can be a repeater downlink slot and 1601b, 1601c, 1602, 1603, and 1604 can be a repeater uplink slot.

In another example, as illustrated in FIG. 17, a timing diagram including a significant propagation delay between the repeater and the UE can include an LTE TDD frame structure 0 (e.g., subframes downlink (D) 1700, special (S) 1701 comprised of 1701a (DwPTS), 1701b (GP), and 1701c (UpPTS), uplink (U) 1702, U 1703, U 1704, D 1705, 1706a, and 1706b) when: (A) transmitted from the BS, (B) received at the repeater from the BS, (C) received at the UE from the repeater, (D) transmitted from the UE to the repeater, (E) transmitted from the repeater to the BS, and (F) received at the BS. In this example, the propagation delay from BS to repeater on DL can be about G and the propagation delay from repeater to BS on UL can be about G, wherein G can be equal to about a quarter of the guard period in the special subframe. In this example, the propagation delay from BS to UE on the DL can be G, and the propagation delay from UE to BS can be G. The propagation delays in this example are for purposes of illustration only, and the propagation delay from the BS to repeater on DL, from the repeater to the UE on DL, from the UE to the repeater on UL, and from the repeater to the BS on UL can each have different values.

In this example, block 1710 shows the timing of LTE TDD frame configuration 0 transmitted from the BS when the maximum guard band is used. Subframe D 1700 begins at time 0. In another example, block 1720 shows the timing of LTE TDD frame configuration 0 received from the BS at time G at the repeater. In another example, block 1730 shows the timing of LTE TDD frame configuration 0 transmitted from the repeater (with a delay of about 100 ns from the donor port to the server port of the repeater) and received at the UE (with a propagation delay of an additional G). In another example, block 1740 shows the timing of LTE TDD frame configuration 0 transmitted from the UE and received at the repeater (with propagation delay of an additional G). Block 1745 can be the time spread between UL and DL due to the timing advance. In another example, block 1750 shows the timing of LTE TDD frame configuration 0 transmitted from the repeater. Block 1755 can be the time spread between UL and DL due to the timing advance. In another example, block 1760 shows the timing of LTE TDD frame configuration 0 received at the BS from the repeater. Blocks 1765a and 1765b can be the BS downlink and guard period. Block 1710 and block 1760 can be time-aligned in the UL subframes (e.g., 1701c, 1702, 1703, and 1704) because of the UE timing advance. Block 1720 and block 1750 can be synchronized in DL subframe 1705, and block 1730 and block 1740 can be synchronized in DL subframe 1705.

In the example illustrated in FIG. 17, the repeater switch points can be the same as the repeater switch points in FIG. 16. For example, the repeater can be configured to switch from DL to UL immediately after the DwPTS in the special subframe (e.g., after 1701a in block 1720) and the repeater can be configured to switch from UL to DL immediately at the UL to DL boundary (e.g., the boundary between 1704 and 1705). Therefore, 1700 and 1701a in block 1720 can be a repeater downlink slot and 1701b, 1701c, 1702, 1703, and 1704 can be a repeater uplink slot. This rule can also be used for TDD frame configurations 0 through 5 where there is a single UL and DL timing per frame. For TDD frame configuration 6, in which there are two different UL and DL timing slots per frame, the repeater can also be configured to switch from DL to UL immediately after the DwPTS in the special subframe and the repeater can be configured to switch from UL to DL immediately at the UL to DL boundary.

In another example, an LTE layer 3 modem can be registered on the cell to receive timing advance and medium access control (MAC) control. In this example, the timing can be valid for the location of the repeater. In some examples, the timing may not be valid for a plurality of UEs with varying timing advances.

In another example, the modem can be configured to generate the UL/DL indication signal for a frequency range without using a subscriber identity module (SIM) or a SIM card. The modem may not register, connect, or attached to a particular network, which allows operation without a SIM. Operating a modem without a SIM card can enable the modem to receive the synchronization information and the UL/DL configuration information from multiple cellular carriers without having a contract with multiple cellular carriers or paying fees to each of the cellular carriers. Further, operating a modem without a SIM card can prevent security issues arising from unauthorized SIM card intrusions. Further, the hardware complexity of the modem can be reduced with a reduction in the number of components.

Figure 18:
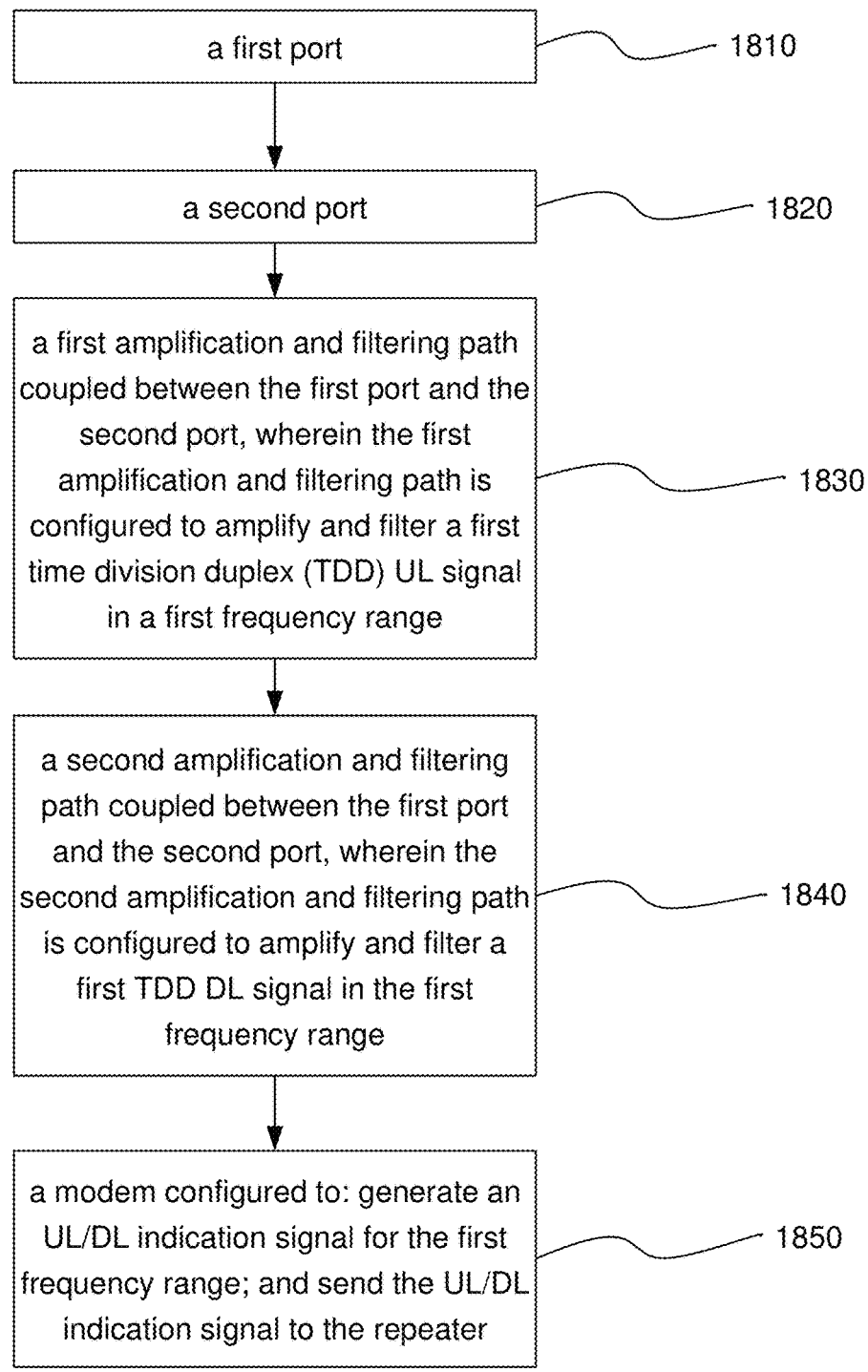
FIG. 18 depicts a repeater in accordance with an example.

Another example provides a repeater 1800, as shown in the flow chart in FIG. 18. The repeater can comprise: a first port, as shown in block 1810. The repeater can comprise: a second port, as shown in block 1820. The repeater can comprise a first amplification and filtering path coupled between the first port and the second port, wherein the first amplification and filtering path is configured to amplify and filter a first time division duplex (TDD) UL signal in a first frequency range, as shown in block 1830. The repeater can comprise a second amplification and filtering path coupled between the first port and the second port, wherein the second amplification and filtering path is configured to amplify and filter a first TDD DL signal in the first frequency range, as shown in block 1840. The repeater can comprise a modem configured to: generate an UL/DL indication signal for the first frequency range; and send the UL/DL indication signal to the repeater, as shown in block 1850.

Figure 19:
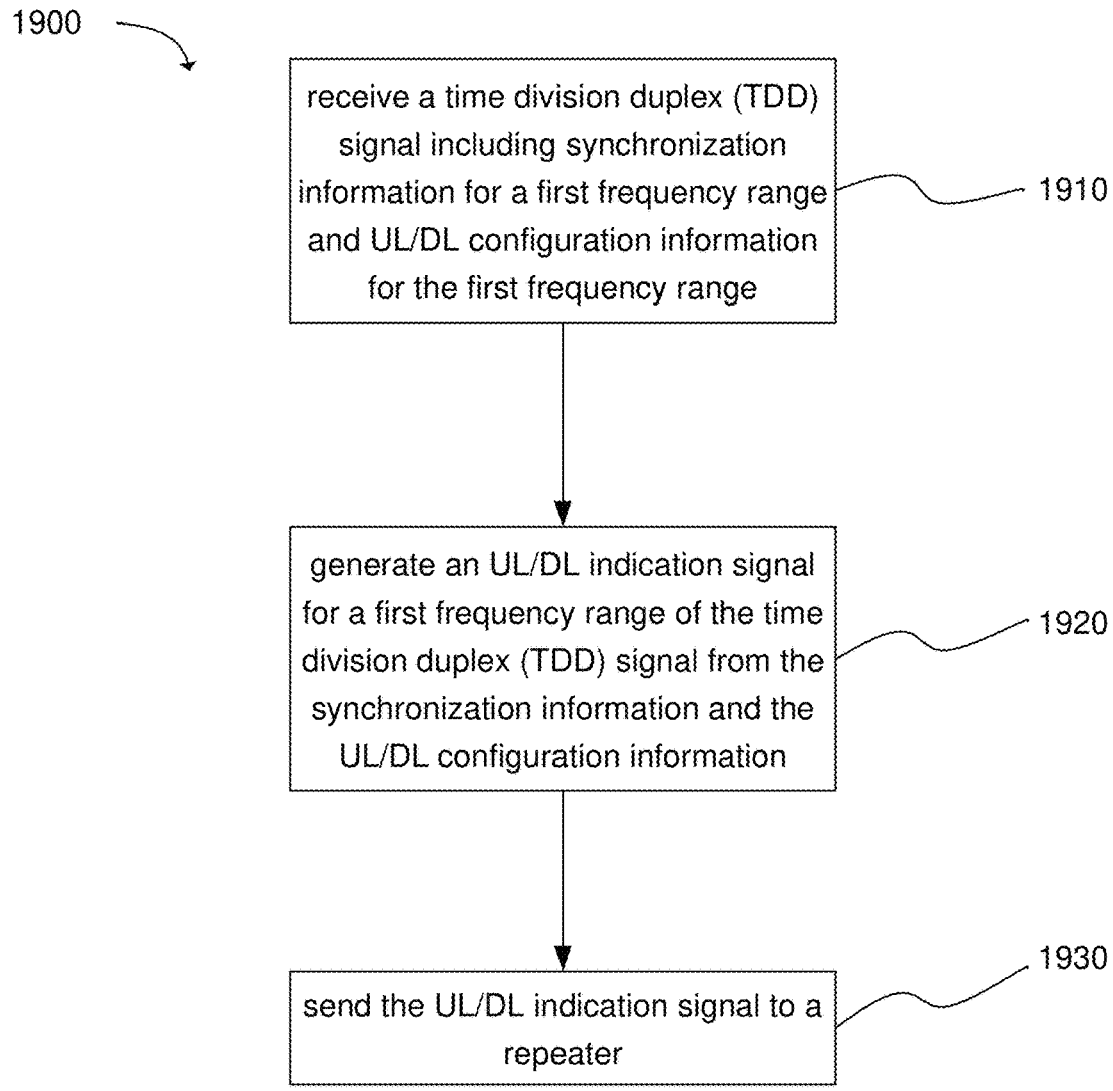
FIG. 19 depicts a modem in accordance with an example.

Another example provides a modem 1900, as shown in the flow chart in FIG. 19. The repeater can be configured to receive a time division duplex (TDD) signal including synchronization information for a first frequency range and UL/DL configuration information for the first frequency range, as shown in block 1910. The repeater can be configured to generate an UL/DL indication signal for a first frequency range of the time division duplex (TDD) signal from the synchronization information and the UL/DL configuration information, as shown in block 1920. The repeater can be configured to send the UL/DL indication signal to a repeater, as shown in block 1930.

Examples

The following examples pertain to specific technology embodiments and point out specific features, elements, or actions that can be used or otherwise combined in achieving such embodiments.

Example 1 includes a repeater comprising: a first port; a second port; a first amplification and filtering path coupled between the first port and the second port, wherein the first amplification and filtering path is configured to amplify and filter a first time division duplex (TDD) signal in a first frequency range of a first TDD uplink (UL) signal or a first TDD downlink (DL) signal; a second amplification and filtering path coupled between the first port and the second port, wherein the second amplification and filtering path is configured to amplify and filter a second TDD signal in a second frequency range of a second TDD UL signal or a second TDD DL signal; and a single TDD sync detection module (SDM) configured to determine: UL/DL configuration information for the first TDD signal; and UL/DL configuration information for the second TDD signal.

Example 2 includes the repeater of Example 1, further comprising: a controller configured to: use the UL/DL configuration information for the first TDD signal to switch between the first TDD UL signal and the first TDD DL signal for the first amplification and filtering path; and use the UL/DL configuration information for the second TDD signal to switch between the second TDD UL signal and the second TDD DL signal for the second amplification and filtering path.

Example 3 includes the repeater of Example 2, wherein the TDD SDM is further configured to: receive synchronization information for the first TDD signal to enable the controller to switch between the first TDD UL signal and the first TDD DL signal; and receive synchronization information for the second TDD signal to enable the controller to switch between the second TDD UL signal and the second TDD DL signal.

Example 4 includes the repeater of Example 3, wherein: the synchronization information for the first TDD signal is received from a base station transmitting the first TDD DL signal; and the synchronization information for the second TDD signal is received from a base station transmitting the second TDD DL signal.

Example 5 includes the repeater of Example 3, wherein the controller is further configured to: use the synchronization information for the first TDD signal and the UL/DL configuration information for the first TDD signal to switch between the first TDD UL signal and the first TDD DL signal for a subsequent time period; and use the synchronization information for the second TDD signal and the UL/DL configuration information for the second TDD signal to switch between the second TDD UL signal and the second TDD DL signal for a subsequent time period.

Example 6 includes the repeater of Example 3, wherein the controller is further configured to: store the synchronization information for the first TDD signal; and store the synchronization information for the second TDD signal.

Example 7 includes the repeater of Example 6, wherein the TDD SDM is further configured to: use the synchronization information for the first TDD signal that is stored at the controller to reacquire synchronization information for the first TDD signal in a first subsequent time period; and use the synchronization information for the second TDD signal that is stored at the controller to reacquire synchronization information for the second TDD signal in a second subsequent time period.

Example 8 includes the repeater of Example 1, wherein the TDD SDM is further configured to: store the UL/DL configuration information for the first TDD signal; and store the UL/DL configuration information for the second TDD signal.

Example 9 includes the repeater of Example 8, wherein the TDD SDM is further configured to: use the UL/DL configuration information for the first TDD signal that is stored at the TDM SDM to reacquire UL/DL configuration information for the first TDD signal in a first subsequent time period; and use the UL/DL configuration information for the second TDD signal that is stored at the TDM SDM to reacquire UL/DL configuration information for the second TDD signal in a second subsequent time period.

Example 10 includes the repeater of Example 1, wherein the TDD SDM is further configured to: determine the UL/DL configuration information for the first TDD signal and the UL/DL configuration information for the second TDD signal in a same time period; or determine the UL/DL configuration information for the first TDD signal in a first time period and determine the UL/DL configuration information for the second TDD signal in a second time period, wherein the first time period does not overlap with the second time period.

Example 11 includes the repeater of Example 1, wherein the TDD SDM is further configured to: activate a search timer for one or more of the first TDD signal or the second TDD signal.

Example 12 includes the repeater of Example 1, wherein the TDD SDM is further configured to: activate a first lock state for the first TDD signal, and set an UL/DL configuration state based on the UL/DL configuration information for the first TDD signal during a duration of the first lock state; or activate a second lock state for the second TDD signal, and set an UL/DL configuration state for the second TDD signal based on the UL/DL configuration information for the second TDD signal during a duration of the second lock state.

Example 13 includes the repeater of Example 1, wherein the TDD SDM is further configured to: activate a training timer for one or more of the first TDD signal or the second TDD signal.

Example 14 includes a repeater comprising: a server port; a donor port; a first amplification and filtering path coupled between the server port and the donor port, wherein the first amplification and filtering path is configured to switch between amplifying and filtering: a first time division duplex (TDD) signal in a first frequency range of a first TDD uplink (UL) signal; and the first TDD signal in the first frequency range of a first TDD downlink (DL) signal; a second amplification and filtering path coupled between the server port and the donor port, wherein the second amplification and filtering path is configured to switch between amplifying and filtering: a second TDD signal in a second frequency range of a second TDD UL signal; and the second TDD signal in the second frequency range of a second TDD DL signal; and a single TDD sync detection module (SDM) configured to determine: UL/DL configuration information for the first TDD signal; and UL/DL configuration information for the second TDD signal.

Example 15 includes the repeater of Example 14, further comprising: a controller configured to: use the UL/DL configuration information for the first TDD signal to switch between the first TDD UL signal and the first TDD DL signal for the first amplification and filtering path; and use the UL/DL configuration information for the second TDD signal to switch between the second TDD UL signal and the second TDD DL signal for the second amplification and filtering path.

Example 16 includes the repeater of Example 14, wherein the TDD SDM is further configured to: receive synchronization information for the first TDD signal to enable the controller to switch between the first TDD UL signal and the first TDD DL signal; and receive synchronization information for the second TDD signal to enable the controller to switch between the second TDD UL signal and the second TDD DL signal.

Example 17 includes the repeater of Example 16, wherein: the synchronization information for the first TDD signal is received from a base station transmitting the first TDD DL signal; and the synchronization information for the second TDD signal is received from a base station transmitting the second TDD DL signal.

Example 18 includes the repeater of Example 16, wherein the controller is further configured to: use the synchronization information for the first TDD signal and the UL/DL configuration information for the first TDD signal to switch between the first TDD UL signal and the first TDD DL signal for a subsequent time period; and use the synchronization information for the second TDD signal and the UL/DL configuration information for the second TDD signal to switch between the second TDD UL signal and the second TDD DL signal for a subsequent time period.

Example 19 includes the repeater of Example 16, wherein the controller is further configured to: store the synchronization information for the first TDD signal; and store the synchronization information for the second TDD signal.

Example 20 includes the repeater of Example 19, wherein the TDD SDM is further configured to: use the synchronization information for the first TDD signal that is stored at the controller to reacquire synchronization information for the first TDD signal in a first subsequent time period; and use the synchronization information for the second TDD signal that is stored at the controller to reacquire synchronization information for the second TDD signal in a second subsequent time period.

Example 21 includes the repeater of Example 14, wherein the TDD SDM is further configured to: store the UL/DL configuration information for the first TDD signal; and store the UL/DL configuration information for the second TDD signal.

Example 22 includes the repeater of Example 21, wherein the TDD SDM is further configured to: use the U L/DL configuration information for the first TDD signal that is stored at the TDM SDM to reacquire UL/DL configuration information for the first TDD signal in a first subsequent time period; and use the UL/DL configuration information for the second TDD signal that is stored at the TDM SDM to reacquire UL/DL configuration information for the second TDD signal in a second subsequent time period.

Example 23 includes the repeater of Example 14, wherein the TDD SDM is further configured to: determine the UL/DL configuration information for the first TDD signal and the U L/DL configuration information for the second TDD signal in a same time period; or determine the UL/DL configuration information for the first TDD signal in a first time period and determine the UL/DL configuration information for the second TDD signal in a second time period, wherein the first time period does not overlap with the second time period.

Example 24 includes the repeater of Example 14, wherein the TDD SDM is further configured to: activate a search timer for one or more of the first TDD signal or the second TDD signal.

Example 25 includes the repeater of Example 14, wherein the TDD SDM is further configured to: activate a first lock state for the first TDD signal, and set an UL/DL configuration state based on the UL/DL configuration information for the first TDD signal during a duration of the first lock state; or activate a second lock state for the second TDD signal, and set an UL/DL configuration state for the second TDD signal based on the UL/DL configuration information for the second TDD signal during a duration of the second lock state.

Example 26 includes the repeater of Example 14, wherein the TDD SDM is further configured to: activate a training timer for one or more of the first TDD signal or the second TDD signal.

Example 27 includes a repeater comprising: a server port; a donor port; a first amplification and filtering path coupled between the server port and the donor port, wherein the first amplification and filtering path is configured to amplify and filter a first time division duplex (TDD) signal in a first frequency range of a first TDD uplink (UL) signal; a second amplification and filtering path coupled between the server port and the donor port, wherein the second amplification and filtering path is configured to amplify and filter the first time division duplex (TDD) signal in the first frequency range of a first TDD downlink (DL) signal; a third amplification and filtering path coupled between the server port and the donor port, wherein the third amplification and filtering path is configured to amplify and filter a second TDD signal in a second frequency range of a second TDD UL signal; a fourth amplification and filtering path coupled between the server port and the donor port, wherein the fourth amplification and filtering path is configured to amplify and filter the second TDD signal in the second frequency range of a second TDD DL signal; and a single TDD sync detection module (SDM) configured to determine: UL/DL configuration information for the first TDD signal; and UL/DL configuration information for the second TDD signal.

Example 28 includes the repeater of Example 27, further comprising: a controller configured to: use the UL/DL configuration information for the first TDD signal to switch between the first TDD UL signal and the first TDD DL signal; and use the UL/DL configuration information for the second TDD signal to switch between the second TDD UL signal and the second TDD DL signal.

Example 29 includes the repeater of Example 28, wherein the TDD SDM is further configured to: receive synchronization information for the first TDD signal to enable the controller to switch between the first TDD UL signal and the first TDD DL signal; and receive synchronization information for the second TDD signal to enable the controller to switch between the second TDD UL signal and the second TDD DL signal.

Example 30 includes the repeater of Example 29, wherein: the synchronization information for the first TDD signal is received from a base station transmitting the first TDD DL signal; and the synchronization information for the second TDD signal is received from a base station transmitting the second TDD DL signal.

Example 31 includes the repeater of Example 29, wherein the controller is further configured to: use the synchronization information for the first TDD signal and the UL/DL configuration information for the first TDD signal to switch between the first TDD UL signal and the first TDD DL signal for a subsequent time period; and use the synchronization information for the second TDD signal and the UL/DL configuration information for the second TDD signal to switch between the second TDD UL signal and the second TDD DL signal for a subsequent time period.

Example 32 includes the repeater of Example 29, wherein the controller is further configured to: store the synchronization information for the first TDD signal; and store the synchronization information for the second TDD signal.

Example 33 includes the repeater of Example 32, wherein the TDD SDM is further configured to: use the synchronization information for the first TDD signal that is stored at the controller to reacquire synchronization information for the first TDD signal in a first subsequent time period; and use the synchronization information for the second TDD signal that is stored at the controller to reacquire synchronization information for the second TDD signal in a second subsequent time period.

Example 34 includes the repeater of Example 27, wherein the TDD SDM is further configured to: store the UL/DL configuration information for the first TDD signal; and store the UL/DL configuration information for the second TDD signal.

Example 35 includes the repeater of Example 34, wherein the TDD SDM is further configured to: use the UL/DL configuration information for the first TDD signal that is stored at the TDM SDM to reacquire UL/DL configuration information for the first TDD signal in a first subsequent time period; and use the UL/DL configuration information for the second TDD signal that is stored at the TDM SDM to reacquire UL/DL configuration information for the second TDD signal in a second subsequent time period.

Example 36 includes the repeater of Example 27, wherein the TDD SDM is further configured to: determine the UL/DL configuration information for the first TDD signal and the UL/DL configuration information for the second TDD signal in a same time period; or determine the UL/DL configuration information for the first TDD signal in a first time period and determine the UL/DL configuration information for the second TDD signal in a second time period, wherein the first time period does not overlap with the second time period.

Example 37 includes the repeater of Example 27, wherein the TDD SDM is further configured to: activate a search timer for one or more of the first TDD signal or the second TDD signal.

Example 38 includes the repeater of Example 27, wherein the TDD SDM is further configured to: activate a first lock state for the first TDD signal, and set an UL/DL configuration state based on the UL/DL configuration information for the first TDD signal during a duration of the first lock state; or activate a second lock state for the second TDD signal, and set an UL/DL configuration state for the second TDD signal based on the UL/DL configuration information for the second TDD signal during a duration of the second lock state.

Example 39 includes the repeater of Example 27, wherein the TDD SDM is further configured to: activate a training timer for one or more of the first TDD signal or the second TDD signal.

Example 40 includes a repeater comprising: a first port; a second port; a first amplification and filtering path coupled between the first port and the second port, wherein the first amplification and filtering path is configured to amplify and filter a first time division duplex (TDD) uplink (UL) signal in a first frequency range; a second amplification and filtering path coupled between the first port and the second port, wherein the second amplification and filtering path is configured to amplify and filter a first TDD downlink (DL) signal in the first frequency range; and a modem configured to: generate an UL/DL indication signal for the first frequency range; and send the UL/DL indication signal to the repeater.

Example 41 includes the repeater of Example 40, wherein the repeater is further configured to: receive the UL/DL indication signal for the first frequency range; generate a switching signal for a first set of one or more switches to switch between the first amplification and filtering path and the second amplification and filtering path based on the UL/DL indication signal; and send the switching signal to the first set of one or more switches to enable amplification of the first TDD UL signal or the first TDD DL signal.

Example 42 includes the repeater of Example 40, further comprising: a third amplification and filtering path coupled between the first port and the second port, wherein the third amplification and filtering path is configured to amplify and filter a second TDD UL signal in a second frequency range; and a fourth amplification and filtering path coupled between the first port and the second port, wherein the fourth amplification and filtering path is configured to amplify and filter a second TDD DL signal in the second frequency range.

Example 43 includes the repeater of Example 42, wherein the modem is further configured to: generate a second UL/DL indication signal for the second frequency range; and send the second UL/DL indication signal to the repeater.

Example 44 includes the repeater of Example 43, wherein the repeater is further configured to: receive the second UL/DL indication signal for the second frequency range; generate a second switching signal for a second set of one or more switches to switch between the third amplification and filtering path and the fourth amplification and filtering path based on the second UL/DL indication signal; and send the second switching signal to the second set of one or more switches to enable amplification of the second TDD UL signal or the second TDD DL signal.

Example 45 includes the repeater of Example 40, wherein the repeater is further configured to: use the UL/DL indication signal to switch between: the first TDD UL signal; and the first TDD DL signal.

Example 46 includes the repeater of Example 40, wherein the modem is further configured to: receive synchronization information for the first frequency range to enable the controller to switch between: the first TDD UL signal; and the first TDD DL signal.

Example 47 includes the repeater of Example 46, wherein the modem is further configured to: receive synchronization information for the first frequency range from a base station transmitting the first TDD DL signal.

Example 48 includes the repeater of Example 40, wherein the repeater is further configured to: use the UL/DL indication signal for the first frequency range to switch between the first TDD UL signal and the first TDD DL signal, wherein the UL/DL indication signal is generated from synchronization information for the first frequency range and UL/DL configuration information for the first frequency range.

Example 49 includes the repeater of Example 40, wherein the modem is further configured to: store the UL/DL indication signal for the first frequency range.

Example 50 includes the repeater of Example 49, wherein the modem is further configured to: use the UL/DL indication signal for the first frequency range that is stored at the modem to reacquire UL/DL indication information for the first frequency range in a subsequent time period.

Example 51 includes the repeater of Example 40, wherein the UL/DL indication signal is generated from synchronization information for the first frequency range and UL/DL configuration information for the first frequency range.

Example 52 includes the repeater of Example 40, wherein the first frequency range includes: one or more of: Third Generation Partnership Project (3GPP) long term evolution (LTE) time division duplex (TDD) frequency bands 33-53; or one or more of: 3GPP fifth generation (5G) TDD frequency bands n34, n38, n39, n40, n41, n50, n51, n77, n78, n79, n257, n258, n260, or n261.

Example 53 includes the repeater of Example 40, wherein the modem is further configured to generate the UL/DL indication signal for the first frequency range without a subscriber identity module (SIM) card.

Example 54 includes the repeater of Example 40, wherein the modem comprises a long term evolution (LTE) layer-1 modem configured to generate the UL/DL indication signal without using LTE layer-2 or LTE layer-3.

Example 55 includes a modem configured to: receive a time division duplex (TDD) signal including synchronization information for a first frequency range and uplink/downlink (UL/DL) configuration information for the first frequency range; generate an UL/DL indication signal for a first frequency range to of the time division duplex (TDD) signal from the synchronization information and the UL/DL configuration information; and send the UL/DL indication signal to a repeater.

Example 56 includes the modem of Example 55, further configured to: store the UL/DL indication signal for the first frequency range; and use the U L/DL indication signal for the first frequency range that is stored at the modem to reacquire UL/DL indication information for the first frequency range in a subsequent time period.

Example 57 includes the modem of Example 55, wherein the modem is further configured to generate the UL/DL indication signal for the first frequency range without a subscriber identity module (SIM) card.

Example 58 includes the modem of Example 55, wherein the modem comprises a long term evolution (LTE) layer-1 modem configured to generate the UL/DL indication signal without using LTE layer-2 or LTE layer-3.

Example 59 includes the modem of Example 55, wherein the modem is further configured to: receive synchronization information for the first frequency range from a base station transmitting the TDD signal.

Example 60 includes the modem of Example 55, wherein the modem is further configured to: receive a second time division duplex (TDD) signal including synchronization information for a second frequency range and UL/DL configuration information for the second frequency range; generate a second UL/DL indication signal for the second frequency range; and send the second UL/DL indication signal to the repeater.

Example 61 includes a repeater comprising: a first port; a second port; a first amplification and filtering path coupled between the first port and the second port, wherein the first amplification and filtering path is configured to amplify and filter a first time division duplex (TDD) uplink (UL) signal in a first frequency range; a second amplification and filtering path coupled between the first port and the second port, wherein the second amplification and filtering path is configured to amplify and filter a first TDD downlink (DL) signal in the first frequency range; and a modem configured to: generate an UL/DL indication signal for the first frequency range; and send the UL/DL indication signal to the repeater.

Example 62 includes the repeater of Example 61, wherein the repeater is further configured to: receive the UL/DL indication signal for the first frequency range; generate a switching signal for a first set of one or more switches to switch between the first amplification and filtering path and the second amplification and filtering path based on the UL/DL indication signal; and send the switching signal to the first set of one or more switches to enable amplification of the first TDD UL signal or the first TDD DL signal.

Example 63 includes the repeater of Example 61, further comprising: a third amplification and filtering path coupled between the first port and the second port, wherein the third amplification and filtering path is configured to amplify and filter a second TDD UL signal in a second frequency range; a fourth amplification and filtering path coupled between the first port and the second port, wherein the fourth amplification and filtering path is configured to amplify and filter a second TDD DL signal in the second frequency range, and wherein the repeater is further configured to: generate a second UL/DL indication signal for the second frequency range; and send the second UL/DL indication signal to the repeater.

Example 64 includes the repeater of Example 63, wherein the repeater is further configured to: receive the second UL/DL indication signal for the second frequency range; generate a second switching signal for a second set of one or more switches to switch between the third amplification and filtering path and the fourth amplification and filtering path based on the second UL/DL indication signal; and send the second switching signal to the second set of one or more switches to enable amplification of the second TDD UL signal or the second TDD DL signal.

Example 65 includes the repeater of Example 61, wherein the repeater is further configured to: use the UL/DL indication signal to switch between: the first TDD UL signal; and the first TDD DL signal.

Example 66 includes the repeater of Example 61, wherein the repeater is further configured to: use the UL/DL indication signal for the first frequency range to switch between the first TDD UL signal and the first TDD DL signal, wherein the UL/DL indication signal is generated from synchronization information for the first frequency range and UL/DL configuration information for the first frequency range.

Example 67 includes the repeater of Example 61, wherein the modem is further configured to: receive synchronization information for the first frequency range from a base station transmitting the first TDD DL signal to enable the controller to switch between: the first TDD UL signal; and the first TDD DL signal; or store the UL/DL indication signal for the first frequency range; or use the UL/DL indication signal for the first frequency range that is stored at the modem to reacquire UL/DL indication information for the first frequency range in a subsequent time period.

Example 68 includes the repeater of Example 61, wherein the first frequency range includes: one or more of: Third Generation Partnership Project (3GPP) long term evolution (LTE) time division duplex (TDD) frequency bands 33-53; or one or more of: 3GPP fifth generation (5G) TDD frequency bands n34, n38, n39, n40, n41, n50, n51, n77, n78, n79, n257, n258, n260, or n261.

Example 69 includes the repeater of Example 61, wherein the modem is further configured to generate the UL/DL indication signal for the first frequency range without a subscriber identity module (SIM) card.

Example 70 includes the repeater of Example 61, wherein the modem comprises a long term evolution (LTE) layer-1 modem configured to generate the UL/DL indication signal without using LTE layer-2 or LTE layer-3.

Example 71 includes a modem configured to: receive a time division duplex (TDD) signal including synchronization information for a first frequency range and uplink/downlink (UL/DL) configuration information for the first frequency range; generate an UL/DL indication signal for a first frequency range of the time division duplex (TDD) signal from the synchronization information and the UL/DL configuration information; and send the UL/DL indication signal to a to repeater.

Example 72 includes the modem of Example 71, wherein the modem is further configured to: receive synchronization information for the first frequency range from a base station transmitting the TDD signal; or store the UL/DL indication signal for the first frequency range; or use the UL/DL indication signal for the first frequency range that is stored at the modem to reacquire UL/DL indication information for the first frequency range in a subsequent time period.

Example 73 includes the modem of Example 71, wherein the modem is further configured to generate the UL/DL indication signal for the first frequency range without a subscriber identity module (SIM) card.

Example 74 includes the modem of Example 71, wherein the modem comprises a long term evolution (LTE) layer-1 modem configured to generate the UL/DL indication signal without using LTE layer-2 or LTE layer-3.

Example 75 includes the modem of Example 71, wherein the modem is further configured to: receive a second time division duplex (TDD) signal including synchronization information for a second frequency range and UL/DL configuration information for the second frequency range; generate a second UL/DL indication signal for the second frequency range; and send the second UL/DL indication signal to the repeater.

Example 76 includes the repeater of any of Examples 1 to 75, wherein the repeater is further configured to: switch from the first TDD DL signal to the first TDD UL signal directly within a first selected time period after downlink pilot time slot (DwPTS) symbols in a special subframe of the first TDD DL signal; and switch from the first TDD UL signal to the first TDD DL signal within a second selected time period after a subframe boundary between a UL subframe of the first TDD signal and a DL subframe of the first TDD DL signal.

Example 77 includes the repeater of any of Examples 1 to 76, wherein: the first selected time period is less than one or more of: 1 mcs, 500 nanoseconds, 300 nanoseconds, 200 nanoseconds, or 100 nanoseconds; and the second selected time period is less than one or more of: 1 mcs, 500 nanoseconds, 300 nanoseconds, 200 nanoseconds, or 100 nanoseconds.

Example 78 includes the repeater of any of Examples 1 to 77, wherein the repeater is further configured to: switch from the first TDD DL signal to the first TDD UL signal without using a timing advance (TA) value received from the UE; or switch from the first TDD UL signal to the first TDD DL signal without using the TA value received from the UE.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater comprising:
   a first port;
   a second port;
   a first amplification and filtering path coupled between the first port and the second port, wherein the first amplification and filtering path is configured to amplify and filter a first time division duplex (TDD) uplink (UL) signal in a first frequency range;
   a second amplification and filtering path coupled between the first port and the second port, wherein the second amplification and filtering path is configured to amplify and filter a first TDD downlink (DL) signal in the first frequency range;
   a third amplification and filtering path coupled between the first port and the second port, wherein the third amplification and filtering path is configured to amplify and filter a second TDD UL signal in a second frequency range; and
   a fourth amplification and filtering path coupled between the first port and the second port, wherein the fourth amplification and filtering path is configured to amplify and filter a second TDD DL signal in the second frequency range; and a modem configured to:
receive, for the TDD UL signal and the TDD DL signal, synchronization information for the first frequency range and UL/DL configuration information for the first frequency range;
generate an UL/DL indication signal for the first frequency range from the synchronization information and the UL/DL configuration information for the first frequency range; and
send the UL/DL indication signal to the repeater;
receive the UL/DL indication signal at the repeater for the first frequency range;
generate a switching signal for a first set of one or more switches to switch between the first amplification and filtering path and the second amplification and filtering path based on the UL/DL indication signal; and
send the switching signal to the first set of one or more switches to enable amplification of the first TDD UL signal or the first TDD DL signal;
generate a second UL/DL indication signal for the second frequency range; and
send the second UL/DL indication signal to the repeater.

2. The repeater of claim 1, wherein the repeater is further configured to:
receive the second UL/DL indication signal for the second frequency range;
generate a second switching signal for a second set of one or more switches to switch between the third amplification and filtering path and the fourth amplification and filtering path based on the second UL/DL indication signal; and
send the second switching signal to the second set of one or more switches to enable amplification of the second TDD UL signal or the second TDD DL signal.

3. The repeater of claim 1, wherein the repeater is further configured to:
use the UL/DL indication signal to switch between:
the first TDD UL signal; and
the first TDD DL signal.

4. The repeater of claim 1, wherein the modem is further configured to:
receive synchronization information for the first frequency range to enable the controller to switch between:
the first TDD UL signal; and
the first TDD DL signal.

5. The repeater of claim 4, wherein the modem is further configured to:
receive synchronization information for the first frequency range from a base station transmitting the first TDD DL signal.

6. The repeater of claim 1, wherein the repeater is further configured to:
use the UL/DL indication signal for the first frequency range to switch between the first TDD UL signal and the first TDD DL signal, wherein the UL/DL indication signal is generated from synchronization information for the first frequency range and UL/DL configuration information for the first frequency range.

7. The repeater of claim 1, wherein the modem is further configured to:
store the UL/DL indication signal for the first frequency range.

8. The repeater of claim 7, wherein the modem is further configured to:
use the UL/DL indication signal for the first frequency range that is stored at the modem to reacquire UL/DL indication information for the first frequency range in a subsequent time period.

9. The repeater of claim 1, wherein the UL/DL indication signal is generated from synchronization information for the first frequency range and UL/DL configuration information for the first frequency range.

10. The repeater of claim 1, wherein the first frequency range includes:
one or more of: Third Generation Partnership Project (3GPP) long term evolution (LTE) time division duplex (TDD) frequency bands 33-53; or
one or more of: 3GPP fifth generation (5G) TDD frequency bands n34, n38, n39, n40, n41, n50, n51, n77, n78, n79, n257, n258, n260, or n261.

11. The repeater of claim 1, wherein the modem is further configured to generate the UL/DL indication signal for the first frequency range without a subscriber identity module (SIM) card.

12. The repeater of claim 1, wherein the modem comprises a long term evolution (LTE) layer-1 modem configured to generate the UL/DL indication signal without using LTE layer-2 or LTE layer-3.

13. The repeater of claim 1, wherein the repeater is further configured to:
switch from the first TDD DL signal to the first TDD UL signal directly within a first selected time period after downlink pilot time slot (DwPTS) symbols in a special subframe of the first TDD DL signal; and
switch from the first TDD UL signal to the first TDD DL signal within a second selected time period after a subframe boundary between a UL subframe of the first TDD signal and a DL subframe of the first TDD DL signal.

14. The repeater of claim 13, wherein:
the first selected time period is less than one or more of: 1 mcs, 500 nanoseconds, 300 nanoseconds, 200 nanoseconds, or 100 nanoseconds; and
the second selected time period is less than one or more of: 1 mcs, 500 nanoseconds, 300 nanoseconds, 200 nanoseconds, or 100 nanoseconds.

15. The repeater of claim 13, wherein the repeater is further configured to:
switch from the first TDD DL signal to the first TDD UL signal without using a timing advance (TA) value received from the UE; or
switch from the first TDD UL signal to the first TDD DL signal without using the TA value received from the UE.

* * * * *